(12) United States Patent
Cervelli et al.

(10) Patent No.: US 10,996,823 B2
(45) Date of Patent: May 4, 2021

(54) INTERACTIVE GEOSPATIAL MAP

(71) Applicant: Palantir Technologies Inc., Palo Alto, CA (US)

(72) Inventors: Daniel Cervelli, Mountain View, CA (US); Cai GoGwilt, San Francisco, CA (US); William Macrae, Palo Alto, CA (US); Robert Prochnow, Palo Alto, CA (US); Dylan Scott, Palo Alto, CA (US); Henry Tung, Palo Alto, CA (US); Kevin Verdieck, Palo Alto, CA (US); Agatha Yu, San Francisco, CA (US)

(73) Assignee: PALANTIR TECHNOLOGIES INC., Denver, CO (US)

( * ) Notice: Subject to any disclaimer, the term of this patent is extended or adjusted under 35 U.S.C. 154(b) by 0 days.

(21) Appl. No.: 16/560,189

(22) Filed: Sep. 4, 2019

(65) Prior Publication Data

US 2019/0391709 A1    Dec. 26, 2019

Related U.S. Application Data

(63) Continuation of application No. 15/146,842, filed on May 4, 2016, now Pat. No. 10,444,941, which is a
(Continued)

(51) Int. Cl.
*G06F 3/00* (2006.01)
*G06F 3/0482* (2013.01)
(Continued)

(52) U.S. Cl.
CPC ....... *G06F 3/0482* (2013.01); *G01C 21/3667* (2013.01); *G06F 3/04847* (2013.01); *G06F 3/14* (2013.01); *G06F 16/29* (2019.01); *G06T 11/001* (2013.01); *G06T 11/206* (2013.01); *G06T 11/60* (2013.01); *G06T 19/006* (2013.01); *G09B 29/106* (2013.01)

(58) Field of Classification Search
CPC .................................................. G06F 3/0482
See application file for complete search history.

(56) References Cited

U.S. PATENT DOCUMENTS

| 5,283,562 | A | * | 2/1994 | Kaneko | ................ | G09B 29/106 |
| | | | | | | 345/671 |
| 5,884,217 | A | * | 3/1999 | Koyanagi | .......... | G01C 21/3673 |
| | | | | | | 701/436 |

(Continued)

*Primary Examiner* — Nicholas Augustine
(74) *Attorney, Agent, or Firm* — Knobbe, Martens, Olson & Bear, LLP

(57) ABSTRACT

Various systems and methods are provided that display various interactive user interfaces containing interactive maps. The user may use the interactive map to perform searches for data objects, toggle different layers associated with different types of objects for display, generate heatmaps based upon a grid and/or data object shapes, copy data between different interactive maps, and/or define filters to filter the displayed data. In response to user interaction with the map at a client system, tile layers are generated using server-side components, assembled into map tiles, and transmitted to client-side components to be displayed to the user. The tile layers may include a base tile layer, vector tile layer, selection tile layer, and inactive tile layer.

20 Claims, 39 Drawing Sheets

Related U.S. Application Data continuation of application No. 14/934,004, filed on Nov. 5, 2015, now Pat. No. 9,600,146, application No. 16/560,189, filed on Sep. 4, 2019, which is a continuation of application No. 15/146,841, filed on May 4, 2016, now Pat. No. 10,444,940, which is a continuation of application No. 14/934,004, filed on Nov. 5, 2015, now Pat. No. 9,600,146.

(60) Provisional application No. 62/206,174, filed on Aug. 17, 2015.

(51) Int. Cl.
*G06F 16/29* (2019.01)
*G09B 29/10* (2006.01)
*G06T 11/60* (2006.01)
*G06F 3/0484* (2013.01)
*G06F 3/14* (2006.01)
*G06T 11/00* (2006.01)
*G06T 19/00* (2011.01)
*G01C 21/36* (2006.01)
*G06T 11/20* (2006.01)
*G06F 3/01* (2006.01)

(56) References Cited

U.S. PATENT DOCUMENTS

| | | | | |
|---|---|---|---|---|
| 5,925,091 A * | 7/1999 | Ando | | G01C 21/3664 |
| | | | | 701/455 |
| 5,936,631 A * | 8/1999 | Yano | | G01C 21/367 |
| | | | | 345/428 |
| 6,169,552 B1 * | 1/2001 | Endo | | G01C 21/32 |
| | | | | 345/427 |
| 6,915,310 B2 * | 7/2005 | Gutierrez | | G06F 16/29 |
| | | | | 707/769 |
| 6,983,203 B1 * | 1/2006 | Wako | | G01C 21/3682 |
| | | | | 340/988 |
| 7,552,008 B2 * | 6/2009 | Newstrom | | G06F 16/29 |
| | | | | 701/468 |
| 8,306,777 B2 * | 11/2012 | Smartt | | G09B 29/102 |
| | | | | 702/167 |
| 8,799,799 B1 * | 8/2014 | Cervelli | | G06F 3/04842 |
| | | | | 715/765 |
| 9,009,177 B2 * | 4/2015 | Zheng | | G06F 17/30241 |
| | | | | 707/758 |
| 9,042,657 B2 * | 5/2015 | Janky | | G06K 9/46 |
| | | | | 382/195 |
| 9,104,293 B1 * | 8/2015 | Kornfeld | | G05B 19/0426 |
| 9,146,125 B2 * | 9/2015 | Vulcano | | G08G 1/0969 |
| 9,280,576 B2 * | 3/2016 | Trotta | | G06F 16/2365 |
| 9,330,503 B2 * | 5/2016 | Mital | | G06T 19/20 |
| 9,600,146 B2 | 3/2017 | Cervelli et al. | | |
| 9,734,217 B2 * | 8/2017 | Kara | | G06F 16/26 |
| 9,796,400 B2 * | 10/2017 | Puttagunta | | B61L 25/04 |
| 10,444,940 B2 | 10/2019 | Cervelli et al. | | |
| 10,444,941 B2 | 10/2019 | Cervelli et al. | | |
| 2002/0130906 A1 * | 9/2002 | Miyaki | | G01C 21/3664 |
| | | | | 715/837 |
| 2006/0200384 A1 * | 9/2006 | Arutunian | | G06Q 30/0273 |
| | | | | 705/14.69 |
| 2007/0009156 A1 * | 1/2007 | O'Hara | | G06K 9/00476 |
| | | | | 382/190 |
| 2008/0133579 A1 * | 6/2008 | Lim | | G06F 16/9537 |
| 2009/0177678 A1 * | 7/2009 | Clark | | G06F 16/29 |
| 2009/0187447 A1 * | 7/2009 | Cheng | | G06F 16/2365 |
| | | | | 705/7.34 |
| 2009/0216808 A1 * | 8/2009 | Wallace | | G06T 11/206 |
| 2010/0094548 A1 * | 4/2010 | Tadman | | G06Q 50/16 |
| | | | | 701/533 |
| 2011/0153368 A1 * | 6/2011 | Pierre | | G06Q 10/067 |
| | | | | 705/4 |
| 2011/0238690 A1 * | 9/2011 | Arrasvuori | | G06F 16/00 |
| | | | | 707/769 |
| 2012/0102013 A1 * | 4/2012 | Martini | | G06F 16/9537 |
| | | | | 707/706 |
| 2012/0320087 A1 * | 12/2012 | Shi | | G06T 17/05 |
| | | | | 345/629 |
| 2013/0254900 A1 * | 9/2013 | Sathish | | G06F 16/29 |
| | | | | 726/28 |
| 2013/0339891 A1 * | 12/2013 | Blumenberg | | G01C 21/3694 |
| | | | | 715/771 |
| 2014/0043337 A1 * | 2/2014 | Cardno | | G06K 9/52 |
| | | | | 345/440 |
| 2014/0218400 A1 * | 8/2014 | O'Toole | | G06Q 50/16 |
| | | | | 345/634 |
| 2014/0327547 A1 * | 11/2014 | Johnson | | G08B 21/18 |
| | | | | 340/601 |
| 2015/0112647 A1 * | 4/2015 | Currin | | G06F 30/13 |
| | | | | 703/1 |
| 2015/0112963 A1 * | 4/2015 | Mojtahedi | | G06F 16/9537 |
| | | | | 707/711 |
| 2015/0169694 A1 * | 6/2015 | Longo | | H04W 4/02 |
| | | | | 707/724 |
| 2015/0172396 A1 * | 6/2015 | Longo | | H04L 51/20 |
| | | | | 709/204 |
| 2015/0187100 A1 * | 7/2015 | Berry | | G06Q 30/00 |
| | | | | 345/634 |
| 2015/0312323 A1 * | 10/2015 | Peterson | | H04L 67/10 |
| | | | | 709/203 |
| 2017/0108338 A1 * | 4/2017 | Larnaout | | G01S 19/48 |
| 2019/0332615 A1 * | 10/2019 | Achlioptas | | H04L 51/14 |

* cited by examiner

INTERACTIVE GEOSPATIAL MAP

CROSS-REFERENCE TO RELATED APPLICATIONS

This application is a continuation of U.S. patent application Ser. No. 15/146,842, titled "Interactive Geospatial Map", filed May 4, 2016, which is a continuation of U.S. patent application Ser. No. 14/934,004, titled "Interactive Geospatial Map", filed Nov. 5, 2015, which claims the benefit of U.S. Provisional Patent Application Ser. No. 62/206,174, titled "Interactive Geospatial Map", filed Aug. 17, 2015. This application is also a continuation of U.S. patent application Ser. No. 15/146,841, titled "Interactive Geospatial Map", filed May 4, 2016, which is a continuation of U.S. patent application Ser. No. 14/934,004, titled "Interactive Geospatial Map", filed Nov. 5, 2015, which claims the benefit of U.S. Provisional Patent Application Ser. No. 62/206,174, titled "Interactive Geospatial Map", filed Aug. 17, 2015. All of the above applications are hereby incorporated by reference herein in their entireties and for all purposes.

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for geographical data integration, analysis, and visualization. More specifically, the present disclosure relates to interactive maps including data objects.

BACKGROUND

Interactive geographical maps, such as web-based mapping service applications and Geographical Information Systems (GIS), are available from a number of providers. Such maps generally comprise satellite images or generic base layers overlaid by roads. Users of such systems may generally search for and view locations of a small number of landmarks, and determine directions from one location to another. In some interactive graphical maps, 3D terrain and/or 3D buildings may be visible in the interface.

SUMMARY

The systems, methods, and devices described herein each have several aspects, no single one of which is solely responsible for its desirable attributes. Without limiting the scope of this disclosure, several non-limiting features will now be discussed briefly.

The systems, methods, and devices of the present disclosure may provide, among other features, high-performance, interactive geospatial and/or data object map capabilities in which large amounts of geographical, geospatial, and other types of data, geodata, objects, features, and/or metadata are efficiently presented to a user on a map interface. In various embodiments, an interactive geospatial map system (also referred to as an interactive data object map system) may enable rapid and deep analysis of various objects, features, and/or metadata by the user. In some embodiments, a layer ontology may be displayed to the user. In various embodiments, when the user rolls a selection cursor over an object an outline of the object is displayed. Selection of an object may cause display of metadata associated with that object. In various embodiments, the interactive data object map system may automatically generate object lists and/or histograms based on selections made by the user. Various aspects of the present disclosure may enable the user to perform geosearches, generate heatmaps, define and apply filters to displayed data, copy data objects between different interactive maps, import additional data objects from files, and/or perform keyword searches, among other actions.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of maps, and may enable a user to more quickly and accurately access, navigate, assess, and digest the map and its associated object data than previous systems.

Further, the interactive and dynamic user interfaces described herein are enabled by innovations in efficient interactions between the user interfaces and underlying systems and components. For example, disclosed herein are improved methods of displaying geographic maps and data objects associated with the map using a plurality of layers, generating heatmaps on the map, transferring data objects between different maps or applications, and generating and manipulating filters for data objects displayed on the map. The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing map display is limited in various ways, and various embodiments of the disclosure provide significant improvements over such technology. Additionally, various embodiments of the present disclosure are inextricably tied to computer technology. In particular, various embodiments rely on detection of user inputs via graphical user interfaces, generation of map tile layers based on those user inputs, generation of heatmaps based upon user-selected attributes or aggregations of user-selected attributes, generation and manipulation of filters based upon user-selected attributes, and/or the like. Such features and others are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic map and image data.

In an embodiment, a computer system is disclosed comprising an electronic data structure configured to store a plurality of objects, wherein each of the objects is associated with metadata; a computer readable medium storing software modules including computer executable instructions; one or more hardware processors in communication with the electronic data structure and the computer readable medium, and configured to execute a user interface module of the software modules in order to generate user interface data for rendering an interactive user interface on a client computing device, the interactive user interface including an interactive map, wherein the interactive map includes a plurality of data objects, wherein the interactive map is comprised of a plurality of map tiles, each map tile comprising one or more tile layers. The one or more hardware processors may be further configured to receive a query from the client computing device, identify a map tile of the plurality of map tiles that is associated with the received query, determine a tile layer composition for the map tile based at least in part upon the received query, wherein the tile layer composition specifies a plurality of tile layers comprising at least a vector layer and an inactive layer, generate the plurality of tile layers, and provide the generated tile layers to the client computing device. In some embodiments, the plurality of tile layers further comprises a base layer and a selection layer.

In some embodiments, generating the plurality of tile layers comprises determining if one or more of the plurality of tile layers is stored in a cache. If the tile layer of the plurality of tile layers is determined to be not stored in the cache, the tile layer may be generated and stored in the cache.

In some embodiments, the vector tile layer may comprise one or more data objects having locations associated with the map tile. In some embodiments, the vector tile layer comprises an aggregation of a plurality of selected vector layers. The vector tile layer may further comprise one or more interface elements corresponding to data objects obtained through a search performed by the user.

In some embodiments, the selection tile layer comprises one or more interface elements corresponding to data objects that have been selected by the user. In some embodiments, the inactive tile layer comprises one or more interface elements corresponding to data objects of the plurality of data objects that are not selectable by the user.

In some embodiments, a tile layer of the plurality of tile layers is generated as an image. For example, a tile layer may comprise a PNG image.

In some embodiments, generating the plurality of tile layers comprises composing the plurality of tile layers into an updated map tile, and providing the generated tile layers to the client computing device comprises providing the updated map tile to the client computing device.

In some embodiments, the map tile is associated with a UTF grid, wherein the UTF grid comprises a plurality of characters corresponding to pixels on the map tile. A character of the UTF grid may indicate a data object associated with corresponding pixel.

In some embodiments, the query comprises a selection of one or more data objects, a search for one or more data objects, a selection of one or more layers, a request to generate a heatmap, or the application of a filter to filter one or more data objects. A map tile of the plurality of map tiles is identified as being associated with the received query if a data object associated with the query is located within the map tile.

In some embodiments, the one or more hardware processors are further configured to assemble the generated tile layers into a completed map tile, and wherein providing the generated tile layers to the client computing device comprises providing the completed map tile to the client computing device.

In another embodiment, a computer system is disclosed comprising an electronic data structure configured to store a plurality of objects, wherein each of the objects is associated with metadata; a computer readable medium storing software modules including computer executable instructions; one or more hardware processors in communication with the electronic data structure and the computer readable medium, and configured to execute a user interface module of the software modules in order to display, to a user, an interactive user interface including an interactive map, the map containing a plurality of data objects, wherein each of the plurality of data objects is associated with at least one attribute, and distributions of the plurality of data objects over attribute values of one or more attributes of the plurality of data objects. The one or more hardware processors may be further configured to receive a selection of an attribute value of an attribute of the one or more attributes, generate a first filter by providing an indication of the attribute value of the attribute to a server computing device, wherein the attribute value is associated with a portion of the plurality of data objects. In response to generating the first filter, the one or more hardware processors may be further configured to receive an update to the interactive map from the server computing device based on the indication, the update comprising at least an updated map tile of the interactive map, update the interactive map with the updated map tile such that the portion of the plurality of data objects that are selected are displayed as active data objects, while a remainder of the plurality of data objects that are not selected are displayed as inactive data objects, and update the interactive user interface to further include a user interface element corresponding to the first filter.

In some embodiments, the distributions of the plurality of data objects over attribute values comprise a histogram. The one or more hardware processors may be configured to receive a selection of an attribute value of an attribute of the one or more attributes in response to a user selecting one or more bars associated with the histogram.

In some embodiments, the one or more hardware processors may be further configured to, in response to receiving a selection of an attribute value for an attribute of the one or more attributes, display one or more distributions over of displayed data objects associated with the selected attribute value over at least a portion of the remaining attributes of the one or more attributes.

In some embodiments, the attribute value may comprise an attribute value range. In some embodiments, the attribute value may comprise all attribute values except a specified set of attribute values.

In some embodiments, the one or more hardware processors may be further configured to receive an indication to deactivate the first filter, in response to the indication to deactivate the first filter, receive a second update to the interactive map from the server computing device based on the indication, the second update comprising at least a second updated map tile of the interactive map, and update the interactive map with the second updated map tile such that the remainder of the plurality of data objects are displayed as active data objects. In some embodiments, the indication may comprise a selection by the user of the user interface element corresponding to the first filter.

In some embodiments, the one or more hardware processors are further configured to receive a selection of a second attribute value, generate a second filter by providing an indication of the second attribute value to a server computing device, receive a second update to the interactive map from the server computing device based on the indication, the second update comprising at least a second updated map tile of the interactive map, update the interactive map with the second updated map tile such that data objects of the plurality of data objects that are associated with both the first attribute value and the second attribute value are displayed as active data objects, while the remaining data objects are displayed as inactive data objects, and update the interactive user interface to further include a user interface element corresponding to the second filter. In some embodiments, the one or more hardware processors may further receive an indication to deactivate the first filter, receive a third update to the interactive map from the server computing device based on the indication, the third update comprising at least a third updated map tile of the interactive map, and update the interactive map with the third updated map tile such that data objects of the displayed data objects that are associated with the second attribute value are displayed as active data objects, while a remainder of the plurality of data objects that are not selected are displayed as inactive data objects. In some embodiments, the first attribute value and second attribute value may be associated with different attributes.

In another embodiment, a computer system is disclosed comprising an electronic data structure configured to store a plurality of objects, wherein each of the objects is associated with metadata; a computer readable medium storing software modules including computer executable instructions; one or more hardware processors in communication with the electronic data structure and the computer readable medium, and configured to execute a user interface module of the software modules in order to generate user interface data for rendering an interactive user interface on a client computing device, the interactive user interface including an interactive map, wherein the interactive map includes a plurality of data objects, wherein each data object is associated with at least one attribute. The one or more hardware processors may be further configured to receive a query from the client computing device corresponding to a selection of an attribute, receive an indication from the client computing device identifying one or more shapes, wherein a shape of the one or more shapes defines a region on the interactive map, and for each shape of the one or more shapes, calculate an aggregate attribute value corresponding to the shape, based at least in part upon the selected attribute, generate data for rendering a heatmap on the interactive map, based at least in part upon the calculated aggregate attribute values for the one or more shapes. The generated data may be transmitted to a client computing device for rendering a heatmap.

In some embodiments, the one or more shapes may comprise one or more spaces in a rectangular grid. In other embodiments, the one or more shapes are associated with one or more data objects. For example, the one or more data objects may be associated with buildings, with the one or more shapes corresponding to building footprints. In some embodiments, the one or more data objects are associated with geographic regions, and the one or more shapes correspond to geographic borders.

In some embodiments, generating the heatmap on the map comprises assigning a color to each shape, wherein the color for a shape is assigned based at least in part upon the aggregate attribute value for the shape.

In some embodiments, the attribute may comprise a function of two or more different attributes. The two or more different attributes may comprise a first attribute associated with a first data object type, and a second attribute associated with a second data object type.

In some embodiments, calculating an aggregate attribute value for the shape comprises identifying one or more data objects associated with the attribute within the region defined by the shape, and calculating the aggregate attribute value for the shape based at least in part upon values of the attribute associated with the one or more identified data objects.

In some embodiments, the one or more hardware processors may be further configured to receive a request from the client computing device specifying one or more filter conditions, and in response to the received request, generate the heatmap such that only shapes having an aggregate attribute value satisfying the one or more filter conditions are displayed.

In another embodiment, a computer system is disclosed comprising an electronic data structure configured to store a plurality of objects, wherein each of the objects is associated with metadata; a computer readable medium storing software modules including computer executable instructions; one or more hardware processors in communication with the electronic data structure and the computer readable medium, and configured to execute a user interface module of the software modules in order to generate user interface data for rendering an interactive user interface on a client computing device, the interactive user interface including a first interactive map and a second interactive map, wherein the first interactive map includes a plurality of data objects, receive a query from the client computing device corresponding to a selection of one or more data objects in the first interactive map. The one or more hardware processors may be further configured to receive a first indication corresponding to a request to copy the one or more selected data objects, generate an ID corresponding to the one or more selected data objects, receive a second indication corresponding to a request to copy the one or more selected data objects from the first interactive map to the second interactive map, wherein the second indication comprises the ID received at the interactive second map, use the ID to identify the one or more data objects corresponding to the ID, generate a set of user interface data for updating the second interactive map, wherein updating the second interactive map comprises displaying the identified one or more data objects on the second interactive map, and provide the set of generated user interface data to the client computing device to display the identified one or more data objects on the second interactive map.

In some embodiments, each data object is associated with an identifier, and the ID is generated by applying a hash function on the identifiers of the one or more data objects. In some embodiments, the ID comprises a string of a fixed length.

In some embodiments, the first indication may correspond to a drag and drop operation performed by the user at the client computing device. In some embodiments, the first indication may correspond to a copy operation performed by the user at the client computing device, and the second indication may correspond to a paste operation performed by the user at the client computing device.

In some embodiments, the one or more hardware processors are further configured to, in response to receiving the first indication, generate and provide to the client computing device user interface data for rendering an aggregate icon representing the one or more selected data objects.

In some embodiments, the first interactive map and the second interactive map are displayed in different tabs in a web browser at the client computing device. Alternatively, the first interactive map and the second interactive map may be displayed in different windows.

In some embodiments, the generated ID may be stored in a mapping table. Identify the one or more data objects corresponding to the ID may be performed by accessing the mapping table.

Additional embodiments of the disclosure are described below in reference to the appended claims, which may serve as an additional summary of the disclosure.

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

BRIEF DESCRIPTION OF THE DRAWINGS

The following aspects of the disclosure will become more readily appreciated as the same become better understood by reference to the following detailed description, when taken in conjunction with the accompanying drawings.

DETAILED DESCRIPTION OF SPECIFIC EMBODIMENTS

Overview

Figure 1A:
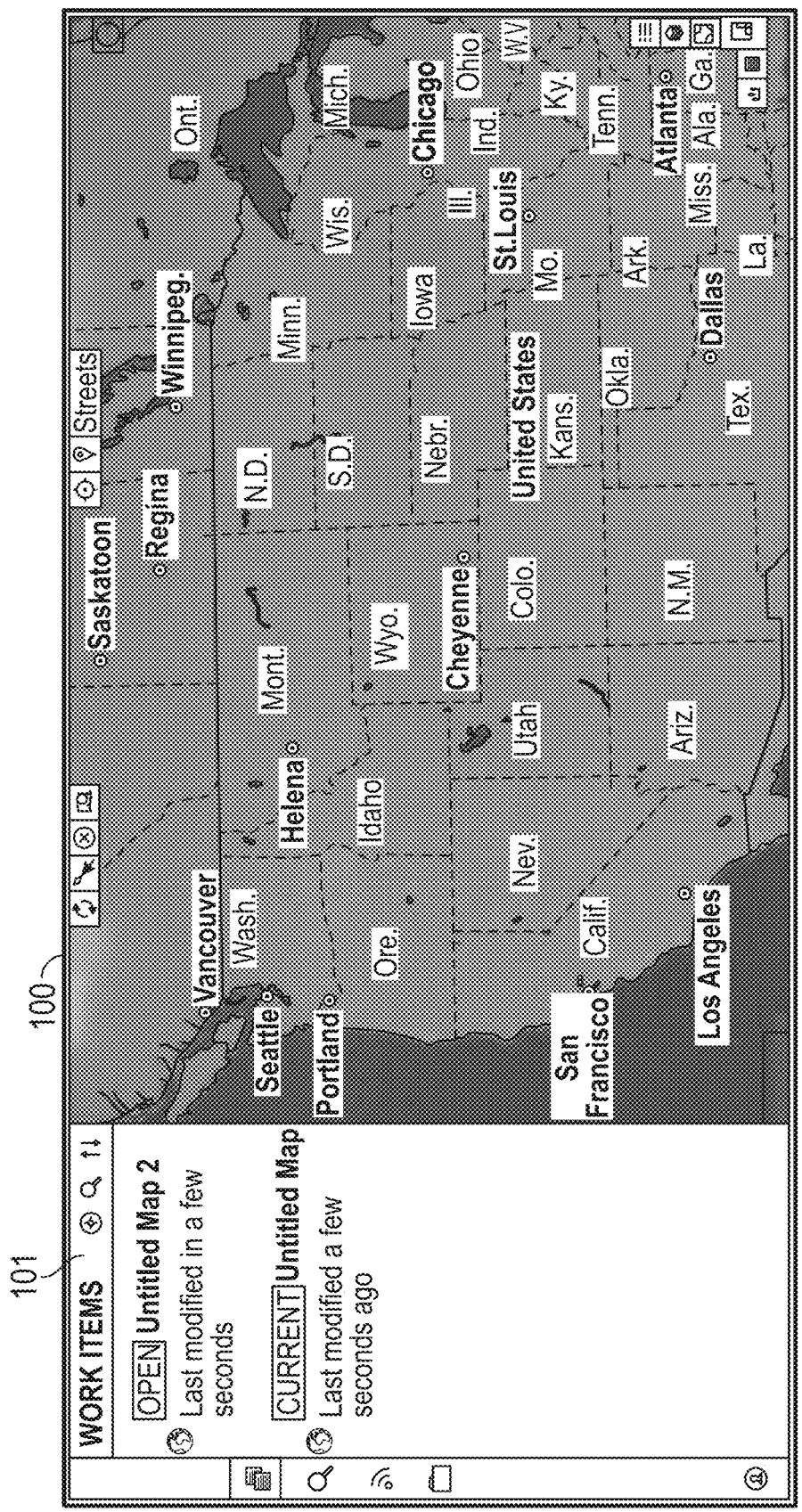
FIGS. 1A-1B illustrate example user interfaces of an interactive data object map system, in accordance with some embodiments.

In general, a high-performance, interactive data object map system (or "map system") is disclosed in which large amounts of geographical, geospatial, and other types of data, geodata, objects, features, and/or metadata are efficiently presented to a user on a map interface. The interactive data object map system allows for rapid and deep analysis of various objects, features, and/or metadata by the user. For example, millions of data objects and/or features may be simultaneously viewed and selected by the user on the map interface. A layer ontology may be displayed to the user that allows the user to select and view particular layers. In various embodiments, when the user rolls a selection cursor over an object/feature (and/or otherwise selects the object/feature) an outline of the object/feature is displayed. Selection of an object/feature may cause display of metadata associated with that object/feature. For the purposes of the present specification, the terms "objects," "data objects," and "features" may be used synonymously, and may hereinafter be collectively referred to as "objects."

In an embodiment, the user may rapidly zoom in and out and/or move and pan around the map interface to variously see more or less detail, and more or fewer objects. In various embodiments, the interactive data object map system may automatically generate object lists and/or histograms based on selections made by the user. In various embodiments, the user may perform searches (such as geosearches based on any selections and/or drawn shapes, and/or other types of searches), generate heatmaps (e.g., based upon a grid or object shapes), copy objects between different interactive maps, import additional objects from files, and/or define filters to display data, among other actions as described below.

In an embodiment, the interactive data object map system includes server-side computer components and/or client-side computer components. The client-side components may implement, for example, displaying map tiles, showing object outlines, allowing the user to draw shapes, and/or allowing the user to select objects, among other actions. The server-side components may implement, for example, composition of layers into map tiles, caching of composed map tiles and/or layers, and/or providing object metadata, among other actions. Such functions may be distribution in any other manner. In an embodiment, object outlines and/or highlighting are accomplished on the client-side through the use of a UTF grid.

Definitions

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: A hierarchical arrangement and/or grouping of data according to similarities and differences. The present disclosure describes two ontologies. The first relates to the arrangement of vector layers consisting of map and object data as used by the interactive data object map system (as described below with reference to FIGS. 2A-2B). The second relates to the storage and arrangement of objects in one or more databases (as described below with reference to FIGS. 17A-17C). For example, the stored data may comprise definitions for object types and property types for data in a database, and how objects and properties may be related.

Database: A broad term for any data structure for storing and/or organizing data, including, but not limited to, relational databases (for example, Oracle database, mySQL database, and the like), non-relational databases (for example, a NoSQL database), spreadsheets, XML files, and text file, among others. The various terms "database," "data store," and "data source" may be used interchangeably in the present disclosure.

Data Object, Object, or Feature: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties. For the purposes of the present disclosure, the terms "feature," "data object," "object," and "data item" may be used interchangeably to refer to items displayed on the map interface of the interactive data object map system, and/or otherwise accessible to the user through the interactive data object map system. Features/objects may generally include, but are not limited to, roads, terrain (such as hills, mountains, rivers, and vegetation, among others), street lights (which may be represented by a streetlight icon), railroads, hotels/motels (which may be represented by a bed icon), schools (which may be represented by a parent-child icon), hospitals, other types of buildings or structures, regions, transportation objects, and other types of entities, events, and documents, among others. Objects displayed on the map interface generally comprise vector data, although other types of data may also be displayed. Objects generally have associated metadata and/or properties.

Object (or Feature) Type: Type of a data object or feature (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Also referred to as "metadata" or "attributes" of a data object/feature. A property of a data item may include any item of information associated with, and/or relevant to, the data item. At a minimum, each property/metadata of a data object has a type (such as a property type) and a value or values. Properties/metadata associated with features/objects may include any information relevant to that feature/object. For example, metadata associated with a school object may include an address (for example, 123 S. Orange Street), a district (for example, 509c), a grade level (for example, K-6), and/or a phone number (for example, 800-0000), among other items of metadata. In another example, metadata associated with a road object may include a speed (for example, 25 mph), a width (for example, 2 lanes), and/or a county (for example, Arlington), among other items of metadata.

Property Type: The data type of a property, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Description of the Figures

Embodiments of the disclosure will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

FIG. 1A illustrates an example user interface of an interactive data object map system, in accordance with some embodiments. In some embodiments, the user may select a map to be displayed. A plurality of different maps may be available for selection. For example, available maps may be displayed as a list in a sidebar 101. In some embodiments, sidebar 101 may contain additional buttons, icons, or other interface elements allowing a user to create a new maps, search for available maps, sort the listed maps, and/or the like. Prior to the selection of a map at sidebar 101, a blank or default map may be displayed at map interface 100. In some embodiments, similar user interface elements, such as sidebar 101, may be used to provide similar types of functionalities across multiple different software applications. By displaying a sidebar 101 containing buttons or other interface elements that implement similar functions across similar applications, the user may be provided a common frame of reference when using the different applications.

Each map may comprise different types of objects and/or different map layers. For example, a first map may map data related to a first topic (e.g., instances of disease outbreaks), while a second map may map data related to a second topic (e.g., weather patterns). In some embodiments, data associated with different maps may correspond to different geographical areas. Once a desired map has been selected, objects associated with the map may be loaded to be viewed and/or manipulated by the user.

Figure 1B:
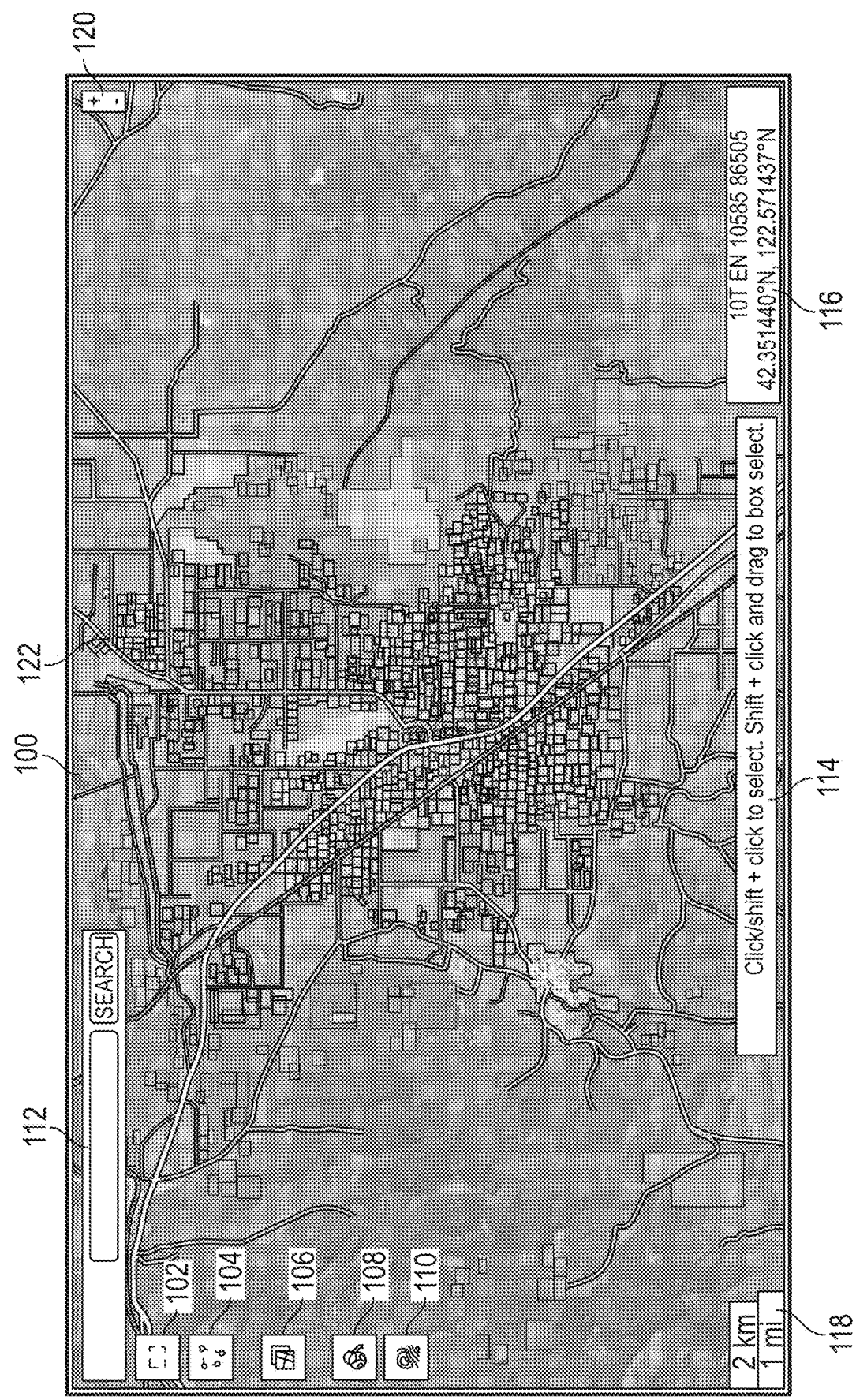

FIG. 1B illustrates an example user interface of the interactive data object map system, upon the selection and loading of a desired map, according to an embodiment of the present disclosure. The user interface includes map interface 100, a selection button/icon 102, a shape button/icon 104, a layers button/icon 106, a geosearch button/icon 108, a heatmap button/icon 110, a search box 112, an object information box 114, a coordinates information box 116, map scale information 118, zoom selectors 120, and visible objects 122 (e.g., corresponding to roads, buildings, regions, and/or the like). The functionality of the interactive data object map system may be implemented in one or more computer modules and/or processors, as is described below with reference to FIG. 16D.

The map interface 100 illustrated in FIGS. 1A and 1B is composed of multiple map tiles. In some embodiments, the map tiles may be composed of multiple layers of geographical, vector, and/or other types of data. Vector data layers (also referred to as vector layers) may include associated and/or linked objects. In an embodiment, vector layers are composed of objects. The various objects associated with a particular vector layer may be displayed to the user when that particular vector layer is activated. For example, a transportation vector layer may include road, railroad, and bike path objects that may be displayed to the user when the transportation layer is selected. The layers used to compose the map tiles and the map interface 100 may vary based on, for example, whether a user has selected objects displayed in the map interface 100, and/or the particular layers a user has selected for display. In an embodiment, composition of map tiles is accomplished by server-side components of the interactive data object map system. In an embodiment, composed map tiles may be cached by the server-side components to speed up map tile delivery to client-side components. The map tiles may then be transmitted to the client-side components of the interactive data object map system where they are composed into the map interface 100.

In general, the user interface is displayed on an electronic display viewable by a user of the interactive data object map system. The user of the interactive data object map system may interact with the user interface by, for example, touching the display when the display is touch-enabled and/or using a mouse pointer to click on the various elements of the user interface.

The map interface 100 includes various visible objects 122 and object icons. For example, the map interface 100 includes roads, buildings and structures, utilities, lakes, rivers, vegetation, and railroads, among other objects. The user may interact with the map interface 100 by, for example, rolling over and/or clicking on various objects. In one embodiment, rolling over and/or placing the mouse pointer over an object causes the object to be outlined and/or otherwise highlighted. Additionally, in some embodiments, the name of the object and/or other information about the feature may be shown in the feature information box 114.

The user of the map system may interact with the user interface of FIGS. 1A and/or 1B by scrolling or panning up, down, and/or side to side; zooming in or out; selecting objects; filtering objects; drawing shapes; selecting layers; performing a geosearch; generating a heatmap; and/or performing a keyword search; among other actions as are described below. Various user actions may reveal more or less map detail, and/or more or fewer objects.

Map Layers

Figure 2A:
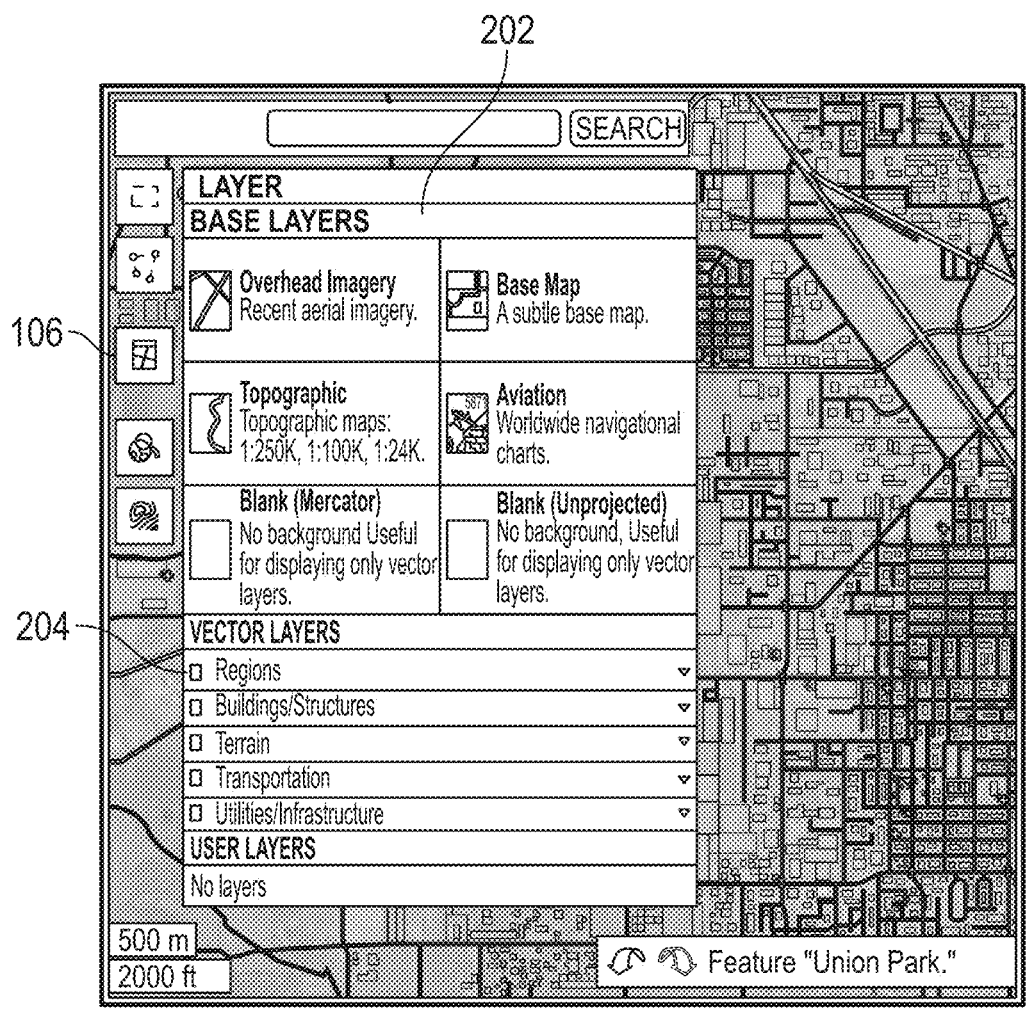
FIG. 2A illustrates an example user interface of the interactive data object map system in which map layers are displayed to a user, according to an embodiment of the present disclosure.

FIG. 2A illustrates an example user interface of the map system in which map layers are displayed to a user, according to an embodiment of the present disclosure. In the user interface of FIG. 2A, the user has selected the layers button 106, revealing the layers window 202. The layers window 202 includes a list of base layers, vector layers, and user layers. The base layers include, for example, overhead imagery, topographic, blank (Mercator), base map, aviation, and blank (unprojected). The vector layers include general categories such as, for example, regions, buildings/structures, terrain, transportation, and utilities/infrastructure. In some embodiments, data for one or more base layers may be retrieved from an outside source, such as a map application (e.g., Google Maps, MapQuest, and/or the like). While no user layers are included in the user interface of FIG. 2A, user layers may be added by the user of the map system, as is described below.

In an embodiment, the user may select one or more of the base layers which may be used during composition of the map tiles. For example, selection of the overhead imagery base layer will produce map tiles in which the underlying map tile imagery is made up of recent aerial imagery. Similarly, selection of the topographic base layer will produce map tiles in which the underlying map tile imagery includes topographic map imagery.

Further, in an embodiment, the user may select one or more of the vector layers which may be used during composition of the map tiles. For example, selecting the transportation layer results in transportation-related objects being displayed on the map tiles. Transportation-related objects may include, for example, roads, railroads, street signs, and/or street lights, among others. Examples of transportation-related objects may be seen in the user interface of FIG. 2A where various roads, railroads, and street light icons are displayed.

In an embodiment, the user of the map system may create and save map layers. These saved map layers may be listed as user layers in the layers window 202.

Figure 2B:
FIG. 2B illustrates an example map layer ontology, according to an embodiment of the present disclosure.

FIG. 2B illustrates an example map layer ontology, according to an embodiment of the present disclosure. As mentioned above with reference to FIG. 2A, the list of vector layers in the layers window 202 may include general categories/layers such as regions, buildings/structures, terrain, transportation, and utilities/infrastructure. The vector layers available in the map system may be further organized into an ontology, or hierarchical arrangement. For example, as shown in the vector layers window 206, the buildings/ structures category 208 may be further subdivided into layers including structures, government, medical, education, and commercial. The terrain category 210 may include vegetation and/or water/hydrography layers. The utilities/infrastructure category may include fire and/or storage/draining.

In an embodiment, the user of the map system may select one or more of the layers and/or sub-layers of the layer ontology. As shown in FIG. 2B, the user has deselected the vegetation sub-layer, and all of the utilities/infrastructure layers. Selecting and deselecting vector layers, or toggling vectors layers on and off, may cause the objects associated with those layers to be displayed or not displayed in the map interface. For example, when the user selects the transportation category/layer, road objects associated with the transportation layer may be displayed on the map interface. Likewise, when a user deselects the transportation category/layer, road objects associated with the transportation layer may be removed from the map interface.

In an embodiment, additional hierarchical levels of layers may be displayed to the user. For example, the vector layers window 206 may include sub-sub-layers (for example, the education sub-layer may be divided into elementary schools, secondary schools, and post-secondary schools). Alternatively, fewer hierarchical levels may be displayed to the user.

In an embodiment, each of the vector layers shown in the vector layers window 206 may be made up of many layers of map vector data. In this embodiment, the map system may advantageously generate a simplified layer ontology, such as the one shown in 206. The simplified layer ontology allows the user to easily select layers of interest from a reduced number of layers, rather than a large number of discrete layers. As described above, vector layers may contain data regarding associated objects. Thus, objects visible in the map interface correspond to the currently active/selected layers. In an embodiment, the layer ontology may have an arbitrary depth.

Figure 2C:
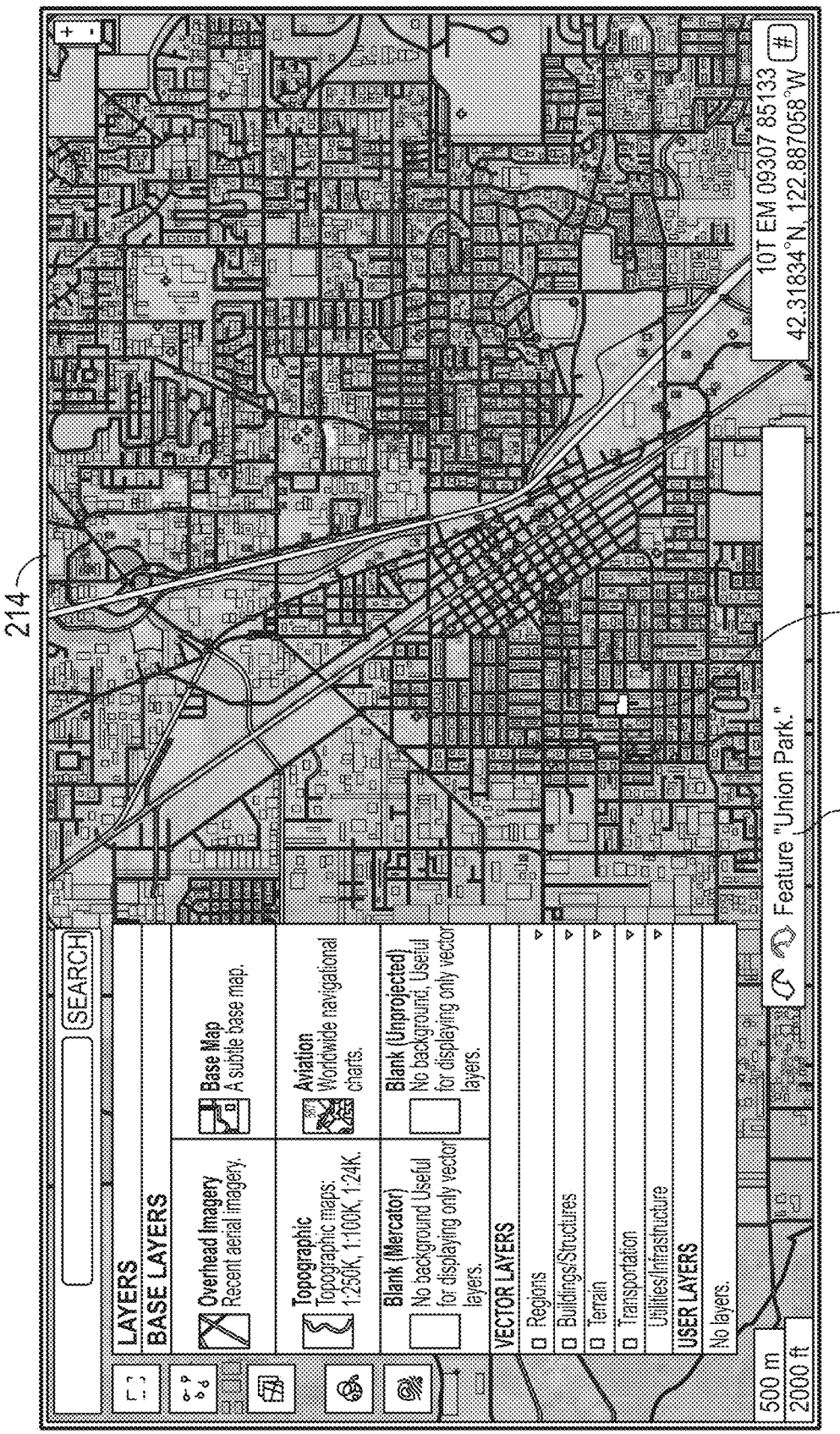
FIG. 2C illustrates an example user interface of the interactive data object map system in which various objects are displayed, according to an embodiment of the present disclosure.

FIG. 2C illustrates an example user interface of the map system in which various objects are displayed, according to an embodiment of the present disclosure. The user interface of FIG. 2C includes a map interface 214, an outlined object 216, and objectinformation box 114 indicating that the outlined objects 216 is called "Union Park." Various objects may be seen in the map interface 214 including, for example, roads, buildings, terrain, street lights (represented by a streetlight icon), railroads, hotels/motels (represented by a bed icon), and schools (represented by a parent-child icon), among other features.

Figure 3A:
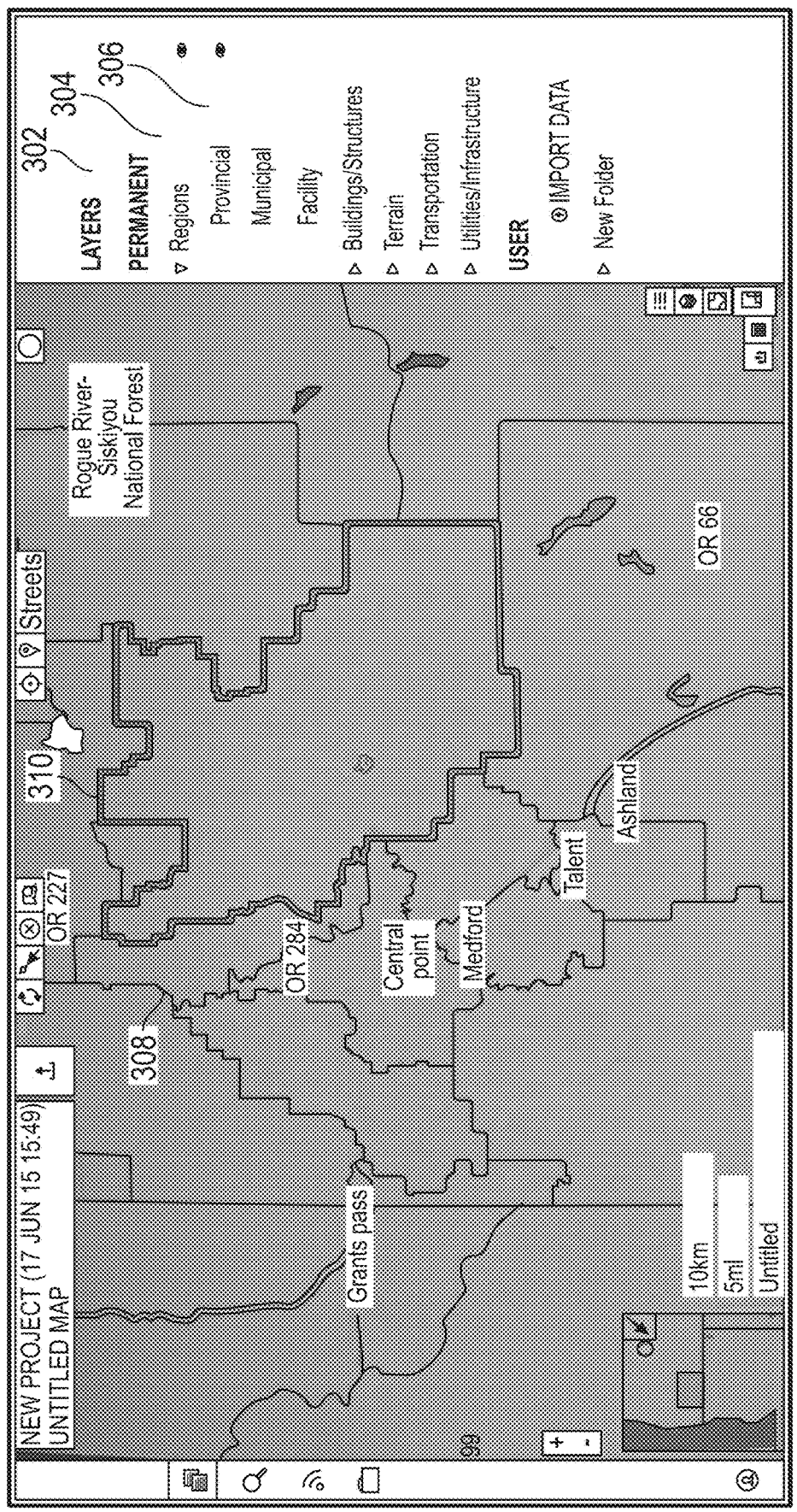
FIGS. 3A-3D illustrate additional user interfaces of the map system displaying different combinations of layers, in accordance with some embodiments.

FIGS. 3A-3D illustrate additional user interfaces of the map system displaying different combinations of layers, in accordance with some embodiments. For example, FIG. 3A illustrates an embodiment where a user, at a layer selection panel 302, has selected a "provincial" vector layer 306 under a "regions" category 304, causing borders 308 corresponding to provincial territories to be overlaid onto the map base layer. In some embodiments, vector layers may be divided between "permanent" layers, which may refer to layers comprising objects associated with the map at the server-side, and "user" layers, which may refer to layers comprising objects that have been imported by the user. Importing objects and features is described in greater detail below with reference to FIGS. 9A-9B.

In some embodiments, a user may be able to select layer objects (e.g., a province defined by a provincial border) by selecting (e.g., touches on a touchscreen, clicks on using a mouse cursor) a point on a border of a desired province. Selecting layer objects may cause the objects to become highlighted (e.g., as shown at 310). On the other hand, in some embodiments, if the user selects a point on the map within a province but not on a border, the user may then pan across the map interface (e.g., by dragging the mouse cursor in a desired direction). In some embodiments, how the user is able to select layer objects and manipulate the map interface (e.g., pan, zoom, and/or the like) may be based upon a type of object associated with a selected vector layer.

Figure 3B:

FIG. 3B illustrates an embodiment where a blank base layer has been selected, in accordance with some embodiments. A blank base layer may be useful in some instances to increase visual clarity when displaying one or more vector layers. For example, in the illustrated embodiment, the user has selected to display a transportation vector layer 312, causing objects such as roads and airports to be displayed on the map. In some embodiments, how an object is displayed in the vector layer may be based at least in part upon one or more object attributes. For example, a object corresponding to a road may be represented as a line, wherein the thickness of the line is associated with a width of the road or a type of road (e.g., an interstate highway may be represented by a thick line, while a residential street is represented by a thin line).

Figure 3C:
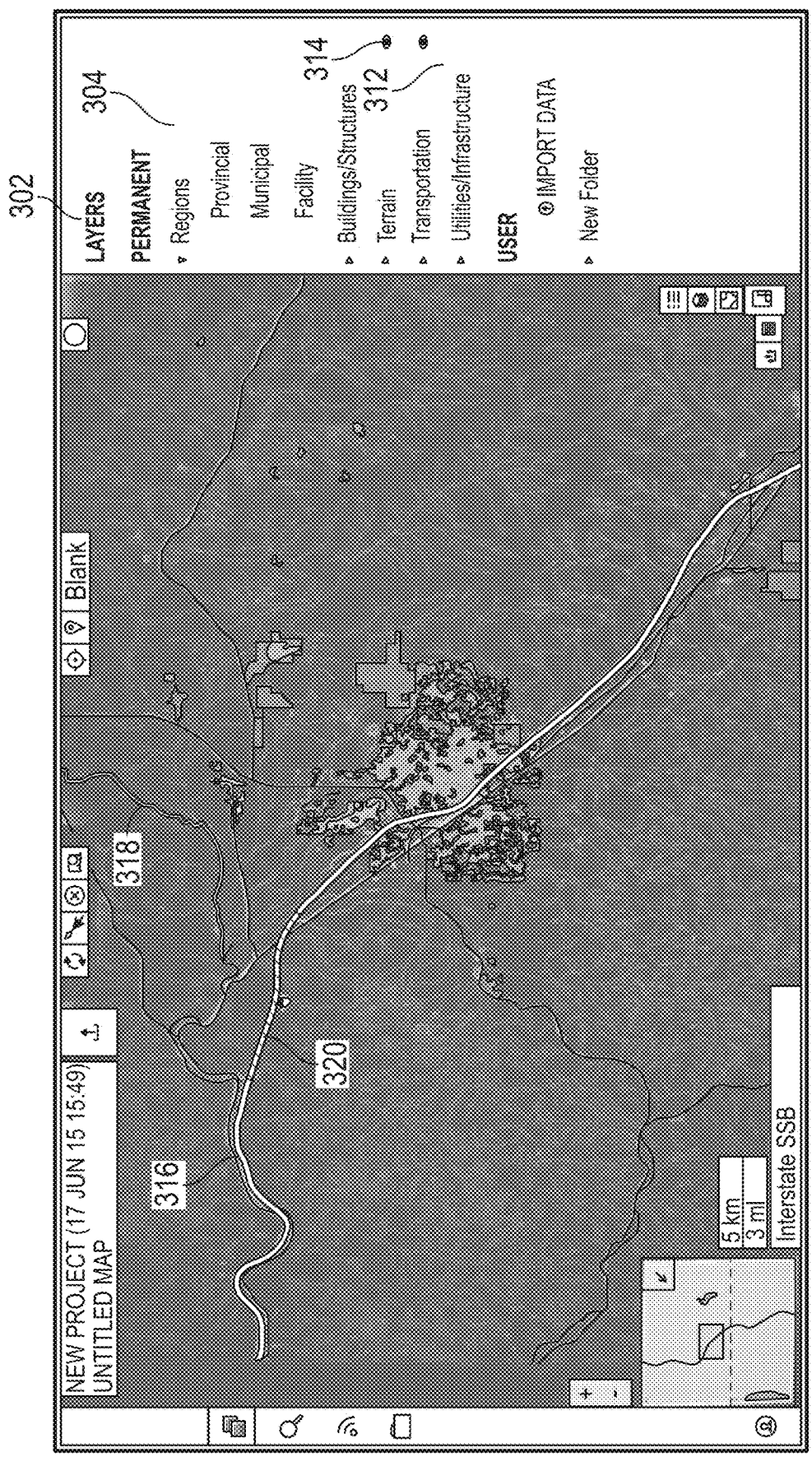

FIG. 3C illustrates an embodiment where the user has selected multiple vector layers to be displayed on a blank base layer. As illustrated in the figure, the user has selected a transportation vector layer 312 and a terrain vector layer 314. The objects associated with the transportation and terrain vector layers may be displayed using different symbols, shapes, and/or colors. For example, road objects in the transportation vector layer may be represented using yellow lines (e.g., at 316), while river objects in the terrain vector layer may be represented using blue lines (e.g., at 318).

In addition, highlighting (e.g., placing a cursor over an object) or selecting (e.g., clicking on an object) an object may change how the object is displayed. For example, in the illustrated embodiment, the user has placed a cursor over an object corresponding to a section of road 320 associated with the transportation vector layer, causing the section of road to be highlighted. Highlighting an object may comprise changing a color associated with how the objects is presented (e.g., changing the line color of the selected section of road from yellow to teal). In some embodiments, how an object is highlighted may also be based at least in part upon a thickness or dimension of the objects. For example, highlighting a road objects represented with a thin line may cause the object to be displayed using a thicker line, while highlighting a road objects represented with a thick line may cause no change in line thickness. In some embodiments, selecting an object may cause the same change in how the object is displayed when highlighted, while in other embodiments, selecting the object may cause a different change. In some embodiments, selecting an object can also cause a change in the view of the map (e.g., panning or zooming the map to show the selected object and surrounding area of the map).

Figure 3D:
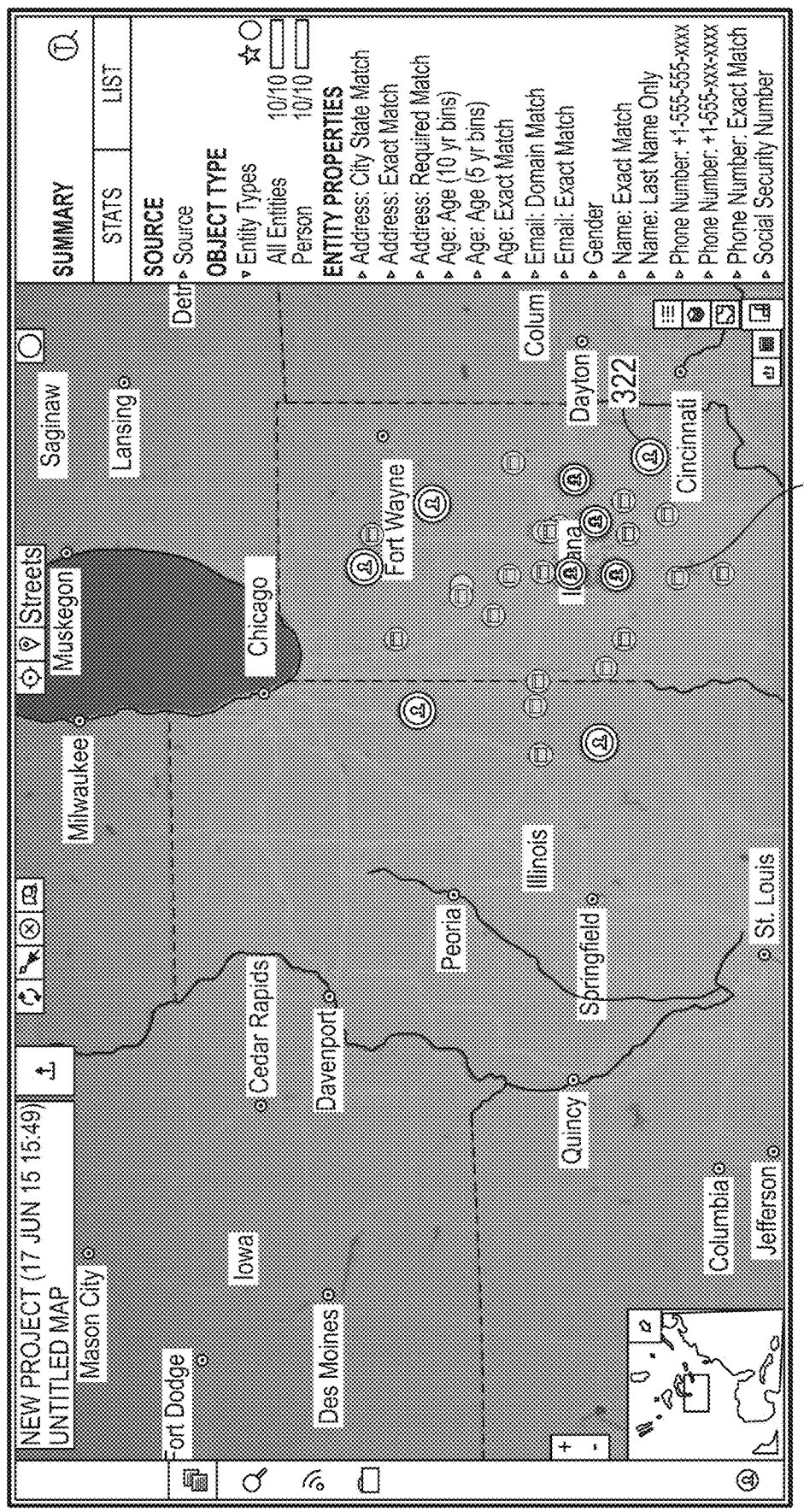

FIG. 3D illustrates a user interface of a map system where the user has selected multiple objects, in accordance with some embodiments. In the illustrated embodiments, objects may be represented using shapes or icons located at corresponding locations on the map. For example, an object corresponding to a person may be represented with a circular icon with a shape of a person inside (e.g., at 322). In some embodiments, selecting or highlighting a "person" object may cause the icon to change (e.g., a ring around the icon may change color in response to the icon being selected or highlighted).

In some embodiments, one or more objects 324 may be designated as inactive. Inactive objects, while still displayed on the map, are not able to be highlighted or selected. In some embodiments, a user may define one or more filters for a plurality of displayed objects, wherein objects that satisfy the filter conditions stay active, while object s that do not satisfy the filter conditions are made inactive. In some embodiments, an object may be indicated as inactive by the icon or shape used to represent the object being greyed out.

Search

Figure 4A:
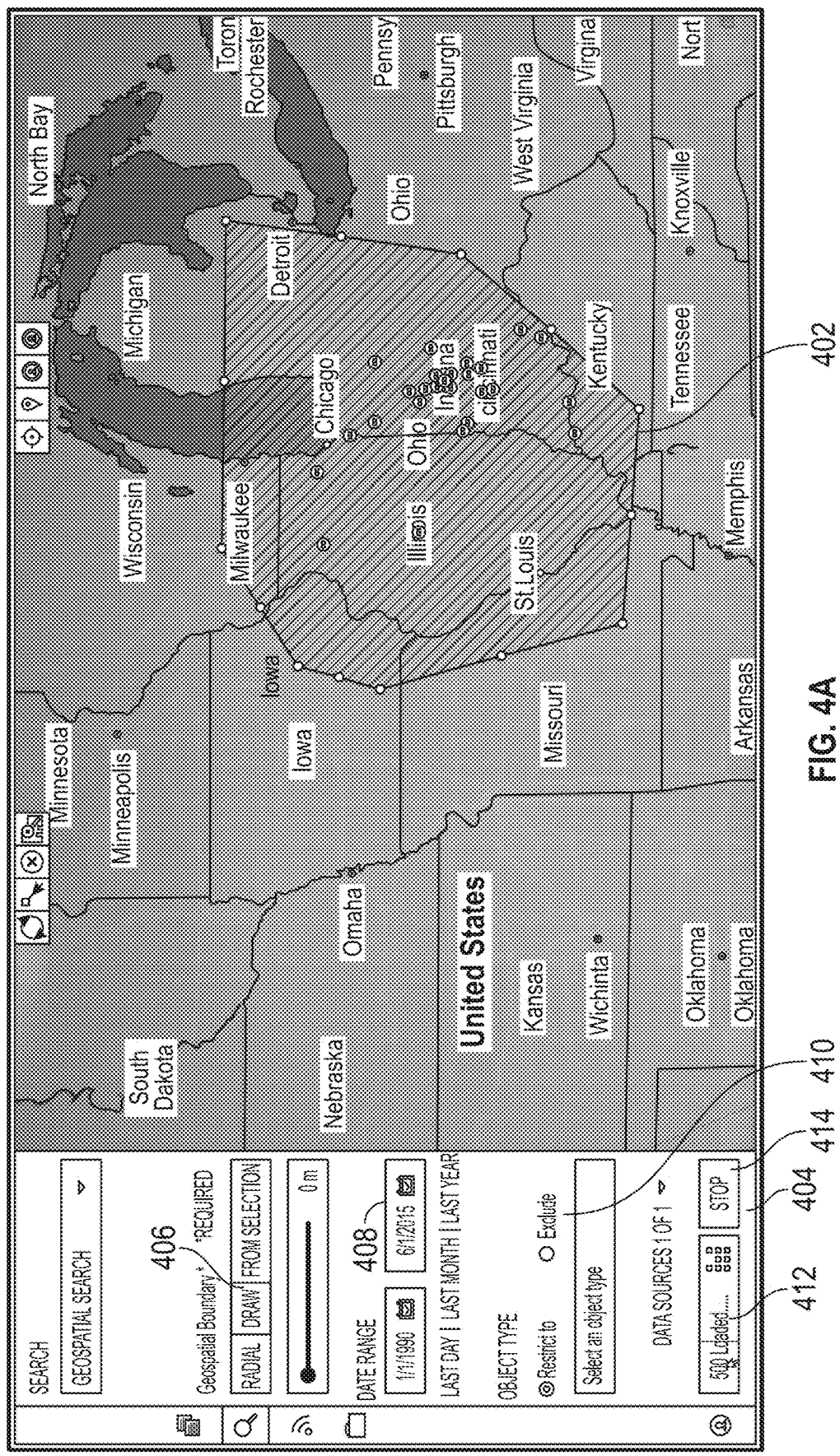
FIGS. 4A-4C performing a search in an interactive data object map system, in accordance with some embodiments.
Figure 4B:
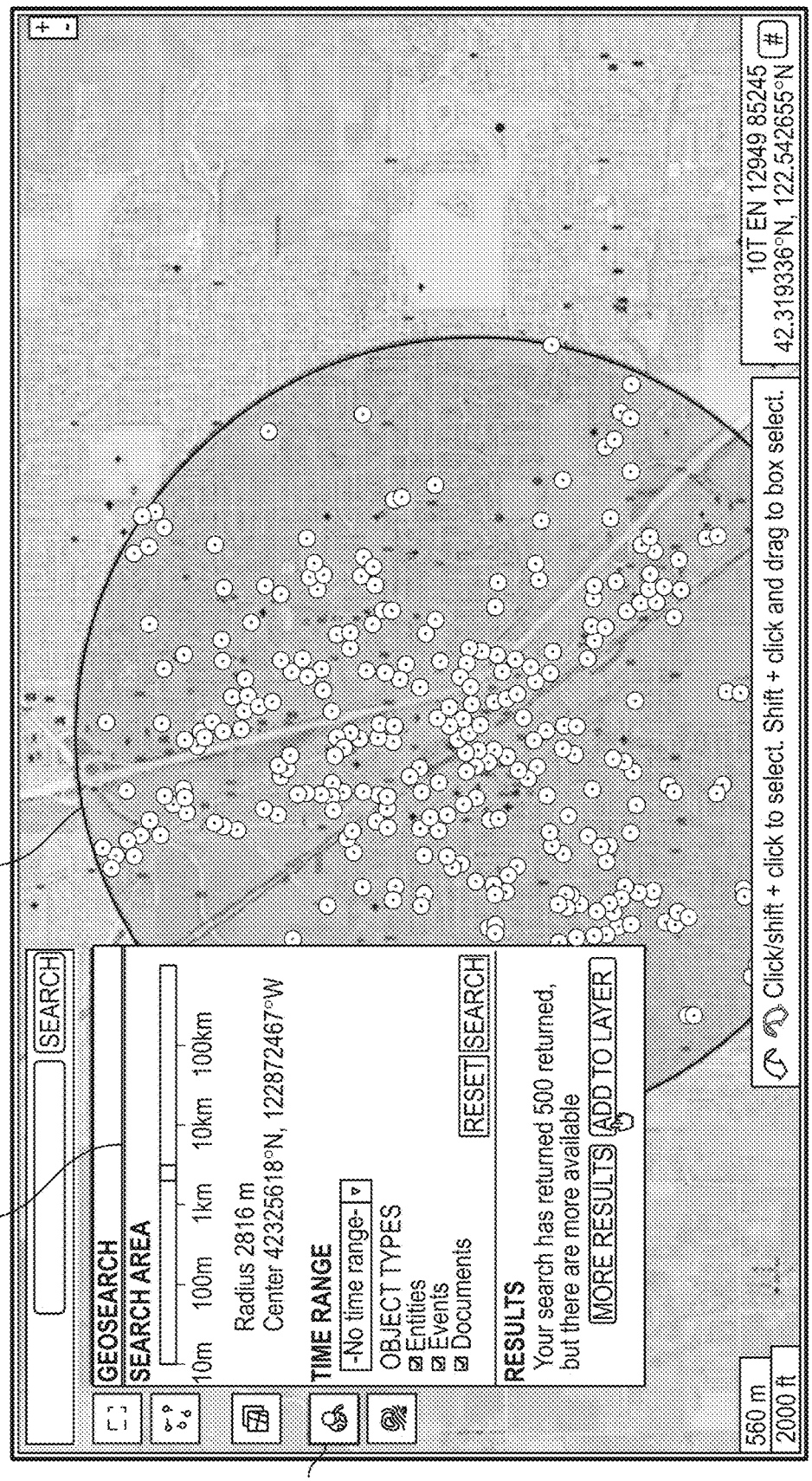
Figure 4C:
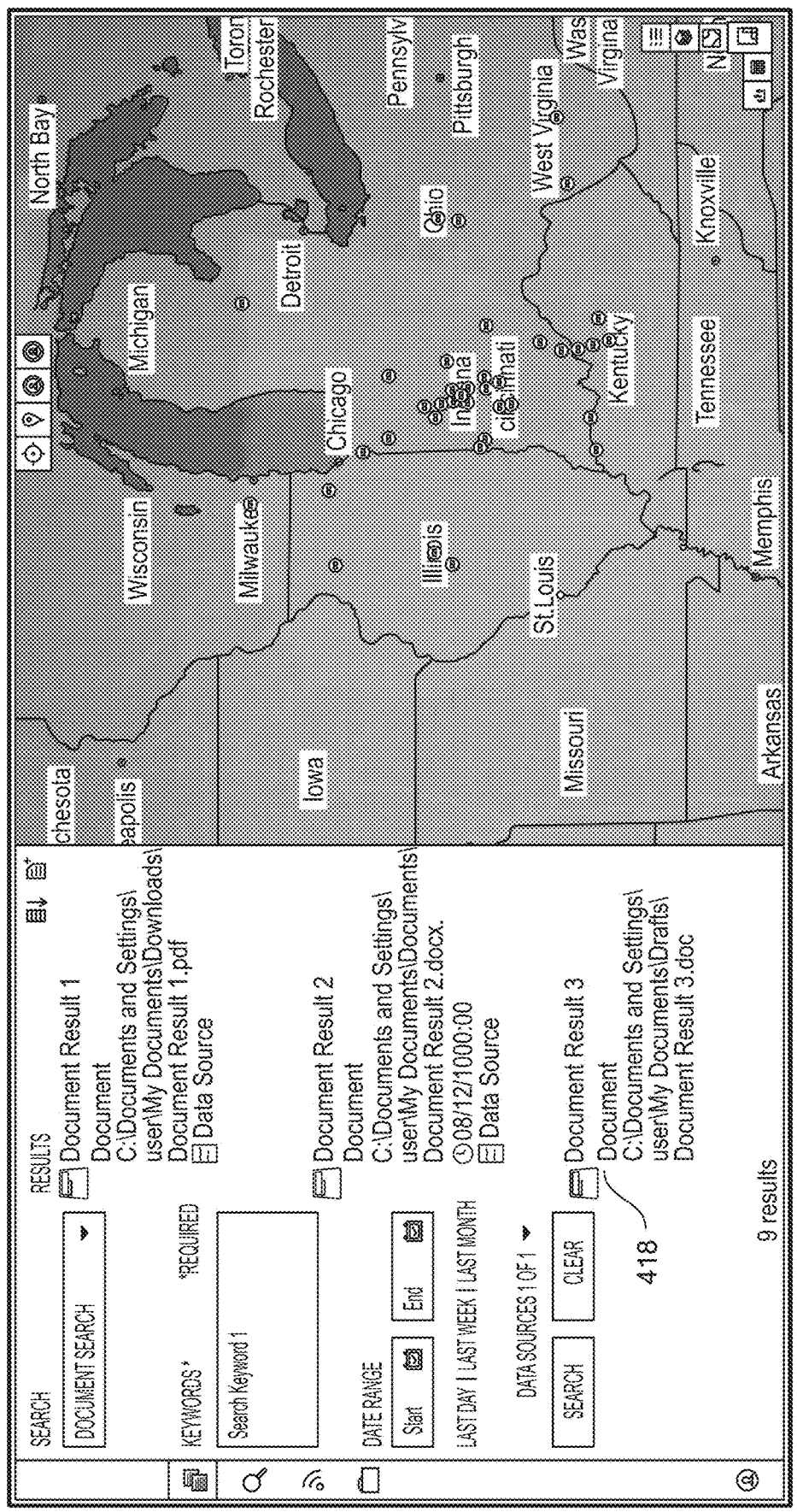

FIGS. 4A-4C illustrate performing a search in an interactive data object map system, in accordance with some embodiments. For example, as illustrated in FIG. 4A, the user has defined a plurality of points to form a polygonal search area 402, for the purpose of performing a geospatial search (or "geosearch"). In some embodiments, a geospatial search comprises a search through one or more databases of objects, and metadata associated with those objects, for any objects that meet the criteria of the search. For example, a geospatial search may search for any objects with geographic metadata and/or properties that indicate the object may be geographically within, for example, polygonal search area 402.

In some embodiments, the user may configure various parameters of the search using a search panel 404. For example, the user may, at 406, select from other types of geospatial searches that be performed corresponding to different ways for the user to specify the search area, such as a radial search, a search from an existing selection, and/or the like. For example, FIG. 4B illustrates a radial search, wherein the search area comprises a circular selection 416.

In some embodiments, additional parameters may be specified when performing a geographic search. For example, at 408, the user may specify a time range, restricting the returned search results to objects associated with a time value that falls within the specified range. The time range may be specified by an inputted start date and end date, or by a user selection of a time period based upon the current date (e.g., "last week," "last month," and/or the like). In some embodiments, the time may correspond to a time a object was created, a time a object was added to a database of data objects/features, a time a object was previously added to a vector layer, a time a object was last accessed by the map system and/or a user, a time an object was built, a time an object corresponding to an event occurred, and/or any combination of the foregoing.

In addition, at 410, the user may restrict the returned search results to certain types of objects and/or exclude certain types of objects from the search results. In some embodiments, other types of attributes and/or properties may also be used to restrict the search results. For example, in some embodiments, a geospatial search may only search for objects that are part of a currently displayed vector layer. In other embodiments, objects searched by the map system may include objects other than those shown on the map interface. For example, in an embodiment the map system may access one or more databases of objects (and object metadata) that may be unrelated to the objects currently shown in the map interface, or objects related to the currently selected vector layers. The databases accessed may include databases external to any database storing data associated with the map system.

In some embodiments, a particular map may be associated with hundreds of thousands or millions of objects. If the number of objects is sufficiently large, a search may take some time to perform. In addition, if a large number of search results are returned and displayed on the map, the map may become cluttered in difficult to read. As such, in some cases a user may wish to pause a search as it is in progress, due to the search taking too long, there being enough search results already displayed on the map, and/or the like. In some embodiments, a progress bar 412 may be displayed as the search is being executed. The progress bar 412 may display how many search results have been loaded, how many objects have been searched through, and/or the like. When the user feels that enough search results have been displayed, or if enough time as elapsed in the search, they may click on a stop button 414 or other interface element to stop the search before it has reached full completion. In some embodiments, search results may be displayed on the map as the search progresses. The results may be displayed as they are found, or on a periodic basis, wherein the period may be based upon a period of elapsed time, a number of search results found, and/or a number of data objects searched. In some embodiments, the search may pause periodically in order to allow the user to stop the search prematurely. In some embodiments, for the sake of visual clarity, the search may only display up to a predetermined number of results on the map, even if more search results have been found.

In some embodiments, other types of searches may be performed. For example, FIG. 4C illustrates a document search, in accordance with some embodiments. As objects are found by the search, they may be displayed in a results panel 418. In some embodiments, a map may be associated with objects that may not be associated with a location (e.g., documents). As such, objects not associated with a location may be displayed in the result panel 418, but will not be displayed on the map, while objects having associated location data may be displayed in both the result panel 418 and the map. In some embodiments, objects associated with a location may not be initially displayed on the map. However, the user may later drag objects that are associated with locations from results panel 418 to the map, where the dragged objects will be displayed at their corresponding locations on the map. In some embodiments, the user may be presented with a button or interface element to display all search results having associated location data on the map.

Heatmaps

Figure 5A:
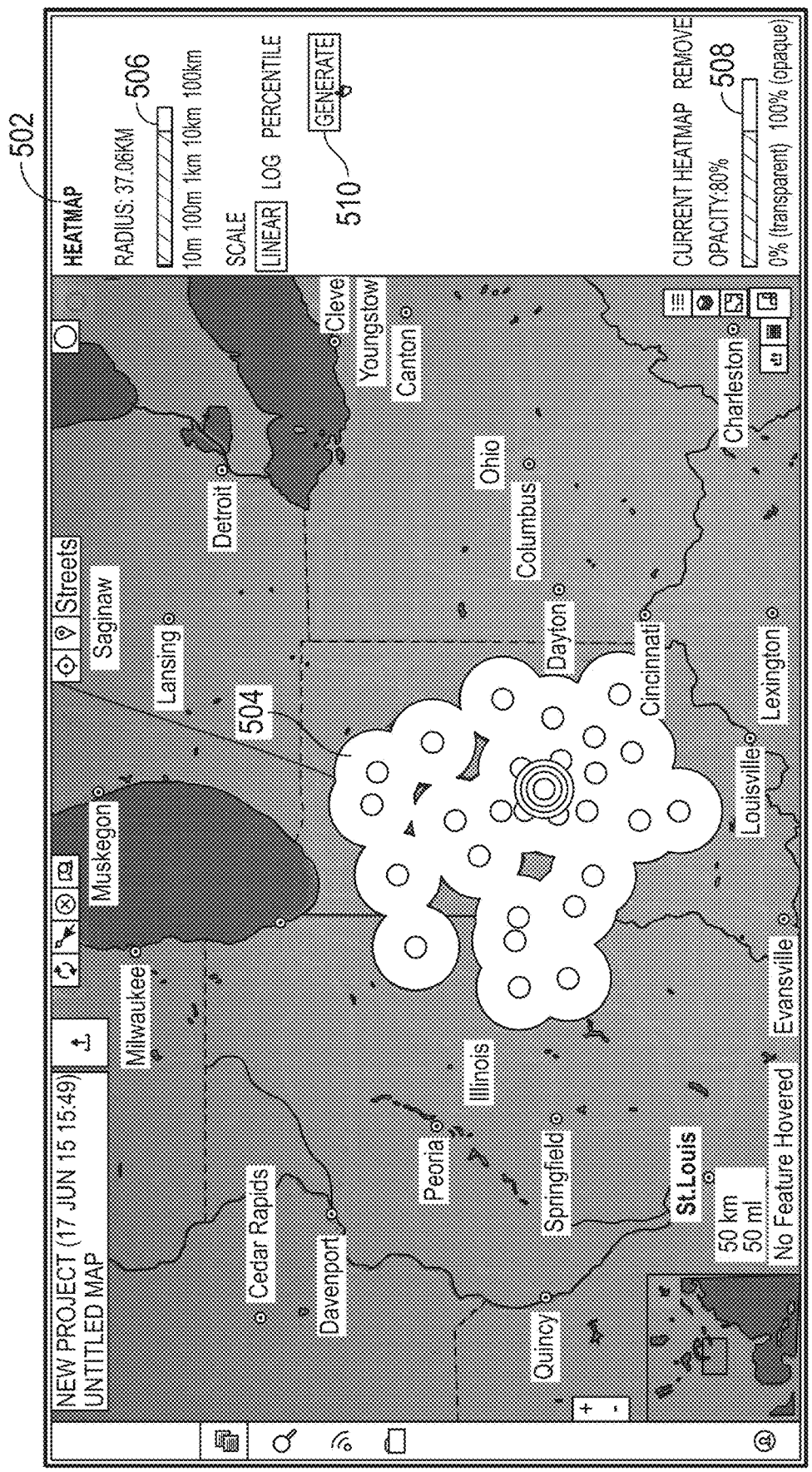
FIGS. 5A-5F illustrate example user interfaces of the map system in which a heatmap is displayed, according to embodiments of the present disclosure.

FIGS. 5A-5F illustrate example user interfaces of the map system in which a heatmap is displayed, according to embodiments of the present disclosure. In FIG. 5A, the user has created a heatmap 504 based on a plurality of displayed objects. A heatmap information window 502 is displayed in which the user may specify various parameters related to the generation of heatmap. For example, the user may adjust a radius of the circular heatmap related to each selected object at 506, an opacity of the heatmap at 508, a scale of the heatmap at 510, and/or other parameters. In some embodiments, a heatmap such as that illustrated in FIG. 5A may be referred to as a raster heatmap.

Figure 5B:

Heatmaps may be generated across maps of any size, using any number of objects, in order to more easily visualize attributes associated with large numbers of objects. For example, FIG. 5B illustrates a map comprising a large number of objects. As illustrated in the figure, the map may span across the entire United States and encompass thousands of different objects. As the number of objects increases, the readability and thus usefulness of a map may decrease. For example, as illustrated in FIG. 5B, portions of the map 512 may be so dense with objects that the icons representing the individual objects blend together, rendering the map virtually unreadable. In addition, it may not be possible to determine attribute values of the objects just by looking at the map.

Heatmaps can thus be used as a way to quickly visualize the attribute values of various objects displayed on a map. In some embodiments, in order to more clearly view how attribute values of objects vary by location, heatmap values may be aggregated based upon geographic regions or shapes (hereinafter also referred to as a "shape heatmap"). In some embodiments, shape heatmaps display data in coarser grain in comparison to raster heatmaps (as illustrated in FIG. 5A), but can allow a user to more clearly view how attribute values of objects differ over different geographic regions, and may take advantage of important geographic concepts (e.g., being able to view aggregate attribute values, such as sales, over different zip codes, provinces, and/or other region types). In some embodiments, a shape heatmap may be a choropleth map.

Figure 5C:
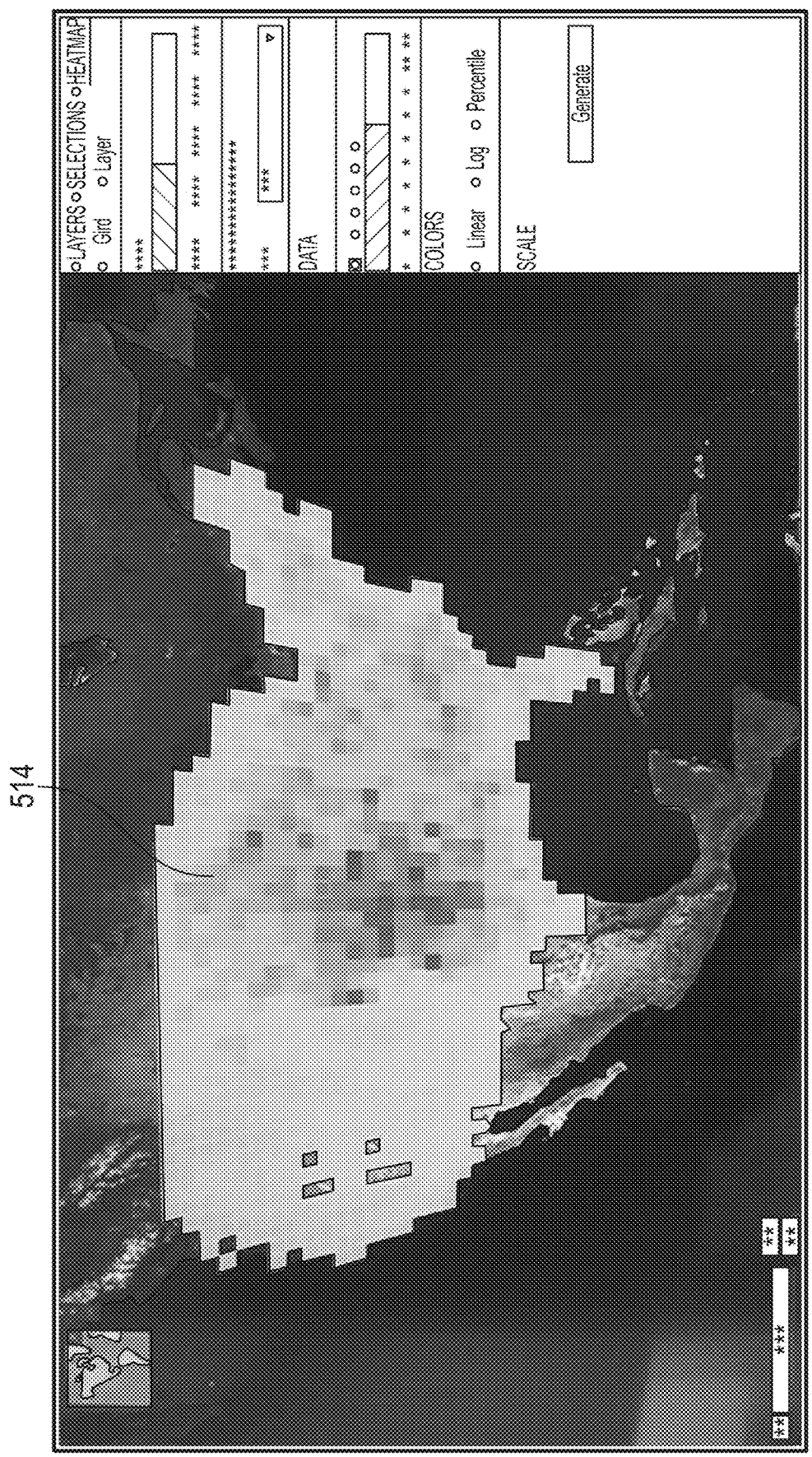

FIG. 5C illustrates a shape heatmap 514 using a grid format, in accordance with some embodiments. An area to be heatmapped may be divided using a rectangular grid comprising a plurality of rectangles (hereinafter also referred to as "shapes"). An aggregate heatmap value is calculated for each shape in the rectangular grid and mapped to a heatmap color. In some embodiments, calculating an aggregate heatmap value may comprise performing an aggregation of attribute values of all objects within the geographic region defined by the shape.

For example, a particular map may contain objects corresponding to rain events, wherein each rain event is associated with a rainfall attribute. In order to generate a grid heatmap based upon the rainfall attribute of the rain events, an aggregate rainfall value may be calculated for each shape within the grid (e.g., by calculating a sum of the rainfall attribute values of the rainfall events within each shape).

In some embodiments, an object may span multiple shapes. For example, a road object may run through multiple shapes in a rectangular grid. In such cases, the aggregation for a particular shape may be based upon only the portion of the object located within the shape (e.g., the length of the road within the shape). Alternatively, in some embodiments, a object that spans multiple shapes may be considered, for the purposes of generating a heatmap, to be part of the shape that contains a largest portion of the object. For example, a road object that runs through multiple shapes may be considered to be part of the shape that contains the greatest length of the road object. In some embodiments, a object that spans multiple shapes may be considered to be part of all of the shapes that it spans.

Figure 5D:
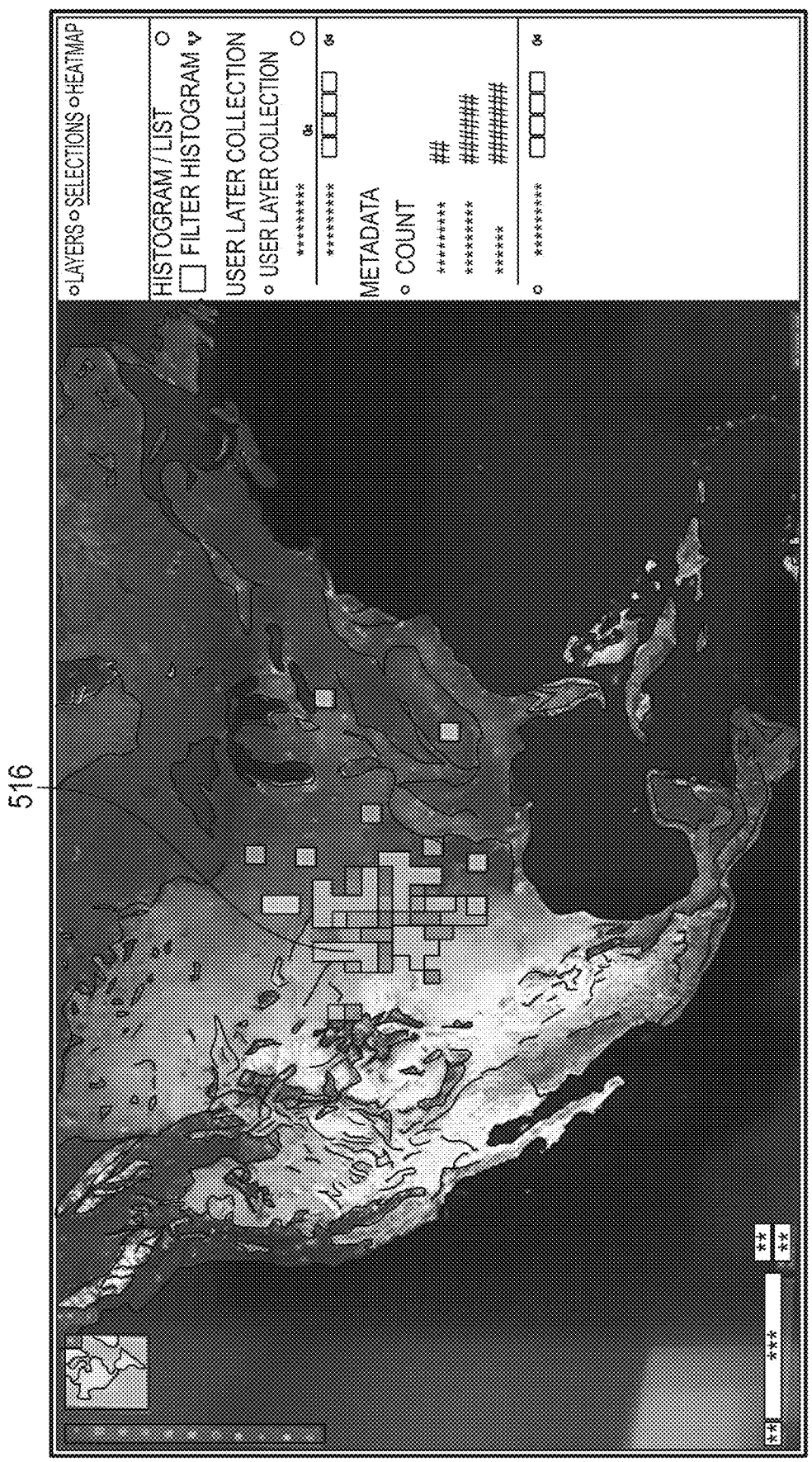

In some embodiments, a shape heatmap may be filtered in order focus and limit the heatmap data that is displayed. For example, FIG. 5D illustrates the shape heatmap 514 illustrated in FIG. 5C, wherein heatmap shapes having a heatmap value lower than a threshold value have been filtered out, resulting in a filtered heatmap 516. As such, a user will be able to quickly determine which geographic areas have a heatmap value satisfying one or more desired conditions. In some embodiments, the user may define one or more heatmap conditions using a displayed histogram (e.g., selecting one or more bars in a histogram showing a distribution of values over the attribute(s) upon which the heatmap is based). In some embodiments, the conditions may be implemented as a filter that can be activated and deactivated by the user (described in greater detail below), allowing the user to be able to quickly switch between the original heatmap and a filtered heatmap.

A filtered shape heatmap can be further used to retrieve underlying objects that satisfy certain criteria located in the filtered heatmap shapes. For example, a filtered heatmap may only show heatmap shapes having a heatmap value that satisfies a first criteria (e.g., heatmap shapes having a heatmap value meeting a first threshold value of rainfall). The original set of objects may be filtered to obtain all objects within the selected heatmap shapes satisfying a second criteria (e.g., rainfall events meeting a second threshold value of rainfall). As such, only objects meeting the second criteria within heatmap shapes that meet the first criteria are displayed.

In another example, filtering on a shape heatmap allows a user to aggregate on a particular attribute (e.g. find average home price per zip code region), filter to the regions with high or low aggregates (e.g. top 10% of zip code regions by average home price), and then use select-within-select to go back to the original set of objects (e.g. retrieve all home objects within zip code regions that have the top 10% average home price). This may result in a different set of objects compared to simply filtering for objects having high or low attributes (retrieving the top 10% of home objects by price).

In some embodiments, heatmaps may be generated based upon multiple attributes. Objects may be associated with a plurality of different attributes. For example, an object representing a road may have a width attribute and an average congestion attribute. These different attributes may be combined to form an aggregate attribute value, such as a ratio of the two attributes, which may be used for heatmap generation.

Figure 5E:
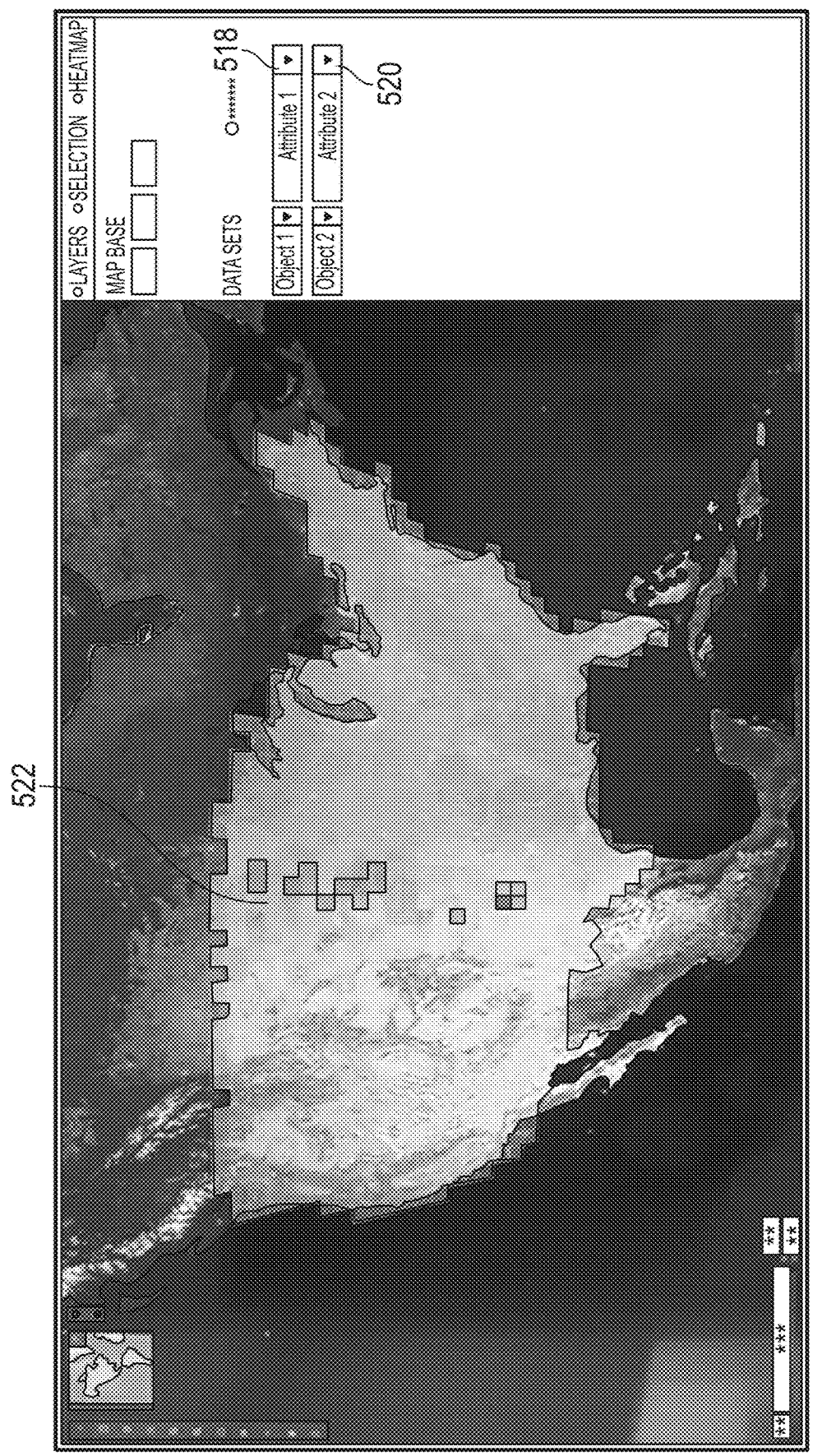

In some embodiments, a heatmap may be generated based upon a plurality of different attributes associated with different types of objects. For example, FIG. 5E illustrates a heatmap generated based upon an aggregate value generated using a plurality of different attributes, in accordance with some embodiments. As illustrated in the figure, a user may select a first attribute 518 of a first data set corresponding to a first type of object, and a second attribute 520 of a second data set corresponding to a second type of object. For example, the first attribute may comprise a rainfall value associated with rain event data objects, while the second attribute may comprise a claim amount associated with insurance claim data objects. In addition, an aggregation (e.g., a ratio) may be selected to be used to calculate an aggregate value of the first attribute and the second attribute. As such, a heatmap 522 may be generated based upon the aggregation of the first and second attributes within each shape in the grid. In some embodiments, the first and second attributes may be associated with the same type of object or with different types of objects. In addition, in some embodiments, any number of different attributes may be used to calculate the aggregate value.

As used herein, an aggregation may comprise any type of mathematical operation or combination of operations that may be performed on one or more attributes (e.g., counts, sums, ratio, products, maximum value, minimum value, media value, mode, and/or the like). In some embodiments, the user may define different types of aggregations to be performed between attributes in a set of attributes from which the aggregate value is generated. For example, in an embodiment, the user may define an aggregate value that comprises a ratio between a first attribute and a sum of a second attribute and a third attribute. In some embodiments, aggregations can also be performed on layers. For example, objects from a first layer may be aggregated to form objects to be displayed on a second layer. The attribute values of the objects on the second layer may comprise aggregations of attribute values of objects on the first layer. For example, in an embodiment, people objects can be aggregated to form family objects. In some embodiments, objects from multiple layers can be aggregated to form new objects on a new layer (e.g., objects from a first layer aggregated with objects from a second layer to form objects on a third layer).

In some embodiments, instead of a grid with rectangular shapes, a shape heatmap may be generated based upon a plurality of shapes based upon objects. Certain types of objects in the map system may cover a geographic area. These may comprise regions such as provinces (e.g., as illustrated in FIG. 3A), zip codes, geographic features (e.g., lakes), buildings (e.g., a building may be associated with a footprint), and/or the like. In some cases, by creating a heatmap based upon shapes associated with objects may provide more relevant data than simply using a rectangular grid with no consideration of geography.

Figure 5F:
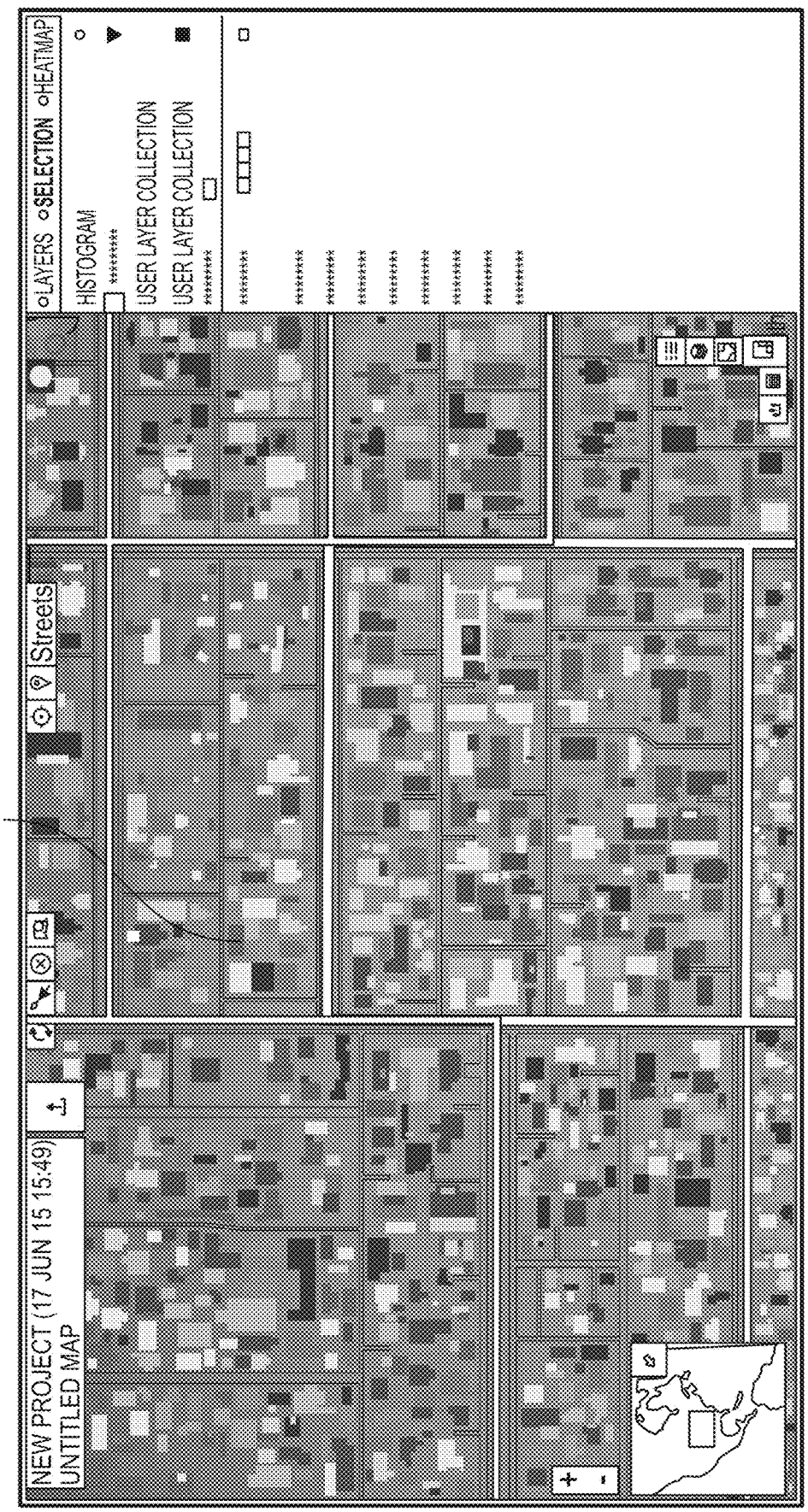

For example, FIG. 5F illustrates a shape heatmap 524 using object shapes, in accordance with some embodiments. In the illustrated embodiment, the map includes a plurality of objects representing buildings. Each building may have a footprint covering an area of the map. The footprint of each building object may be used as a shape for which a heatmap value may be determined.

In some embodiments, generating the shape heatmap comprises calculating an intersection between the selected shapes (e.g., building footprints) and the objects associated with the attribute to be heatmapped (e.g., rainfall events associated with a rainfall attribute). The objects that are located within each shape may then be used to calculate an aggregate heatmap value for the shape.

Figure 6:
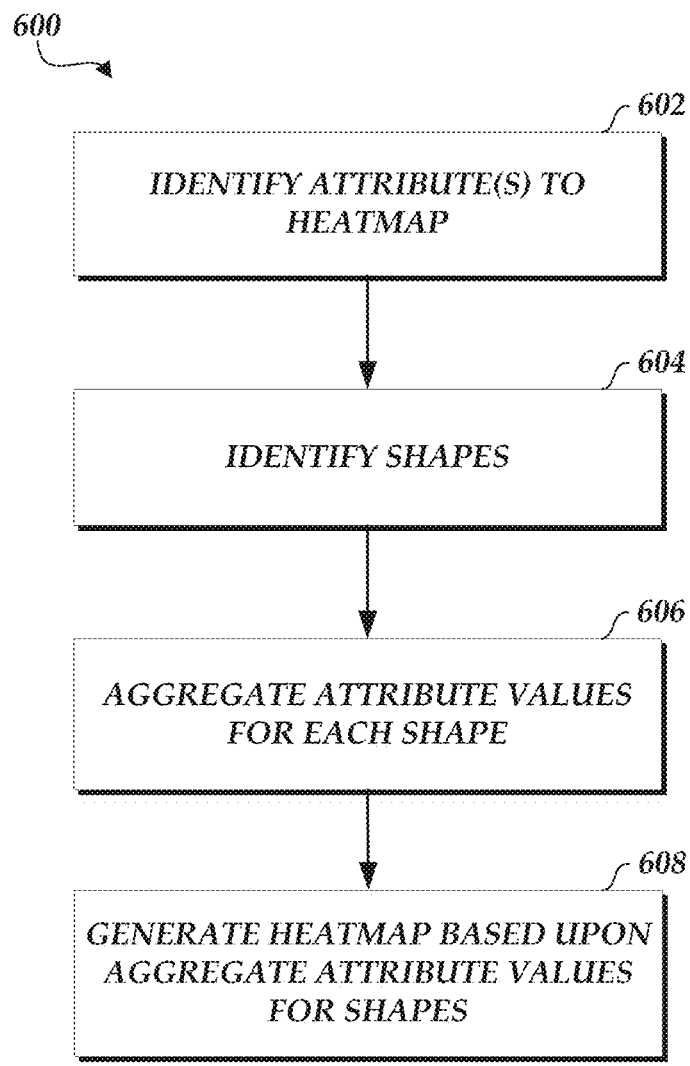
FIG. 6 illustrates a flowchart of a process for creating a heatmap, in accordance with some embodiments.

FIG. 6 illustrates a flowchart of a process 600 for creating a heatmap, in accordance with some embodiments. At block 602, an attribute to heatmap is identified. The attribute may correspond to an attribute associated with one or more objects. In some embodiments, the attribute may correspond to a combination or aggregation of two or more different attributes, wherein the two or more attributes may be associated with the same type of object or with different types of objects.

At block 604, one or more shapes may be identified. In some embodiments, the shapes may be defined by a rectangular grid overlaid on the map. In other embodiments, the shapes may be defined by one or more objects or object types. For example, a user may specify a type of object represented by an area on the map from which the shapes may be defined. These may include borders (e.g., state borders, regional borders), footprints (e.g., building footprints), and/or the like. In some embodiments, the shapes may directly border each other to cover a continuous area on the map. In other embodiments, such as with building footprints, there may be empty space between different shapes.

At block 606, attribute values are aggregated for each shape. In some embodiments, an intersection between the shapes and the locations of the objects associated with an attribute value for the identified attribute is calculated, in order to determine which objects fall within the shapes. The attribute values of the objects within the shape may be combined or aggregated to calculate an aggregate attribute value for the shape. In some embodiments, wherein the attribute may correspond to a combination or aggregation of two or more different attributes, objects within the shape associated with each attribute may be identified and aggregated. The aggregation may comprise any type of mathematical operation or combination of operations. For example, an aggregated attribute value for a particular shape may comprise an aggregation of a first value corresponding to an aggregation of values associated with a first attribute within the shape and a second value corresponding to an aggregation of values associated with a second attribute within the shape.

At block 608, a heatmap is generated based upon the aggregate attribute values for the shapes. For example, the aggregate attribute value for each shape may be mapped to a heatmap color. Each shape is filled with the heatmap color to generate the heatmap.

Drag and Drop

In some embodiments, a user may wish to view more than one map, or be able to analyze object data using different software applications (e.g., a chart application for creating one or more charts based upon attribute data associated with selected objects). For example, a user may view a first map associated with a first set of objects, and a second map associated with a second set of objects. The two different maps may be open in different software application windows (e.g., in an operating system environment). In some embodiments, an interactive data object map system may be implemented as a web application, wherein the user accesses the system through a web browser (e.g., Internet Explorer, Google Chrome, Mozilla Firefox, and/or the like). The user may have a first map open in a first tab or window, and a second map open in a second tab or window. In some embodiments, the user may view a first map in a first software application window or tab, and a second, different application in a second software application window or tab.

In some cases, a user may wish to be able to copy data selected objects from one map to another (e.g., in order to view certain data objects associated with the first map concurrently with data objects associated with the second map), or to another application (e.g., a chart creation application for creating one or more charts based upon attributes of the selected objects). It would be convenient for a user to be able to select the desired objects in the first map, and then drag and drop the selected objects into the second map or application, such that the selected objects will be displayed in the second map or processed by the application.

Figure 7A:
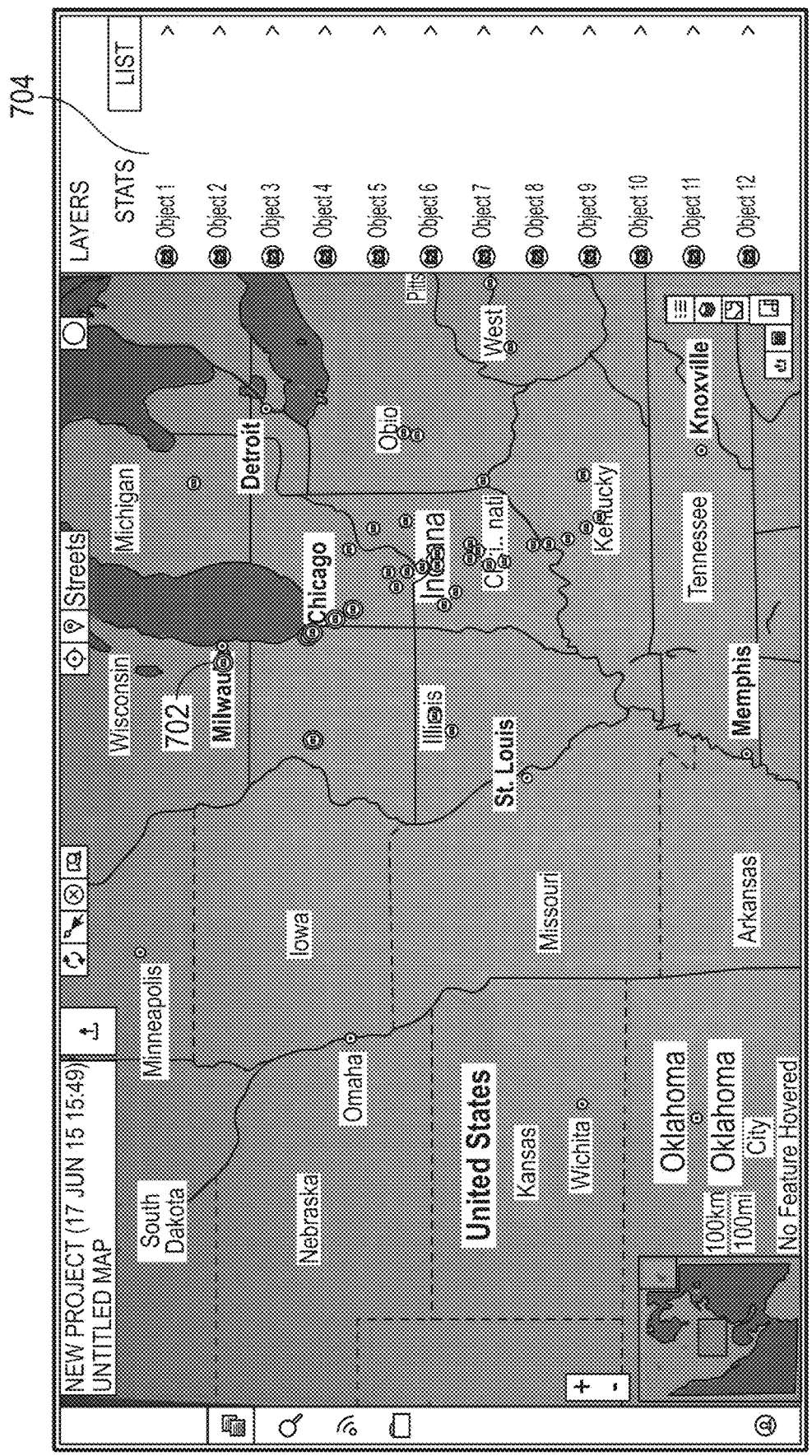
FIGS. 7A-7B illustrate a drag and drop operation being performed on data objects in a map system, in accordance with some embodiments.
Figure 7B:
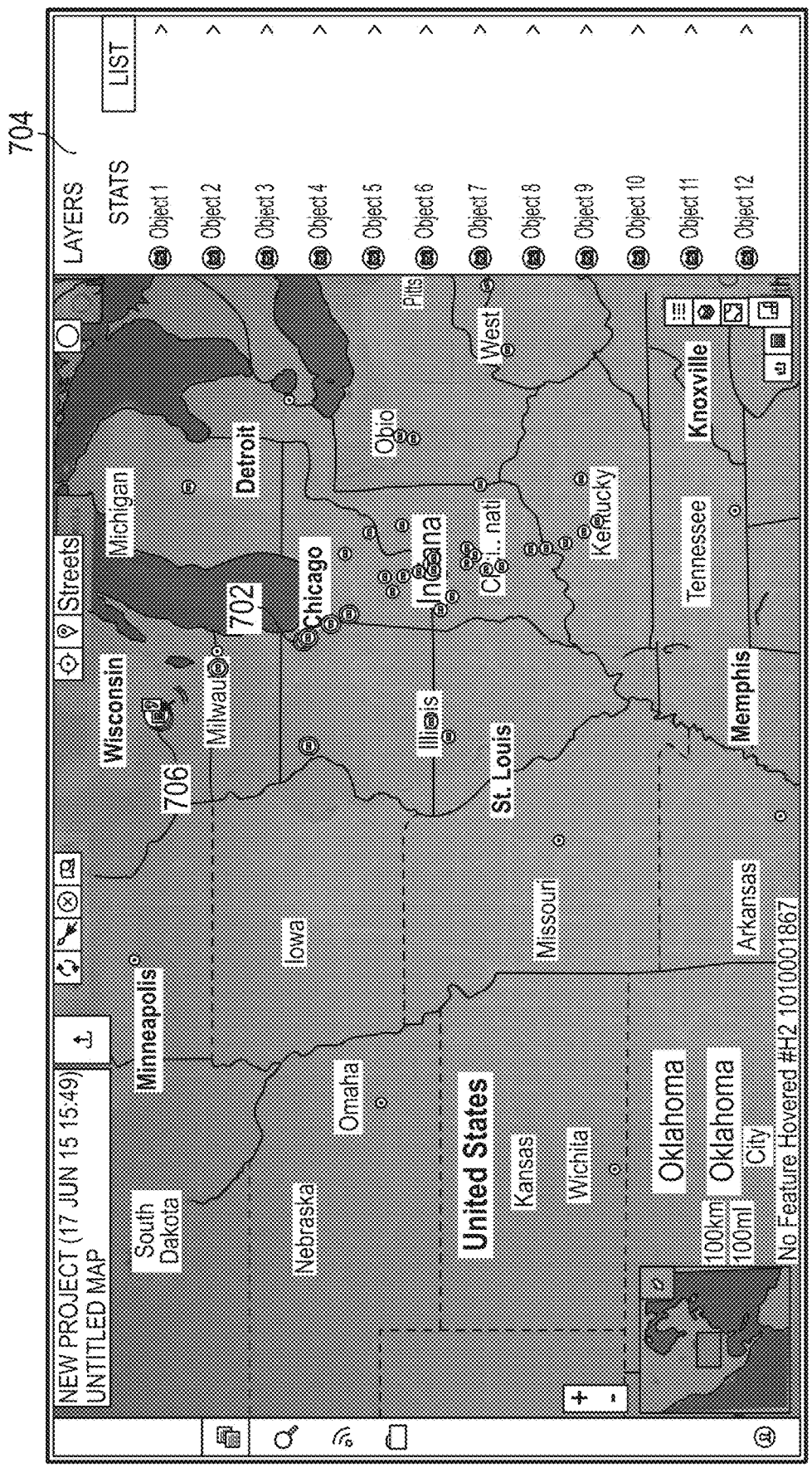

FIGS. 7A-7B illustrate a drag and drop operation being performed on data objects in a map system, in accordance with some embodiments. As illustrated in FIG. 7A, a plurality of objects are displayed in the map. In some embodiments, the objects may have been displayed in response to the user selecting a vector layer associated with the objects. Alternatively, the objects may have been displayed in response to a user search.

The user may select at least a portion of the displayed objects. For example, FIG. 7A illustrates objects 702 being selected by the user, as indicated by a ring around the icons representing the data objects changing to a different color. In some embodiments, the user may select the objects by selecting an area of the map in which the objects are located (e.g., dragging over an area of the map with a mouse cursor). Alternatively, the user may have defined one or more filter or selection parameters, causing the objects satisfying the filter or selection parameters to be selected. In some embodiments, information on the selected objects may be displayed in a selection list 704.

FIG. 7B illustrates the user dragging the selected objects, in accordance with some embodiments. In some embodiments, as the user drags the selected objects 702, a composite icon 706 representing the objects may be displayed at a location corresponding to where the user is dragging the objects (e.g., at the location of a mouse pointer, or a touchscreen location being touched by the user). The composite icon may be shaped to indicate that a plurality of objects is included. For example, in the illustrated embodiment, the composite icon resembles a plurality of circular icons stacked on top of each other. In addition, the composite icon may include a number indicating the number of objects that have been selected. The user may drag and drop the composite icon onto another application window or another tab in a web browser associated with a second map or second application, in order to copy the selected items to the second map or second application. In some embodiments, the user may instead perform a copy and paste operation instead of a drag and drop.

However, for security reasons and/or due to technical constraints, web browsers and operating systems often restrict the type of data that may be communicated between different tabs and/or application windows. As such, it is often not possible to directly copy the objects from the first map to the second map or second application. Thus, in some embodiments, in order to be able to drag and drop objects between different maps or applications, when a drag and drop operation is detected, an ID string that may be passed between different tabs and/or windows may be generated that corresponds to the selected objects. In some embodiments a hash operation is performed on the selected objects in order to generate the ID string. The ID string may be mapped to the plurality of selected objects on the server side. For example, the server may maintain a mapping table keeping track of which ID strings are mapped to which objects or sets of objects.

The drag and drop operation will thus pass the ID string between the different tabs and/or windows. When the second map or application receives the ID string, it may access a server-side mapping to identify the plurality of objects that the received ID string corresponds to. Once the objects are identified, they may be placed on the second map by the server and displayed to the user at the client, or processed by the second application (e.g., attribute values of the received objects used to create a table or chart).

In some embodiments, if the user performs a copy and paste operation, the ID string is generated in response to the user performing a copy command. The ID string may then be stored on a clipboard on the client system. When the user selects a tab or application window associated with the second map or second application and performs a paste command, the ID string is retrieved from the clipboard and transmitted to the second map. The second map may then access the server-side mapping to identify the objects that are associated with the ID string.

Figure 8:
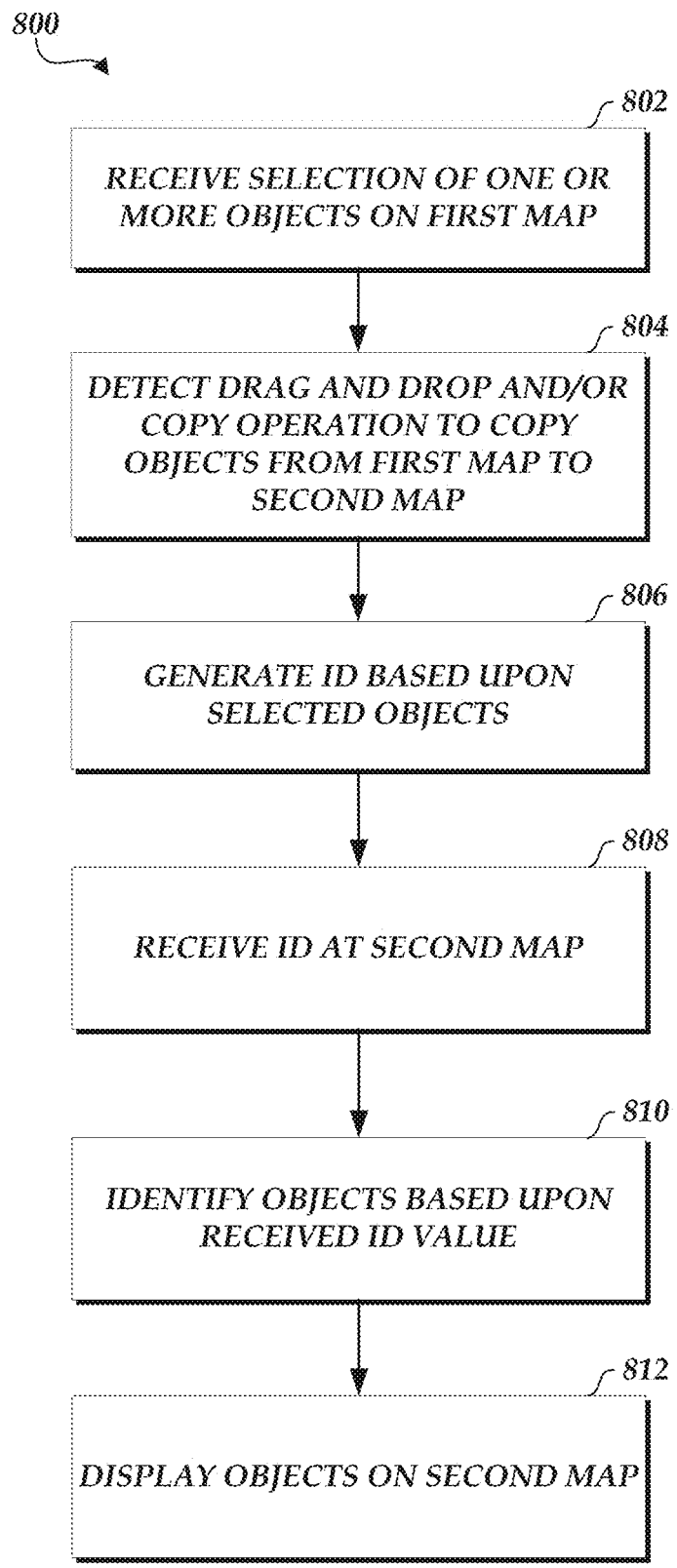
FIG. 8 illustrates a flowchart of a process for dragging and dropping data objects between different maps, in accordance with some embodiments.

FIG. 8 illustrates a flowchart of a process 800 for dragging and dropping data objects between different maps or applications, in accordance with some embodiments. At block 802, a selection of one or more objects on a first map displayed at the client is received. In some embodiments, the user at the client may select the objects may selecting over an area of the map where the objects are located. In some embodiments, the user may have defined one or more filters or other parameters to select the one or more objects. The selection of the one or more objects is communicated by the client to the server. In response, in some embodiments, the server may update one or more map tiles (e.g., highlight or provide some other visual effect over one or more icons corresponding to the selected objects), and transmit the updated map tiles to be displayed at the client. In addition, metadata associated with the selected objects may be retrieved and transmitted to the client.

At block 804, a drag and drop operation and/or copy operation to copy the selected objects from the first map to a second map or second application is detected at the client. In some embodiments, the operation is detected in response to the user clicking on (e.g., using a mouse cursor, a touch on a touchscreen, and/or the like) the selected objects and dragging them in a desired direction. In some embodiments, the operation is detected in response to the user specifying a copy command to be performed on the selected objects. The client may then notify the server that a drag and drop and/or copy operation has been initiated.

At block 806, the server, in response to receiving an indication of a drag and drop and/or copy operation, generates an ID based upon the selected objects. For example, in some embodiments, each object may be associated with an identifier. A hash function may be performed on the identifiers of the selected objects in order to produce the ID. The ID may then be mapped to the selected objects by the server. For example, the server may maintain a mapping table that keeps track of generated IDs and which sets of objects they are associated with. In some embodiments, the ID may comprise a string of a fixed length. In other embodiments, the ID may comprise a string of variable length. In some embodiments, the generated ID is transmitted from the server to the client. In some embodiments, the ID may be placed onto a clipboard on the client system.

At block 808, the generated ID is received by the second map or second application displayed at the client. In some embodiments, the ID may be received by the second map or second application in response to the user dragging the selected objects to a tab or window associated with the second map or second application, and dropping the selected objects (e.g., releasing a mouse cursor, removing a touch from a touch screen, and/or the like). In some embodiments, the ID may be received by the second map or second application in response to the user performing a paste command. In some embodiments, the ID is retrieved from a clipboard at the client and received by the second map or second application. Once the second map or second application has received the ID at the client, the received ID may be transmitted to the server.

At block 810, the server, upon receiving the ID received at the second map or second application, identifies one or more objects based upon the received ID. In some embodiments, the second map or second application accesses one or more mappings stored on the server (e.g., a mapping table) that map each ID to one or more corresponding objects. At block 812, the identified objects may then be displayed on the second map or processed by the second application. For example, the server, having identified the objects associated with the ID, generates one or more updated map tiles for the second map containing the identified data objects, which may then be transmitted to the client to be displayed as part of the second map. In addition, metadata associated with the objects may be retrieved and transmitted to the client.

Importing Data Objects

In some embodiments, a user may import objects from other sources to be displayed on a map. For example, a user may wish to import objects from one or more files, in order to compare those objects to those associated with a map.

Figure 9A:
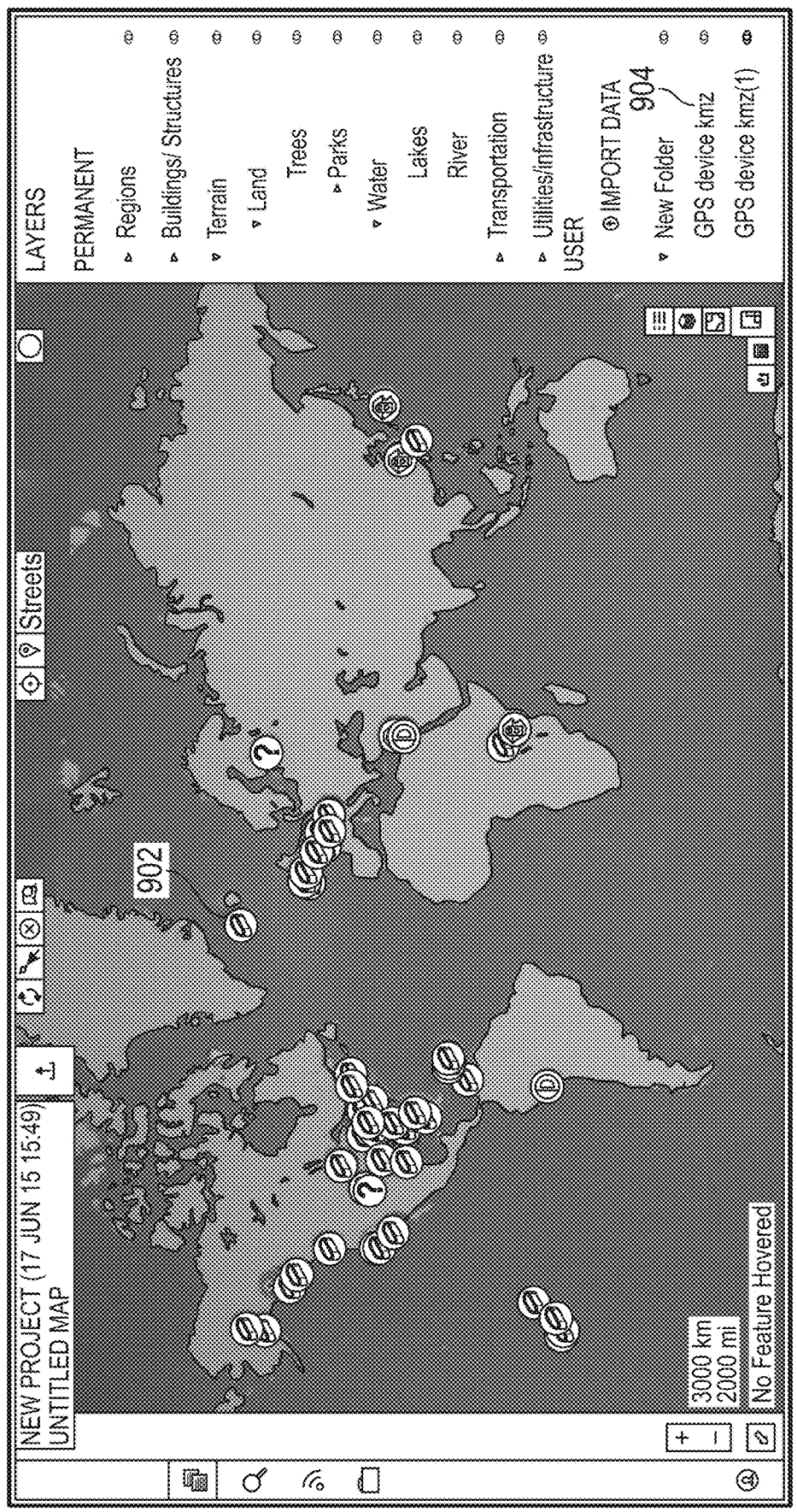
FIGS. 9A-9B illustrate importing data objects from other sources, in accordance with some embodiments.

FIG. 9A illustrates importing objects from other sources, in accordance with some embodiments. In some embodiments, the imported objects are imported from a file. The file specifies information regarding one or more objects, which may include map coordinates for the one or more objects, icons or shapes for the one or more objects (indicating how the objects will be displayed), and/or the like. For example, in the illustrated embodiment, one or more of the displayed objects 902 are represented using geocache icons. In some embodiments, imported objects 902 may be associated with one or more shapes, such as borders.

In some embodiments, objects imported from a file may be contained in their own layer 904, which may be referred to as a "user layer." In some embodiments, each imported file may have its own corresponding user layer. In some embodiments, user layers may be functionally similar to vector layers. For example, a user may toggle user layers on and off. The user may be able to organize and group different user layers into categories or folders (similar to as illustrated in FIG. 2B). User can also edit, add, or delete imported objects displayed on user layers.

Figure 9B:
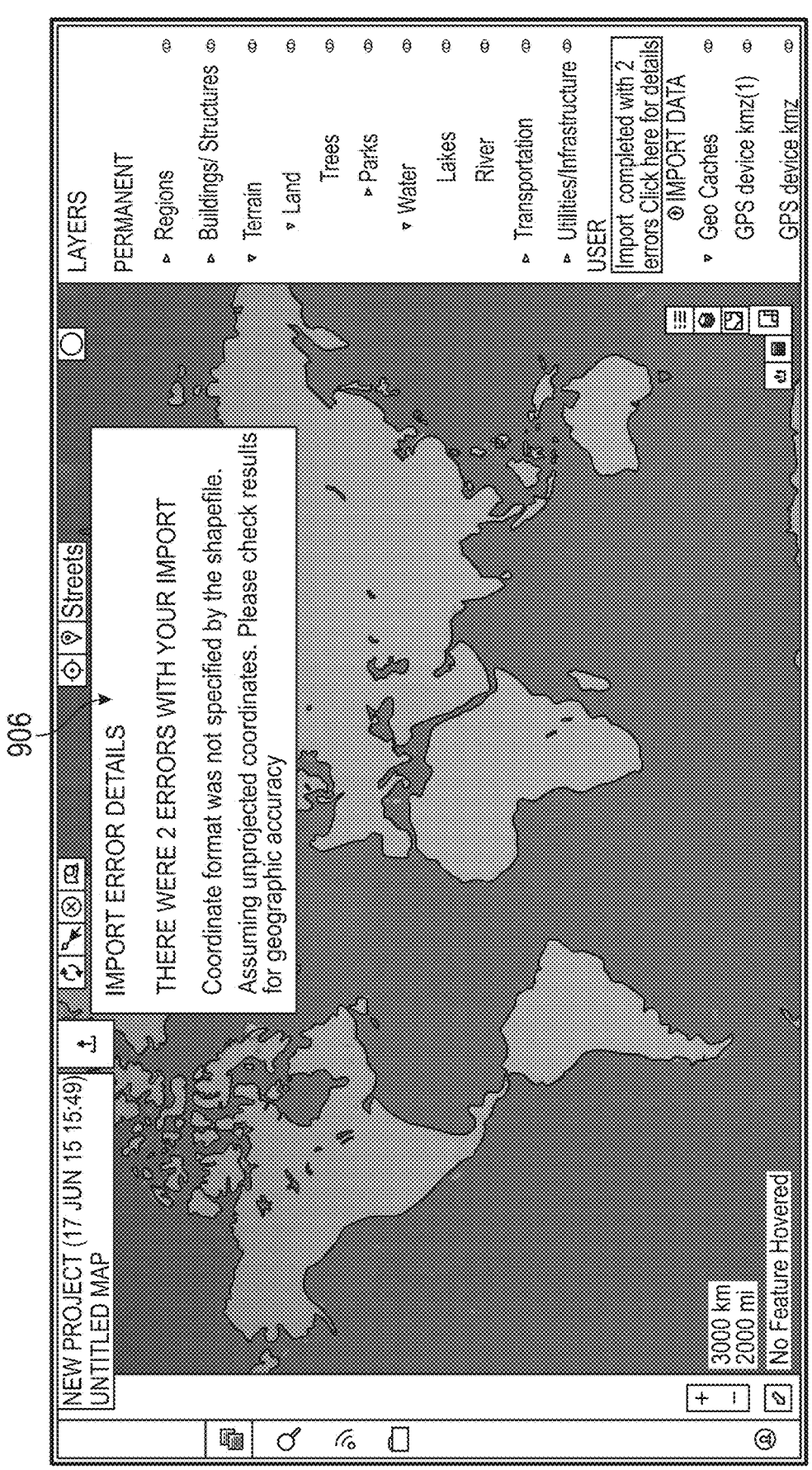

In some embodiments, different types of files containing object information may be imported. In addition, different types of coordinate systems may be used in different files to specify object locations or shapes. In some embodiments, a file may not specify the coordinate system that is used specify location data for the objects within the file. FIG. 9B illustrates an attempt to import a file that does not specify a coordinate system, in accordance with some embodiments. In some embodiments, if the file does not specify a coordinate system, a message or warning 906 informing the user may be displayed. In some embodiments, the user may then be able to select a coordinate system to be used.

In some embodiments, the system may also attempt to display the objects specified by the file using a default coordinate system. In some embodiments, the system may first check the coordinate values contained within the file against one or more allowed ranges associated with the default coordinate system. For example, a particular coordinate system may require that all coordinate values be between 0 and 180. If the coordinate values contained within a file contain values that are outside of this range, then it may be inferred that the file does not use that particular coordinate system. If it is determined that the coordinate values specified in the file do not use the default coordinate system, the system may attempt to display the data objects using a different coordinate system. The user may view the displayed objects, and choose to keep the coordinate system chosen by the system (e.g., default coordinate system), or specify a different coordinate system to be used.

Histograms and Filters

In some embodiments, various tools and functionalities may be provided to allow a user to better analyze displayed objects. For example, histograms may be used to allow the user to view how the displayed objects are distributed over different attribute values. In some embodiments, the user may also be able to define one or more filters based upon attribute values or attribute value ranges, allowing them to restrict the displayed objects to those deemed to be most relevant.

Figure 10A:
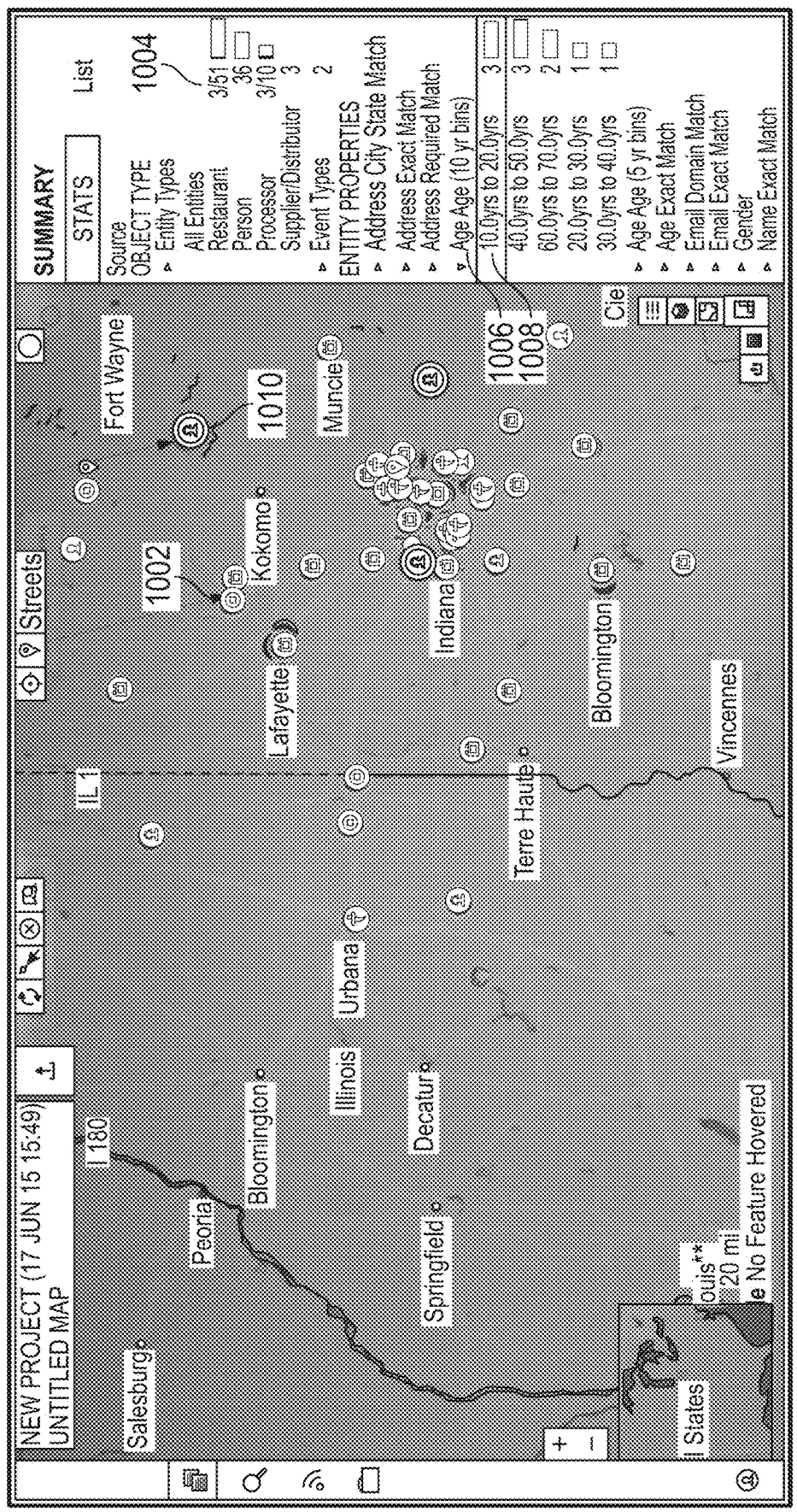
FIGS. 10A-10D illustrate the use of histograms and filters for selecting and displaying data objects, in accordance with some embodiments.

FIGS. 10A-10D illustrate the use of histograms and filters for selecting and displaying objects, in accordance with some embodiments. As illustrated in FIG. 10A, a map may display a plurality of different objects 1002 of different types and having different attributes. In some embodiments, a summary panel 1004 is displayed showing the types of objects that are displayed. In addition, summary panel 1004 may also display attributes associated with the displayed objects.

For each displayed attribute, the number of displayed objects having a particular attribute value or within a particular attribute value range may be displayed. For example, an age attribute 1006 may be divided into "bins" of 10 years each (e.g., a "10 yrs to 20 yrs" bin, a "20 yrs to 30 yrs" bin, and so forth). The number of displayed objects having an age attribute value that falls within each bin may be displayed next to their respective bins. In addition, in some embodiments a histogram bar may be displayed next to the numbers for each bin. In some embodiments, different bin sizes may be displayed for each attributes. In some embodiments, the user may be able to specify a desired bin size to be displayed.

In some embodiments, a user may select a particular attribute value or attribute value range. For example, as illustrated in FIG. 10A, the user as selected the range of "10 years to 20 years" of the "age" attribute at 1008. In response, the objects 1010 displayed on the map that match the selected attribute value or are associated with an attribute value falling within the selected range may be selected.

In addition, how the selected objects are distributed for other attributes displayed in summary panel 1004 may be shown. In some embodiments, this may comprise displaying a number next to each attribute value or attribute range bin for other displayed attributes, indicating a number of the selected objects that satisfy that attribute value or attribute value range. For example, the summary panel 1002 indicates that of the 51 displayed data objects 1002, 3 data objects 1010 satisfy the selected attribute value range, and all 3 are of the "person" type (out of a total of 10 objects of the "person" type). This allows the user to be able to quickly view how objects having a certain attributes values are distributed over other attributes.

In some embodiments, an object may be represented in a plurality of different histograms corresponding to attributes associated with the data object/feature. For example, an object of the "person" type may be associated with a "type" attribute, an "age" attribute, a "gender" attribute, and a "job" attribute. As such, the object may be represented in the histograms that correspond to the type, age, gender, and job attributes. If there are different types of selected objects having different attributes (e.g., the user has selected a plurality of "person" objects and a plurality of "restaurant" objects), the data objects may be represented in different histograms, depending upon which attributes they are associated with. For example, a selected "restaurant" object may not be associated with a "type" attribute but not a "job" attribute, and thus a restaurant object will not be represented in the histogram associated with the job attribute, but will be represented in the histogram associated with the type attribute. Additionally, objects of different types may be represented in a same histogram when the objects have the same types of attributes. For example, a "house" object and a "road" object, while different types of objects, may both be associated with a "city" or "location" attribute, and may thus be represented in the same histogram. However, the "house" object and the "road" object may, at the same time, have different types of attributes (e.g., "house" object has attribute "square feet," while "road" object has attribute "speed limit") such that the objects may be represented in different histograms.

Figure 10B:
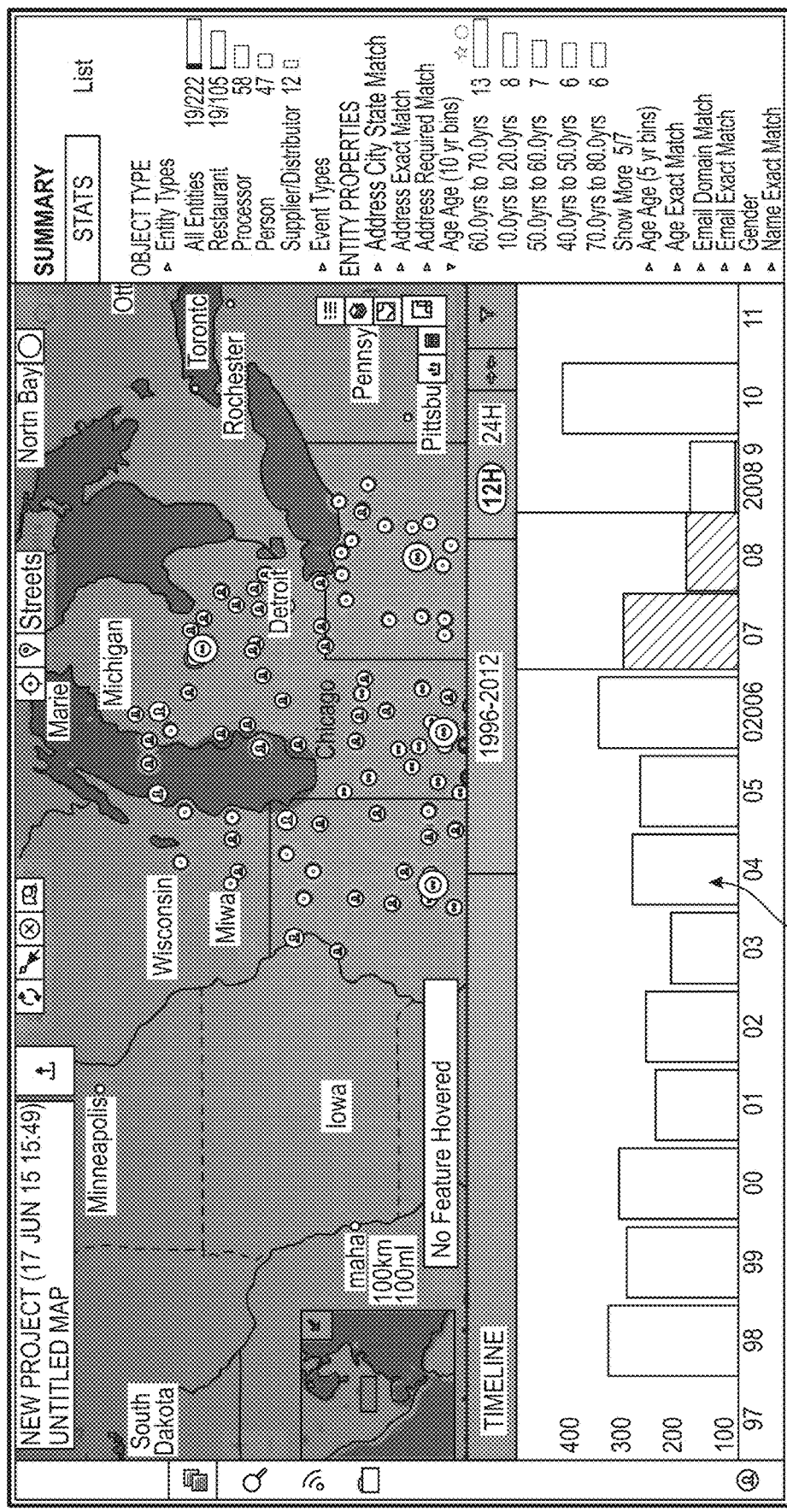

FIG. 10B illustrates objects displayed in conjunction with a timeline, in accordance with some embodiments. In some embodiments, certain types of objects may be associated with a time attribute. For example, a "restaurant" object may be associated with a time attribute value indicating when the restaurant was founded. Time attributes may also be associated with other object types, such as events.

In some embodiments, a timeline 1012 may be displayed indicating how the displayed objects are distributed over different time periods. In some embodiments, timeline 1012 functions similarly to a histogram as displayed in summary panel 1004. In some embodiments, the user may select objects that fall within a particular time range (e.g., by selecting one or more bars of the timeline). In addition, the selected bars of the timeline may be highlighted.

In some embodiments, a range covered by each bar in the timeline may automatically change as the user zooms in or out on the timeline. For example, the user may zoom in on the timeline such that each bar corresponds to a month. After selecting bars corresponding to one or more months, the user may then zoom back out such that each bar corresponds to a year. In some embodiments, if the user has selected one or more bars at a first zoom level (e.g., representing one or more months), and zooms out to a second zoom level (e.g., where the bars each represent a year), the highlighted bars at the first zoom level may be displayed using one or more partially highlighted bars at the second zoom level. In this way, the user may be able to quickly view a proportion of the number of objects associated with one or more selected time periods (e.g., the months of April and May) as compared to a number of objects associated with a second, longer time period (e.g., the entire year).

Figure 10C:
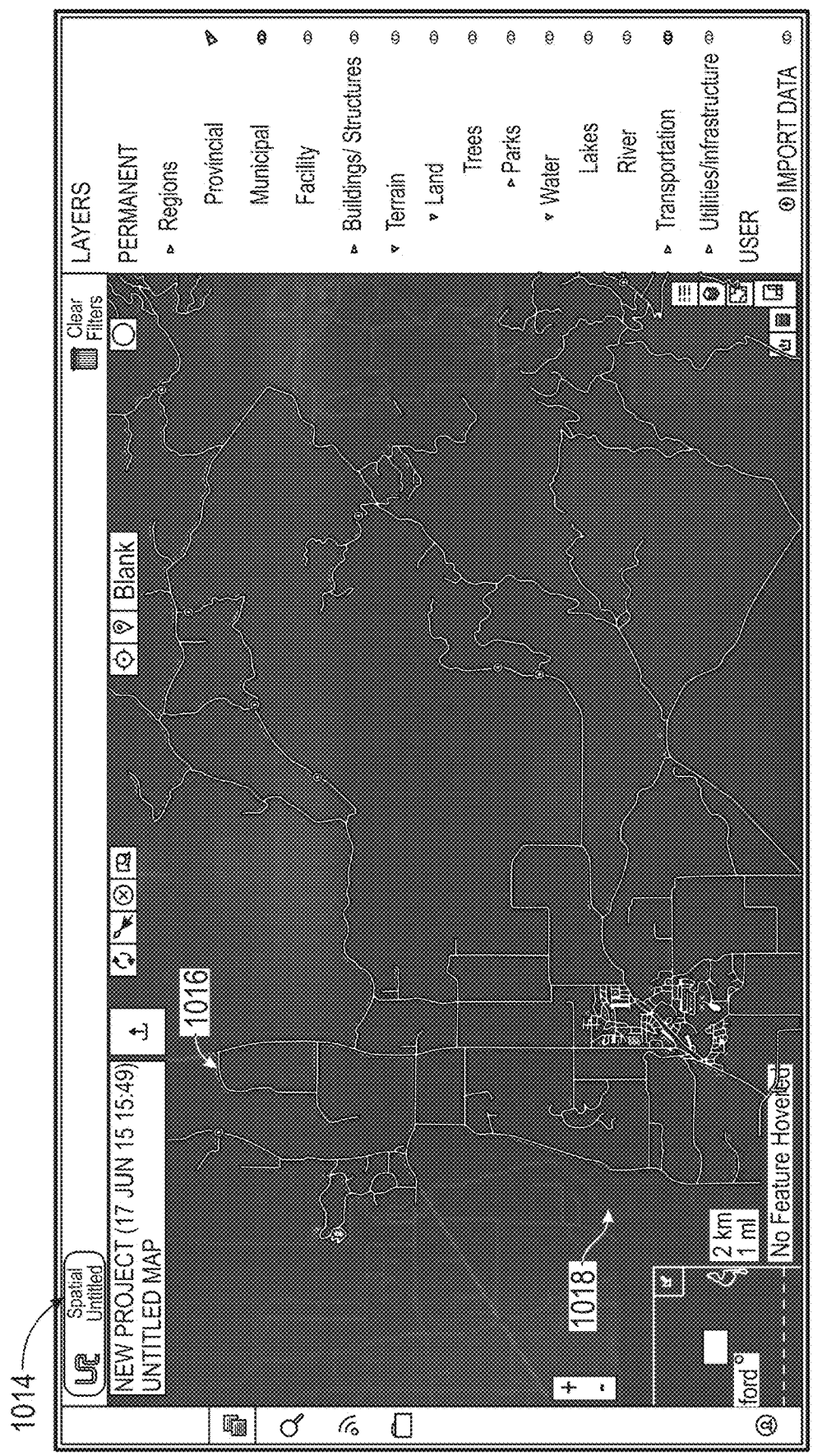

FIG. 10C illustrates restricted displayed objects using filters, in accordance with some embodiments. In the illustrated embodiment, a user has selected a provincial vector layer (displaying a plurality of provincial borders corresponding to province objects) and a transportation vector layer (displaying a plurality of road objects). In some embodiment, the user may wish to restrict the data displayed to data objects and features matching certain criteria. For example, the user may wish display only the road objects that are within the borders of a selected province.

In some embodiments, the user may perform a search to display the desired objects. Alternatively, the user may select objects that do not satisfy the desired parameters and remove them from the map, leaving only the desired objects. However, these methods may make it difficult for the user to revisit previous data. For example, if the user has performed several selections within selections, the user may only be able to undo selections to view previous data in the reverse order that the selections were performed.

In some embodiments, the user may define a filter based upon the desired parameters (e.g., within the borders of a specified province), which may be displayed at 1014. Once the filter has been defined, objects 1016 that satisfy the filter criteria (e.g., roads within the selected province) are selected, while other objects 1018 (e.g., roads that are outside of the selected province) are made inactive.

In some embodiments, a user may define filters based upon any attribute or combination of attributes associated with the objects. For example, the user may define a filter by specifying one or more attribute values or attribute value ranges of one or more attributes associated with the displayed objects. In some embodiments, this may be done by selecting one or more attribute values or attribute values ranges of a displayed histogram associated with a desired filter attribute. For example, referring to FIG. 10A, a user may select the bar 1008 corresponding to the range "10 yrs to 20 yrs" in the histogram generated for the "Age" attribute 1006, in order to define a filter based upon that attribute value range. In some embodiments, the user may select one or more attribute values to be excluded from the filter (e.g., the filter may be configured to select all objects associated with any value of a particular attribute except for a specified set of attribute values).

In some embodiments, the desired attribute values or attribute value ranges used to construct the filter may be based at least in part upon an attribute of another object. For example, as described above, the user may define a filter that filters objects having a location attribute value that is within an area defined by another type of object (e.g., a province or region).

Figure 10D:
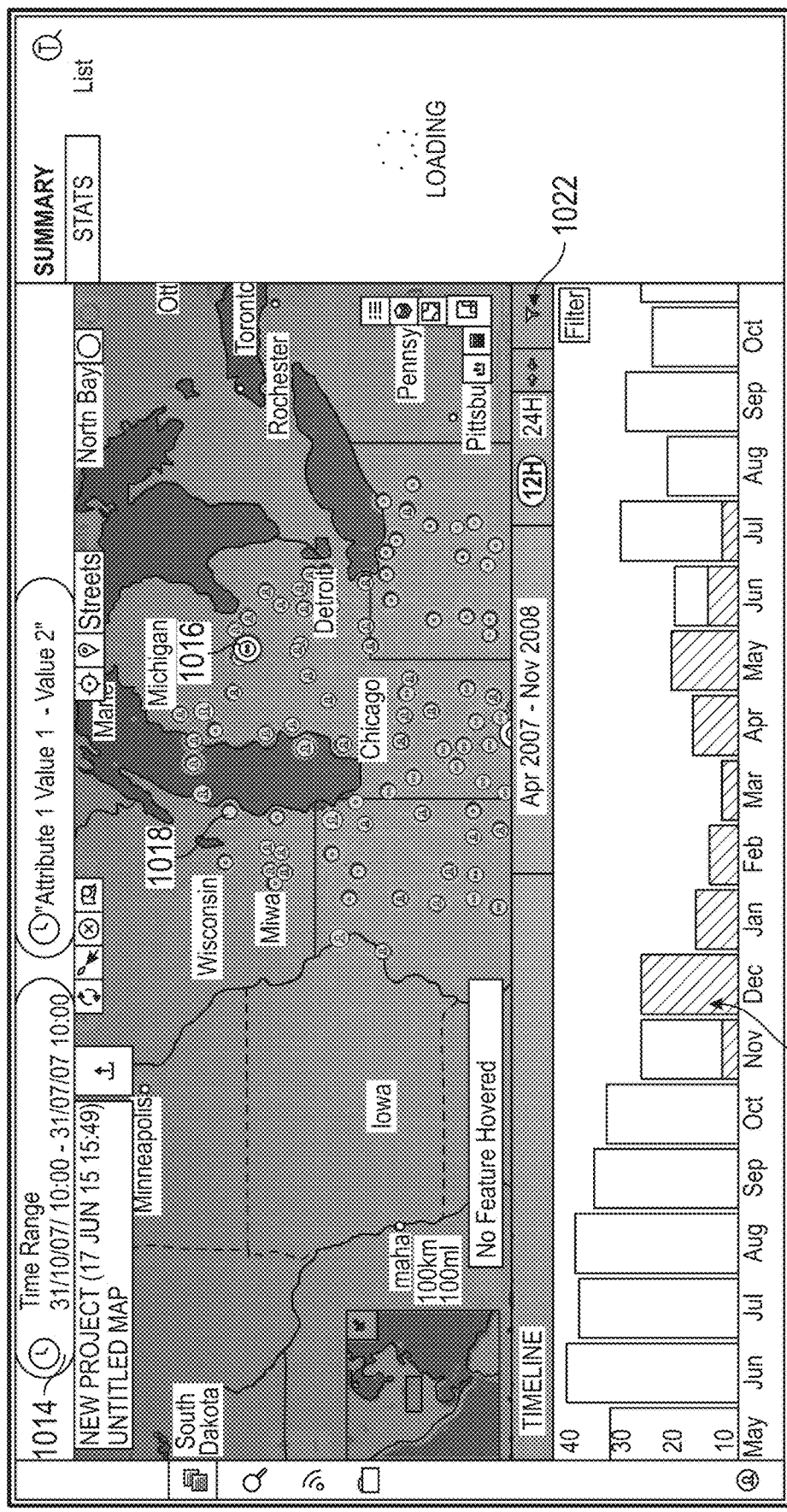

In some embodiments, the user may later switch the filter off by clicking on the filter at 1014 to deselect the filter, resulting in the inactive objects and features 1018 displayed on the map to become active again. In some embodiments, the user may create multiple filters, each defining a different set of filter criteria. Each filter may be displayed as a button or other interface element at 1014. For example, FIG. 10D illustrates a user interface where a user has created two different filters, which are displayed at 1014.

By clicking on the filters at 1014, the user may be able to switch each filter on and off independently. This allows the user to reorder and reapply the filters in any combination. For example, the user may define three different filters to view data objects that satisfy a first, a second, and a third filter parameter. The user may then turn off the second filter in order to view objects that satisfy the first and third filter parameters, without regard for the second filter parameter. At a later time, the user may turn the second filter back on, and turn off the first or third filters, in order to view another combination of objects.

In some embodiments, the user may create a filter by selecting a desired attribute value or attribute value range, and clicking on a filter button or other interface element. For example, in FIG. 10D, the user has selected a plurality of timeline bars 1020, indicating a desired time range. The user may then click on filter button 1022 in order to create the filter.

In some embodiments, a created filter may be applied on all displayed objects. In other embodiments, the filter may apply to a portion of the displayed objects (e.g., objects from the same search, objects on the same vector layer, and/or the like). For example, a filter for roads within a particular region may be applied to objects corresponding to roads, but not objects corresponding to regions.

Figure 11A:
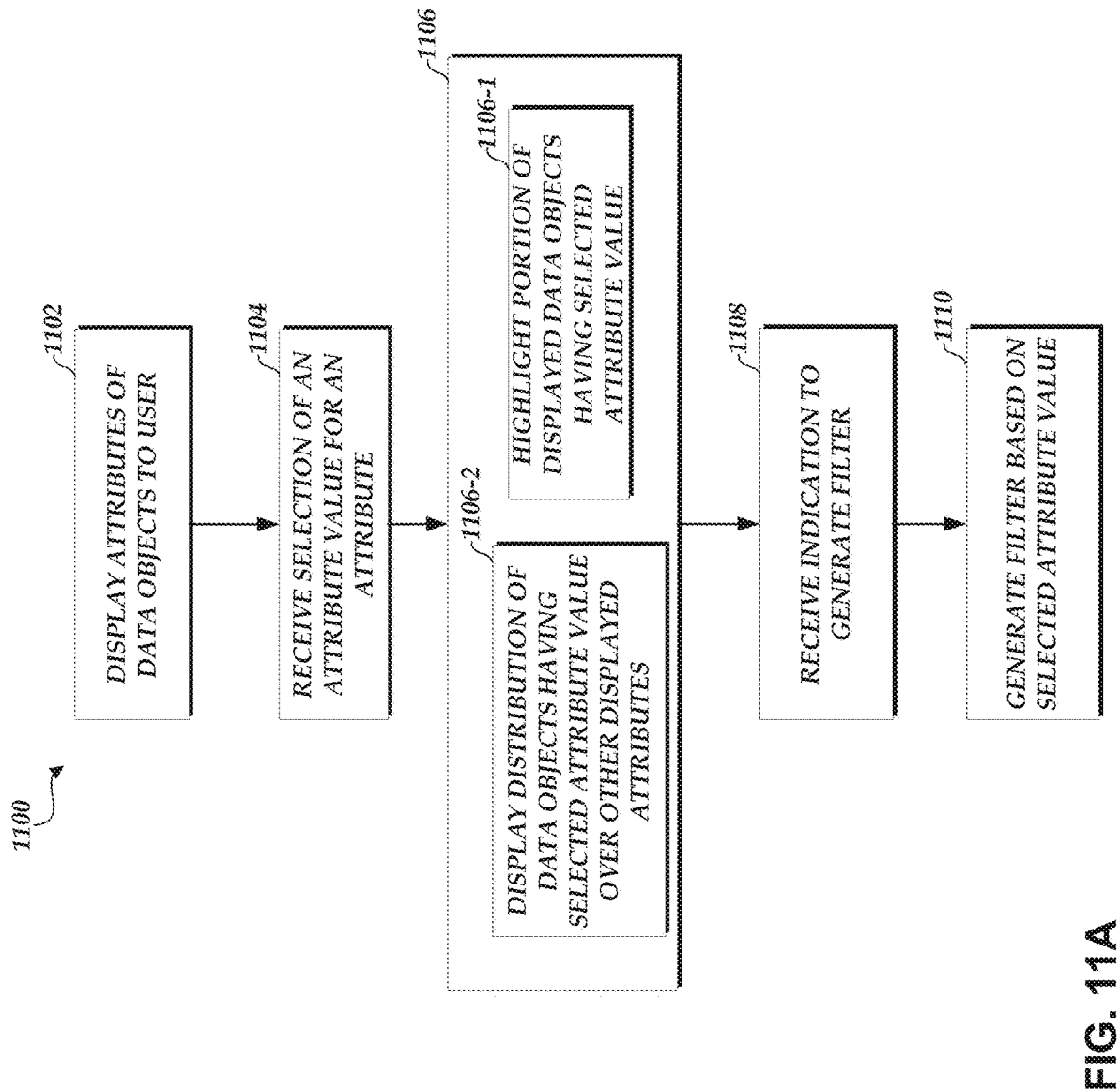
FIG. 11A illustrates a flowchart of a process for creating filters, in accordance with some embodiments.

FIG. 11A is a flowchart of a process for creating filters, in accordance with some embodiments. At block 1102, a plurality of objects are displayed to the user. The objects may be displayed in response to the user selecting one or more vector layers to display, and/or performing one or more searches. In some embodiments, when the plurality of objects are displayed, one or more histograms for one or more attributes are generated, illustrating how the displayed objects are distributed over different attribute values or attribute value ranges.

At block 1104, a selection of an attribute value or attribute value range (hereinafter collectively referred to as "attribute value") is received. In some embodiments, the selected attribute value may be based upon a relationship between a object to a different type of object. For example, the selected attribute value may correspond to objects that are within a region defined by another type of object, such as objects within the borders of a selected region.

At block 1106, in response to the selection specifying the attribute value, one or more updates to the user interface may be performed. For example, at block 1106-1, a portion of the displayed objects satisfying the selected attribute value may be highlighted. In some embodiments, this comprises selecting the portion of objects. In addition, in some embodiments, at block 1106-2, one or more distributions (e.g., histograms) may be displayed illustrating how the portion of objects satisfying the selected attribute value are distributed over the attribute values of other attributes. For example, in some embodiments, one or more attribute histograms may be modified to indicate how many of the selected objects are associated with different attribute values or attribute value ranges (e.g., as illustrated in FIG. 10A).

At block 1108, an indication to generate a filter based upon the selected attribute value is received. In some embodiments, this may comprise the user clicking on or selecting a "create filter" button to create a filter based upon the requested attribute value. At block 1110, a filter is generated based upon the selected attribute value in response to the received indication. In addition, the portion of the displayed objects satisfying the selected attribute value may be displayed as active objects (e.g., selectable data objects), while remaining objects that do not satisfy the selected attribute value may be displayed as inactive objects (e.g., not selectable). In some embodiments, histograms may be regenerated for one or more attributes based upon the filtered data objects. For example, the histograms may be updated such that they reflect only the currently active objects that satisfy the currently activated filter(s), but not the currently inactive objects that do not satisfy the currently activated filter(s).

In some embodiments, a user interface element (e.g., a button) is created that corresponds to the generated filter. The user interface element may be used by the user to turn on or turn off the filter.

Figure 11B:
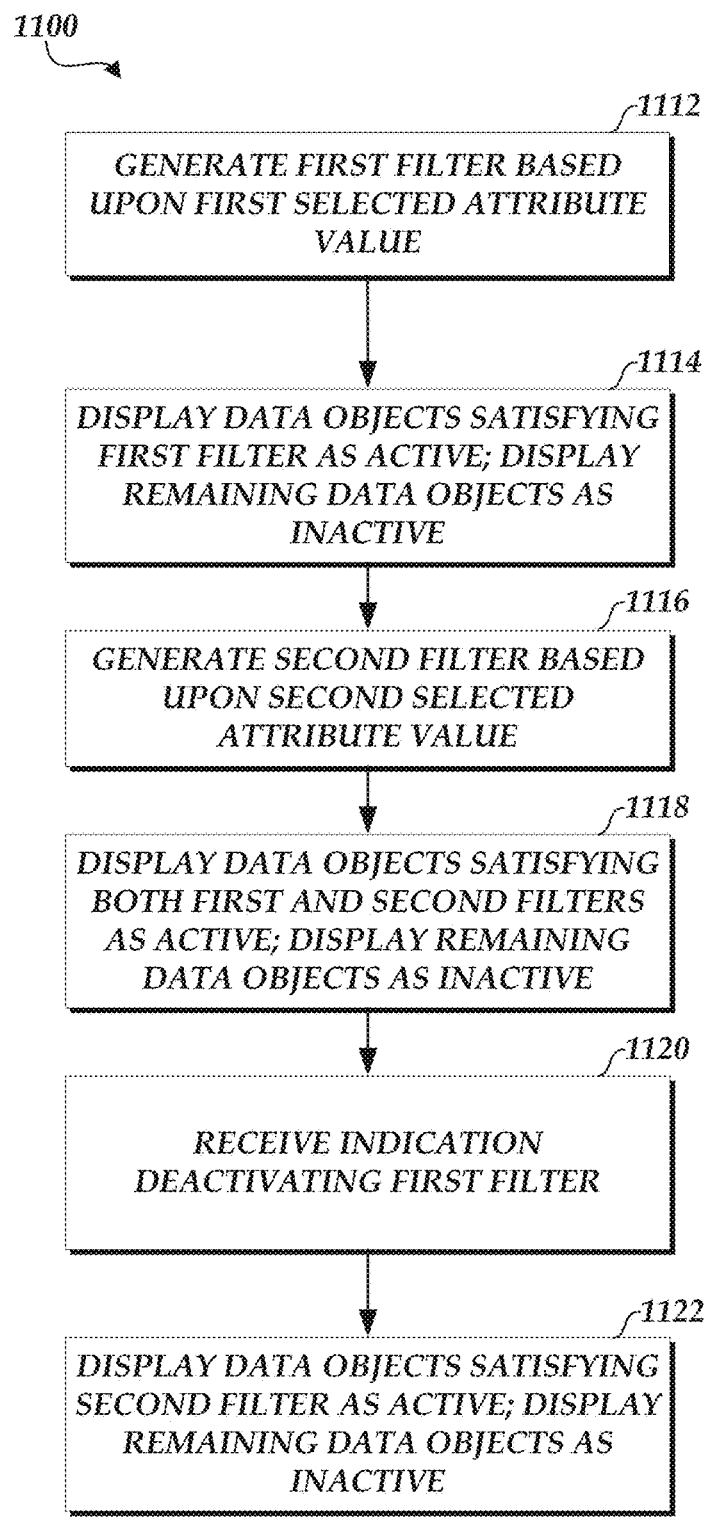
FIG. 11B illustrates a flowchart of a process manipulating multiple filters, in accordance with some embodiments.

FIG. 11B is a flowchart of a process for creating and manipulating multiple filters, in accordance with some embodiments. At block 1112, a first filter is generated based upon a first selected attribute. In some embodiments, the filter may have been generated using the process described in FIG. 11A.

At block 1114, objects that satisfy the first filter (e.g., are associated with the first attribute value) are displayed as active objects, while objects that do not satisfy the first filter are displayed as inactive. In some embodiments, the active objects may also be selected. In addition, as described above, one or more attribute histograms may be updated or regenerated to reflect distributions of the currently active objects over different attribute values or attribute value ranges.

At block 1116, a second filter is generated based upon a second selected attribute value. In some embodiments, the second attribute value may be associated with a different attribute as the first attribute value.

At block 1118, objects that satisfy both the first and second filters are displayed as active objects, while objects that do not satisfy both the first and second filters may be displayed as inactive. In addition, as described above, one or more attribute histograms may be updated or regenerated to reflect distributions of the currently active objects over different attribute values or attribute value ranges.

At block 1120, an indication is received to turn off or deactivate the first filter. In some embodiments, this may comprise the user clicking on a user interface element (e.g., a button) associated with the first filter, in order to turn off the first filter.

At block 1122, objects that satisfy the second filter are displayed as active data objects, while objects that do not satisfy the second filter may be displayed as inactive. Because the first filter has been turned off, whether or not the objects satisfy the first filter is no longer considered. In addition, as described above, one or more attribute histograms may be updated or regenerated to reflect distributions of the currently active objects over different attribute values or attribute value ranges.

As such, the user is able to create a plurality of different filters based upon different attribute values associated with objects that the user wishes to analyze. By being able to activate and deactivate different filters without needing to adhere to the order in which the filters were created, the user may be able to more easily explore different sets of objects that having different combinations of attribute values.

Tiles, Tile Layers, and UTF Grid

A single map may be associated with hundreds, thousands, or even millions of objects. Due to the possibility of the amount of processing that may be required to deal with larger numbers objects (e.g., identifying which objects/features are to be displayed, how they are to be displayed, and/or the like) being beyond the processing and/or memory capacity of client-side components, the composition of map tiles may be accomplished by server-side components of the interactive data object map system. The map tiles may then be transmitted to the client-side components of the interactive data object map system where they are composed into the map interface. In some embodiments, each composed map tile may comprise one or more static image files (e.g., a PNG file, or other image file type).

In some embodiments, each map tile may comprise one or more tile layers, wherein each tile layer corresponds to a different type of data. For example, a user may specify a base layer and one or more vector layers to be displayed (see, e.g., FIGS. 2A-2C). In addition, certain data objects or features may be made inactive, while other data objects or features may remain active. Data objects or features may also be selected or not selected.

Figure 12:
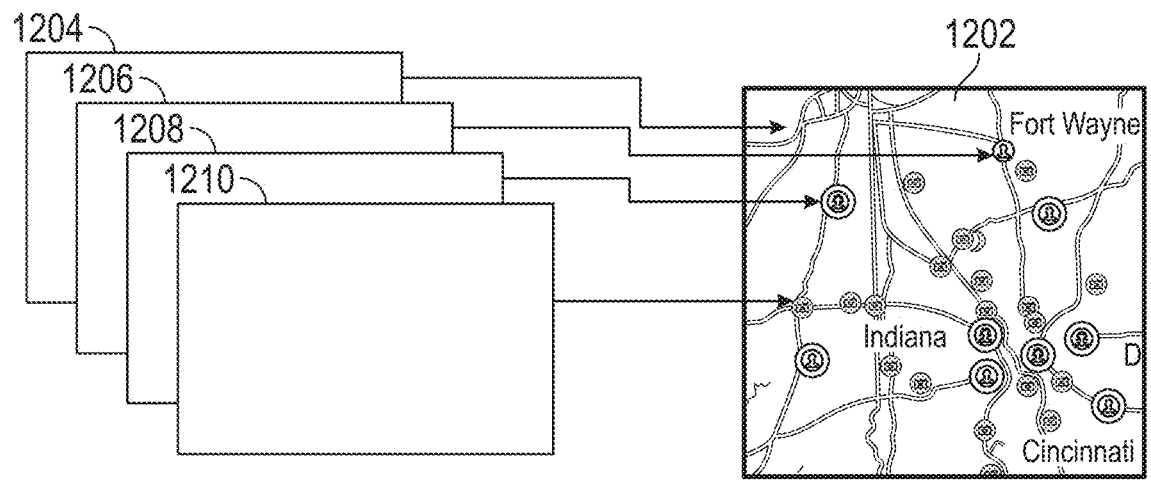
FIG. 12 illustrates a layer configuration that may be used in a map, in accordance with some embodiments.

FIG. 12 illustrates a tile layer configuration that may be used in a map, in accordance with some embodiments. In the illustrated embodiments, map tile 1202 comprises at least one base tile layer 1204, at least one vector tile layer 1206, an optional inactive tile layer 1208, and an optional selection tile layer 1210. Base tile layer 1204 comprises a base map upon which data objects and features may be displayed. In some embodiments, the base tile layer may include, as described above, overhead imagery, topographic, blank (Mercator), base map, aviation, and/or blank (unprojected).

Vector tile layer 1206 may be used to display objects to be overlaid on the base tile layer 1204. For example, the user may select one or more vector layers to be displayed (e.g., as illustrated in FIG. 2A). In addition, the user may perform one or more searches specifying parameters for one or more objects to be displayed on the map. In some embodiments, objects may be displayed on the map using an icon. Different types of objects may be displayed using different icons (e.g., an object representing a person may be displayed using a circular icon containing the shape a person, while an object representing a restaurant may be shown using a different icon, such as a circular icon containing a dining symbol). In some embodiments, objects may be displayed using different shapes. For example, as illustrated in FIGS. 3A, 3B, and 3C, objects may comprise sections of road, sections of river, county borders, and/or other types of objects. These objects may be represented using lines or other shapes on the map (e.g., a road may be presented as a yellow line, while a river may be represented as a blue line, and a province represented by a green border).

In some embodiments, for the purposes of transmitting to the client, multiple vector layers (e.g., multiple vector layers selected by a user) may be compressed into a single vector tile layer 1206. In other embodiments, each vector layer may be transmitted as its own separate vector tile layer.

In some embodiments, not all selected vector layers need to be considered when generating vector tile layer 1206. For example, a particular selected vector layer may only contain objects within a certain area of the map. As such, when generating vector tile layer 1206, only vector layers having objects within the area of the map tile need to be considered. In some embodiments, in order to be able to quickly eliminate vector layers that do not have to be considered when generating vector tile layer 1206 for a given map tile, a bounding box may be drawn around the objects of a vector layer, to determine an area covered by the vector layer. If the area of the bounding box is outside the area covered by the map tile, the vector layer is not considered when generating vector tile layer 1206 for the map tile.

In some embodiments, a user may be able to select one or more of the displayed objects shown in object layer 1206. When an object is selected, the icon or shape representing the data object may change color and/or shape in response to being selected. For example, a circular icon representing a person object may contain a ring that changes color when the object is selected. A blue line representing a section of river may, in response to a selection may the user, be overlaid using a thicker line of a different color. As it is possible for a user to select hundreds or thousands of objects at a time (e.g., by performing a large search or selecting over an area), it is often beneficial to keep track of which objects have been selected on the server-side. As such, the modified icons/shapes caused by selection of the objects may be displayed in optional selection tile layer 1210. In some embodiments, other visual effects that may be applied on the map, such as a heatmap, may also be displayed in selection tile layer 510.

Figure 13:
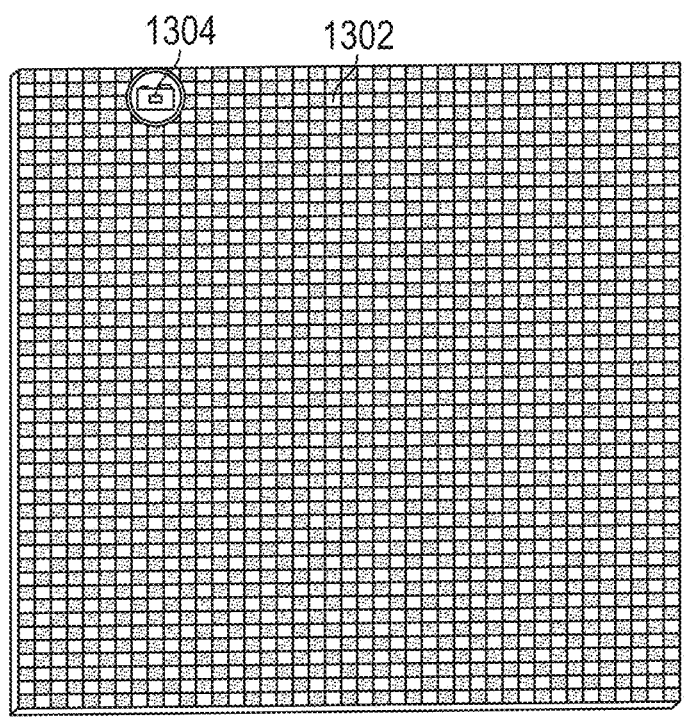
FIG. 13 illustrates an example tile, in accordance with some embodiments.

FIG. 13 illustrates an example selection tile layer for a map tile, in accordance with some embodiments. As illustrated in the figure, selection tile layer 1302 comprises an image that contains an icon 1304 corresponding to a selected object. Because there are no other objects that have been selected within the area of tile 1302, the remainder tile 1302 is transparent, such that it can be transposed with the remaining layers associated with the tile (e.g., a vector tile layer, a base tile layer, and/or an inactive tile layer) to form a complete map tile for display.

In some embodiments, not all of the displayed objects are able to be interactive or selectable by the user. Objects that are not interactive or selectable may be referred to as being "inactive." For example, a user may define a filter to exclude a subset of the displayed objects. As such, objects that are inactive may be displayed on optional inactive tile layer 1208 instead of on vector tile layer 1206. In some embodiments, a visual effect may be applied on the icon or shape representing an inactive object (e.g., greying out the icon representing the object), in order to differentiate the object from selectable objects on the map.

The various layers (base tile layer 1204, vector tile layer 1206, inactive tile layer 1208, and selection tile layer 1210), are generated at the server side and overlaid on each other to form completed map tiles, which may then be sent to the client system. An array of completed map tiles are assembled form the map. In some embodiments, images corresponding to individual tile layers may be sent to the client system, whereupon the client system assembles the received tile layers into completed map tiles.

In some embodiments, user interactions with the displayed map may cause the tile layers to be updated. For example, if the user clicks a particular location on the map, a determination may be made as to whether the location corresponds to an icon or shape representing an object. In some embodiments, this determination may be made at the server-side in response the client sending coordinates of the click to the server. If it is determined that the location is associated with an object, the object may be selected, causing an update to one or more tile layers (e.g., selection tile layer 1210). In some embodiments, this may cause the server to generated one or more updated layers for which to create a re-composed tile. The re-composed tile comprising updated tile layers may then be sent from the server to the client, to be displayed in the tile location.

In some embodiments, not all tile layers of a map tile need to be updated in response to a user interaction. For example, when a user selects a displayed object on a particular tile, the interaction may necessitate updates to the vector tile layer and/or selection tile layer associated with the tile. However, it is possible that the base tile layer and inactive tile layer associated with the tile do not need to be updated. As such, in some embodiments, one or more updated tile layers are sent from the server to the client, and used to replace one or more corresponding tile layers previously displayed at the location. In some embodiments, in order to maintain visual continuity, the previous tile layers are not replaced until all updated tile layers for the particular tile have been received.

In some embodiments, at least a portion of the determinations may be performed by the client instead of the server. For example, in some embodiments, because the user may only highlight a single object at a time, highlighting an object may be performed by the client instead of by the server. As such, highlighting objects on the map may be performed nearly instantaneously, and provides useful feedback that enhances the interactivity of the map system.

Figure 14:
FIG. 14 illustrates an example of a UTF grid of the map system, according to an embodiment of the present disclosure.

In some embodiments, in order to determine whether a particular location on the map corresponds to a data object or feature, a UTF grid may be used. FIG. 14 illustrates an example of a UTF grid of the map system, according to an embodiment of the present disclosure. In an embodiment, the UTF grid enables feature outlining and/or highlighting of many objects with client-side components. In one embodiment, each map tile (or image) of the map interface includes an associated textual UTF (UCS Transformation Format) grid. In FIG. 14, an example map tile 1402 is shown next to an associated example UTF grid 1404. In this example, the map tile and associated UTF grid are generated by the server-side components and sent to the client-side components. In the UTF grid, each character represents a pixel or set of pixels in the map tile image, and each character indicates what object is associated with the pixel. For example, the pixels of the map can be downsampled and divided into arrays or sets of pixels (e.g., a 2×2 array of pixels) are each associated with a character in the UTF grid. Each character in the UTF grid may additionally be associated with an object identifier which may be used to request metadata associated with that object.

Contiguous regions of characters in the UTF grid indicate the bounds of a particular object, and may be used by the client-side components to provide the object highlighting and/or outlining. For example, when a user hovers a mouse pointer over an object on a map tile, the map system determines the character and portion of the UTF grid associated with the pixel hovered over, draws an object outline based on the UTF grid, and may additionally access metadata associated with the object based on the object identifier associated with the object. For example, the object identifier is sent to a back-end server, where the identifier is used to identify the object and retrieve metadata associated with the object to be transmitted to the client. In some embodiments, characters in the UTF may also be associated with certain types of metadata associated with the object (e.g., object name), allowing the metadata to be displayed without having to first retrieve the metadata using the object identifier from the back-end server. This allows the metadata to be displayed almost instantly when the user selects or highlights the object. In an embodiment, the UTF grid is sent to the client-side components in a JSON (JavaScript Object Notation) format.

Figure 15:
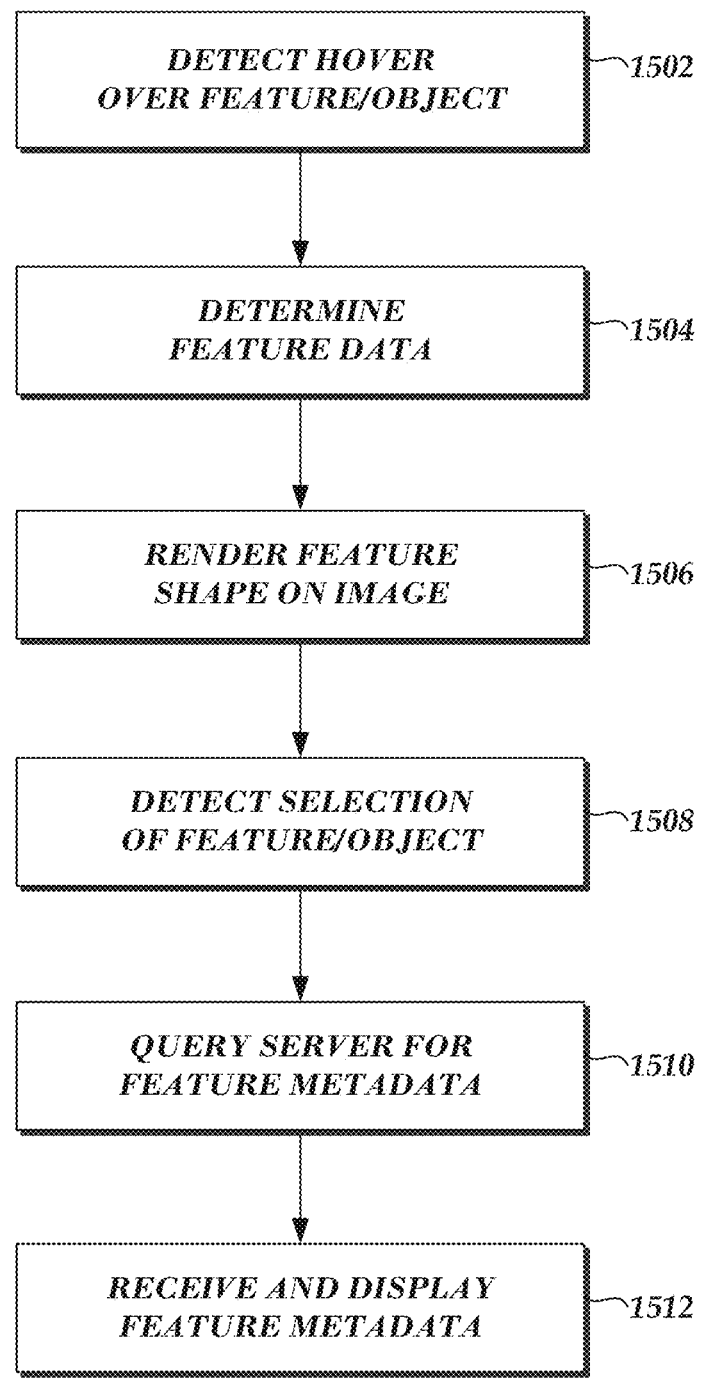
FIG. 15 shows a flow diagram depicting illustrative client-side metadata retrieval of the interactive data object map system, according to an embodiment of the present disclosure.

For example, FIG. 15 shows a flow diagram depicting illustrative client-side metadata retrieval of the map system, according to an embodiment of the present disclosure. In various embodiments, fewer blocks or additional blocks may be included in the process, or various blocks may be performed in an order different from that shown in FIG. 15. In an embodiment, one or more blocks in FIG. 15 may be performed by client-side components of the map system, for example, computer system 2000.

At block 1502, the client-side components of the map system detect that the user is hovering over and/or touching an object in the user interface. At block 1504, and as described above, the client-side components may access the UTF grid to determine the object identifier and object boundaries associated with the hovered-over object. Then, at block 1506, the client-side components may render the object shape on the image or map interface. The object shape may be rendered as an outline and/or other highlighting.

At block 1508, the client-side components detect whether the user has selected the object. Objects may be selected, for example, if the user clicks on the object and or and/or touches the object. If the user has selected the object, then at block 1510, the client-side components query the server-side components to retrieve metadata associated with the selected object. In an embodiment, querying of the server-side components may include transmitting the object identifier associated with the selected object to the server, the server retrieving from a database the relevant metadata, and the server transmitting the retrieved metadata back to the client-side components. In other embodiments, only a location of the selection needs to be sent to the server, whereupon the server may identify the object based upon the selection location.

At block 1512, the metadata may be received by the client-side components and displayed to the user. For example, the metadata associated with the selected object may be displayed to the user in the user interface in a dedicated metadata window, among other possibilities. In some embodiments, the metadata may be used to be used as part of one or more aggregations or combinations that are displayed to the user. For example, the metadata may be used to generate one or more attribute histograms. In some embodiments, the metadata is aggregated and processed at the server side (e.g., to create a histogram), wherein the processed metadata (e.g., histogram data) is then transmitted to the client.

In an embodiment, one or more blocks in FIG. 15 may be performed by server-side components of the map system, for example, server 2030.

Figure 16A:
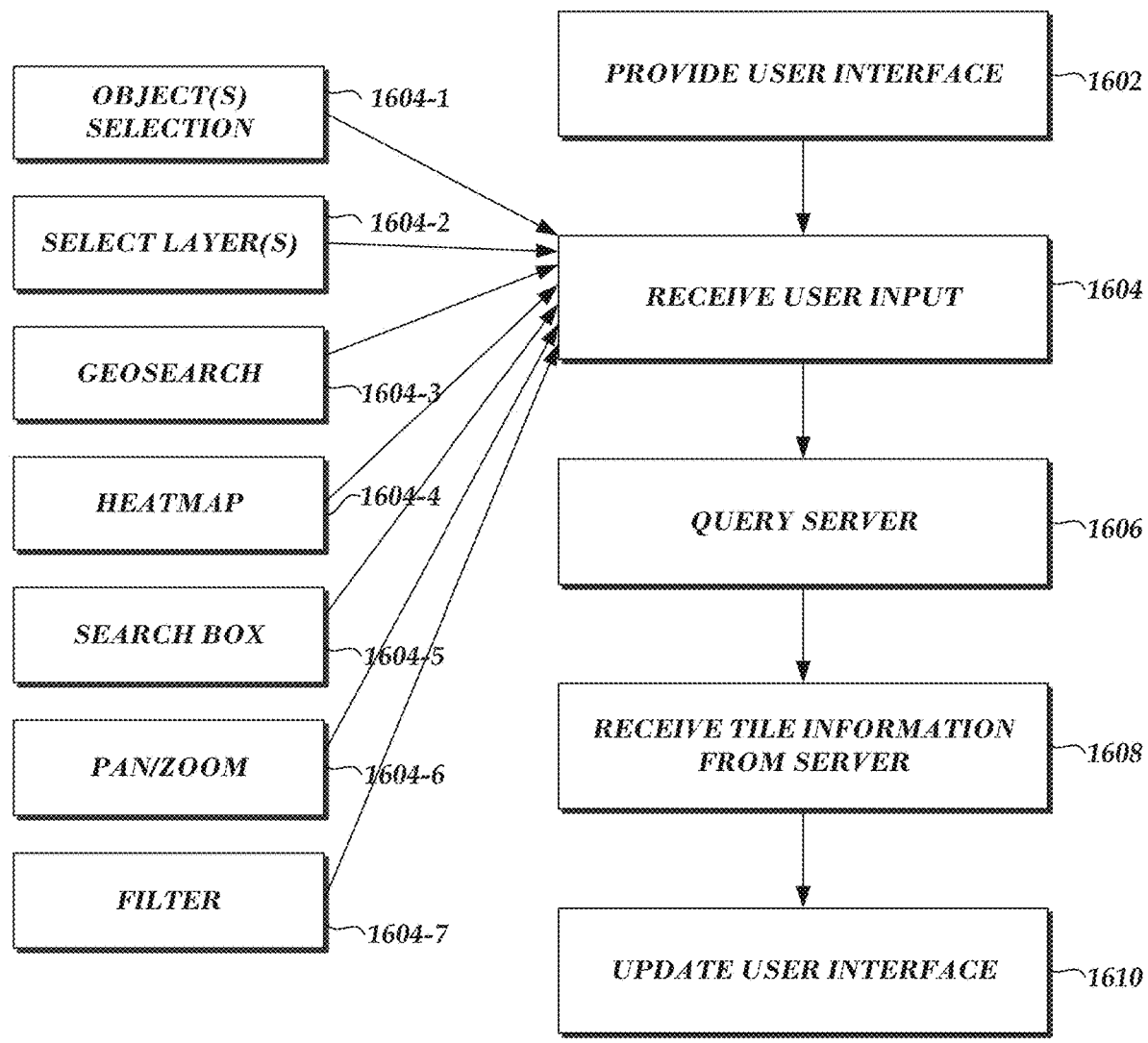
FIG. 16A shows a flow diagram depicting illustrative server-side operations of the map system, according to an embodiment of the present disclosure.

FIG. 16A shows a flow diagram depicting illustrative server-side operations of the map system, according to an embodiment of the present disclosure. In various embodiments, fewer blocks or additional blocks may be included in the process, or various blocks may be performed in an order different from that shown in FIG. 16A. In an embodiment, one or more blocks in FIG. 16A may be performed by server-side components of the map system, for example, server 2030.

Server-side operations of the map system may include composing and updating the map tiles that make up the map interface. For example, when the user changes the selection of the base layer and/or one or more of the vector layers, the map tiles are re-composed and updated in the map interface to reflect the user's selection. Selection of objects resulting in highlighting of those objects may also involve re-composition of the map tiles. Further, UTF grids may be generated by the server-side components for each map tile composed.

At block 1602, the user interface is provided to the user. At block 1604 an input from the user is received. Inputs received from the user that may result in server-side operations may include, for example, an object selection (1604-1), a change in layer selection (1604-2), a geosearch (1604-3), generating a heatmap (1604-4), searching from the search box (1604-5), panning or zooming the map interface (1604-6), and/or generating one or more filters (1604-7), among others.

At block 1606, the client-side components of the map system may query the server-side components in response to any of inputs 1604-1, 1604-2, 1604-3, 1604-4, 1604-5, 1604-6, and 1604-7 from the user. The server-side components then update and re-compose the map tiles and UTF grids of the map interface in accordance with the user input (as described above in reference to FIG. 15 and below in reference to FIG. 16B), and transmits those updated map tiles and UTF grids back to the client-side components.

At block 1608, the client-side components receive the updated map tile information from the server, and at block 1610 the user interface is updated with the received information.

In an embodiment, additional information and/or data, in addition to updated map tiles, may be transmitted to the client-side components from the server-side components. For example, object metadata may be transmitted in response to a user selecting an object.

In an embodiment, one or more blocks in FIG. 16A may be performed by client-side components of the map system, for example, computer system 2000.

Figure 16B:
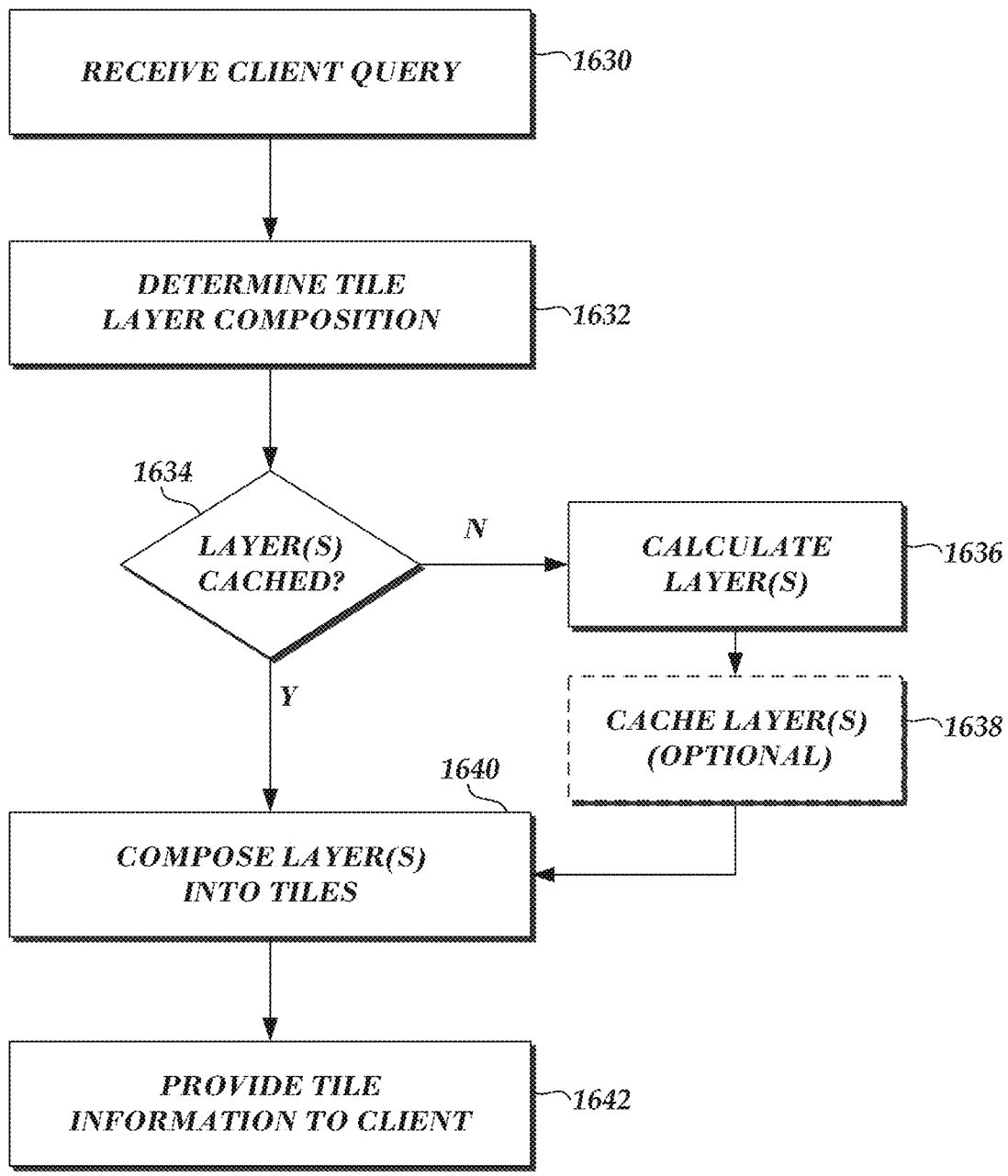
FIG. 16B shows a flow diagram depicting illustrative server-side layer composition of the map system, according to an embodiment of the present disclosure.

FIG. 16B shows a flow diagram depicting illustrative server-side layer composition of the map system, according to an embodiment of the present disclosure. In various embodiments, fewer blocks or additional blocks may be included in the process, or various blocks may be performed in an order different from those shown. In an embodiment, one or more blocks in FIG. 16B may be performed by server-side components of the map system, for example, server 2000.

At block 1630, a query is received by the server-side components from the client-side components. Such a query may originate, for example, at block 1616 of FIG. 16A. At block 1632, the server-side components determine the map tile composition based on the query. For example, if the user has selected an object or group of objects, the map tiles containing those objects may be updated to include highlighted objects (e.g., selection tile layers for the map tiles are updated to display highlighted icons corresponding to the highlighted objects). If the user defines a filter, the map tiles may be updated to show objects that do not satisfy the filter conditions as inactive (e.g., vector tile layers are updated to remove icons corresponding to data objects that have been made inactive, while inactive tile layers are updated to include icons corresponding to inactive data objects). In another example, if the user has changed the layer selection, the map tiles may be updated to include only those layers that are currently selected. In the example of FIG. 16B, the layers currently selected are determined, and the layers are composed and/or rendered into the map tiles (e.g., as base tile layer and/or vector tile layer). In another example, if the user has performed a geosearch and selected to add the search result objects to the map interface, the map tiles are updated to include those search result objects. In yet another example, when the user has generated a heatmap, the map tiles (e.g., selection tile layers) are updated to show the generated heatmap. In another example, if the user searches via the search box, the selected objects may be highlighted in the re-composed map tiles. In another example, when the user pans and/or zooms in the map interface, the map tiles are updated to reflect the new view selected by the user. In all cases, an updated UTF grid may also be generated for each composed map tile. For example, the UTF grid may be updated such that data objects that have been selected or made inactive are not highlighted when hovered over by the user, such that only data objects that are not inactive and are not already selected can be highlighted.

For example, the map tile may comprise a plurality of overlaid tile layers (e.g., as illustrated in FIG. 12). The selected base layer may be rendered as its own tile layer. In some embodiments, the selected vector layers may be consolidated into a single vector tile layer, while in other embodiments, selected layers may remain as separate vector tile layers. In some embodiments, one or more selected vector layers may be not be considered, based upon a determination that no data objects or features associated with the vector layer are within the region corresponding to the map tile. In addition, data objects and/or features displayed as the result of a search may also be rendered in the vector tile layer. If the user has selected an object or group of objects, the selection (and any associated visual effects) may be rendered in the selection tile layer. In some embodiments, other visual effects, such as heatmaps, may also be rendered in the selection tile layer. Data objects or features that have been made inactive may be separated into a separate inactive tile layer.

At block 1634, the map system determines whether the layers necessary to compose the requested map tiles are cached. For example, when a layer is selected by the user, that layer may be composed by the map system and placed in a memory of the server-side components for future retrieval. Caching of composed layers may obviate the need for recomposing those layers later, which advantageously may save time and/or processing power.

If the required layers are cached, then at block 1640 the layers are composed into the requested map tiles and, at block 1642, transmitted to the client-side components.

When the required layers are not cached, at block 1636, the server-side components calculate and/or compose the requested layer and/or layers, and may then, at block 1638, optionally cache the newly composed layers for future retrieval. Then, at blocks 1640 and 1642, the layers are composed into map tiles and provided to the client-side components. In some embodiments, the layers are composed into tile layers. For example, multiple selected vector layers may be composed into a single vector tile layer. In some embodiments, the tile layers (e.g., a base tile layer, a vector tile layer, a selection tile layer, and/or an inactive tile layer) are composed into map tiles by the server and provided to the client-side components. In other embodiments, the tile layers are provided to the client-side components, which uses them to compose the map tiles (e.g., by overlaying the tile layers for a particular map tile on top of each other to form the map tile).

In an embodiment, tile layers and/or entire map tiles may be cached by the server-side components. In an embodiment, the size and/or quality of the map tiles that make up that map interface may be selected and/or dynamically selected based on at least one of: the bandwidth available for transmitting the map tiles to the client-side components, the size of the map interface, and/or the complexity of the layer composition, among other factors. In an embodiment, the map tiles comprise images, for example, in one or more of the following formats: PNG, GIF, JPEG, TIFF, BMP, and/or any other type of appropriate image format.

In an embodiment, the layer and object data composed into layers and map tiles comprises vector data. The vector data (for example, object data) may include associated metadata, as described above. In an embodiment, the vector, layer, and/or object data and associated metadata may originate from one or more databases and/or electronic data stores.

In an embodiment, the map system may display more than 50 million selectable features to a user simultaneously. In an embodiment, the map system may support tens or hundreds of concurrent users accessing the same map and object data. In an embodiment, map and object data used by the map system may be mirrored and/or spread across multiple computers, servers, and/or server-side components.

In an embodiment, rather than updating the map tiles to reflect a selection by the user of one or more objects, the map system may show an approximation of the selection to the user based on client-side processing.

In an embodiment, icons and/or styles associated with various objects in the map interface may be updated and/or changed by the user. For example, the styles of the various objects may be specified in or by a style data file. The style data file may be formatted according to a particular format or standard readable by the map system. In an embodiment, the style data file is formatted according to the JSON format standard. The user may thus change the look of the objects and shapes rendered in the map interface of the map system by changing the style data file. The style data file may further define the looks for object and terrain (among other items and data) at various zoom levels.

In an embodiment, objects, notes, metadata, and/or other types of data may be added to the map system by the user through the user interface. In an embodiment, user added information may be shared between multiple users of the map system. In an embodiment, a user of the map system may add annotations and shapes to the map interface that may be saved and shared with other users. In an embodiment, a user of the map system may share a selection of objects with one or more other users.

In an embodiment, the user interface of the map system may include a timeline window. The timeline window may enable the user to view objects and layers specific to particular moments in time and/or time periods. In an embodiment, the user may view tolerance ellipses overlaid on the map interface indicating the likely position of an object across a particular time period.

In an embodiment, the map system may include elevation profiling. Elevation profiling may allow a user of the system to determine the elevation along a path on the map interface, to perform a viewshed analysis (determine objects and/or terrain viewable from a particular location), to perform a reverse-viewshed analysis (for a particular location, determine objects and/or terrain that may view the location), among others.

In an embodiment, vector data, object data, metadata, and/or other types of data may be prepared before it is entered into or accessed by the map system. For example, the data may be converted from one format to another, may be crawled for common items of metadata, and/or may be prepared for application of a style file or style information, among other action. In an embodiment, a layer ontology may be automatically generated based on a group of data. In an embodiment, the map system may access common data sources available on the Internet, for example, road data available from openstreetmap.org.

In an embodiment, roads shown in the map interface are labeled with their names, and buildings are rendered in faux-3D to indicate the building heights. In an embodiment, Blue Force Tracking may be integrated into the map system as a layer with the characteristics of both a static vector layer and a dynamic selection layer. A Blue Force layer may enable the use of the map system for live operational analysis. In an embodiment, the map system may quickly render detailed chloropleths or heatmaps with minimal data transfer. For example, the system may render a chloropleth with a property value on the individual shapes of the properties themselves, rather than aggregating this information on a county or zip code level.

Advantageously, the map system displays many items of data, objects, features, and/or layers in a single map interface. A user may easily interact with things on the map and gather information by hovering over or selecting features, even though those features may not be labeled. The user may select features, may "drill down" on a particular type of feature (for example, roads), may view features through histograms, may use histograms to determine common characteristics (for example, determine the most common speed limit), and/or may determine correlations among features (for example, see that slower speed limit areas are centered around schools). Further, the map system may be useful in many different situations. For example, the system may be useful to operational planners and/or disaster relief personnel.

Additionally, the map system accomplishes at least three core ideas: providing a robust and fast back-end (server-side) renderer, keeping data on the back-end, and only transferring the data necessary to have interactivity. In one embodiment, the primary function of the server-side components is rendering map tiles. The server is capable of drawing very detailed maps with a variety of styles that can be based on vector metadata. Rendered map tiles for a vector layer may be cached, and several of these layer tiles are drawn on top of one another to produce the final tile that is sent to the client-side browser. Map tile rendering is fast enough for displaying dynamic tiles for selection and highlight to the user. Server-side operations allow for dynamic selections of very large numbers of features, calculation of the histogram, determining the number of items shown and/or selected, and drawing the selection, for example. Further, the heatmap may include large numbers of points without incurring the cost of transferring those points to the client-side browser. Additionally, transferring only as much data as necessary to have interactivity enables quick server rendering of dynamic selections and vector layers. On the other hand, highlighting hovered-over features may be performed client-side nearly instantaneously, and provides useful feedback that enhances the interactivity of the map system. In an embodiment, to avoid transferring too much geometric data, the geometries of objects (in the map tiles and UTF grid) are down-sampled depending on how zoomed in the user is to the map interface. Thus, map tiles may be rendered and presented to a user of the map system in a dynamic and useable manner.

Object Centric Data Model

To provide a framework for the following discussion of specific systems and methods described above and below, an example database system 1710 using an ontology 1705 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 1705. The conceptual data model is independent of any particular database used for durably storing one or more database(s) 1709 based on the ontology 1705. For example, each object of the conceptual data model may correspond to one or more rows in a relational database or an entry in Lightweight Directory Access Protocol (LDAP) database, or any combination of one or more databases.

Figure 17A:
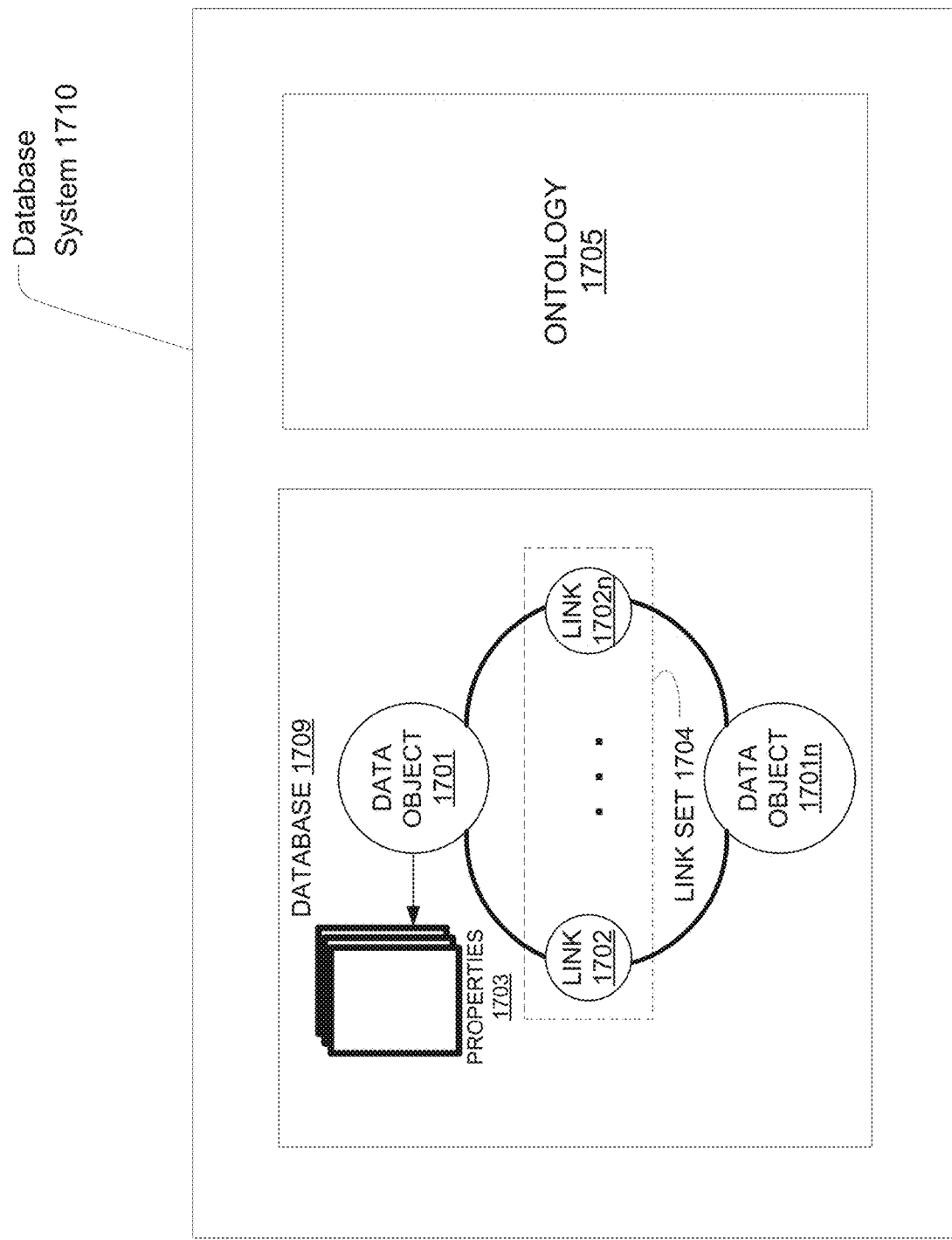
FIG. 17A illustrates one embodiment of a database system using an ontology.

FIG. 17A illustrates an object-centric conceptual data model according to an embodiment. An ontology 1705, as noted above, may include stored information providing a data model for storage of data in the database 1709. The ontology 1705 may be defined by one or more object types, which may each be associated with one or more property types. At the highest level of abstraction, data object 1701 is a container for information representing things in the world. For example, data object 1701 can represent an entity such as a person, a place, an organization, a market instrument, or other noun. Data object 1701 can represent an event that happens at a point in time or for a duration. Data object 1701 can represent a document or other unstructured data source such as an e-mail message, a news report, or a written paper or article. Each data object 1701 is associated with a unique identifier that uniquely identifies the data object within the database system.

Different types of data objects may have different property types. For example, a "Person" data object might have an "Eye Color" property type and an "Event" data object might have a "Date" property type. Each property 1703 as represented by data in the database system 1710 may have a property type defined by the ontology 1705 used by the database 1705.

Objects may be instantiated in the database 1709 in accordance with the corresponding object definition for the particular object in the ontology 1705. For example, a specific monetary payment (e.g., an object of type "event") of US$30.00 (e.g., a property of type "currency") taking place on Mar. 27, 2009 (e.g., a property of type "date") may be stored in the database 1709 as an event object with associated currency and date properties as defined within the ontology 1705.

The data objects defined in the ontology 1705 may support property multiplicity. In particular, a data object 1701 may be allowed to have more than one property 1703 of the same property type. For example, a "Person" data object might have multiple "Address" properties or multiple "Name" properties.

Each link 1702 represents a connection between two data objects 1701. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 1701 can have multiple links with another data object 1701 to form a link set 1704. For example, two "Person" data objects representing a husband and a wife could be linked through a "Spouse Of" relationship, a matching "Address" property, and one or more matching "Event" properties (e.g., a wedding). Each link 1702 as represented by data in a database may have a link type defined by the database ontology used by the database.

Figure 17B:
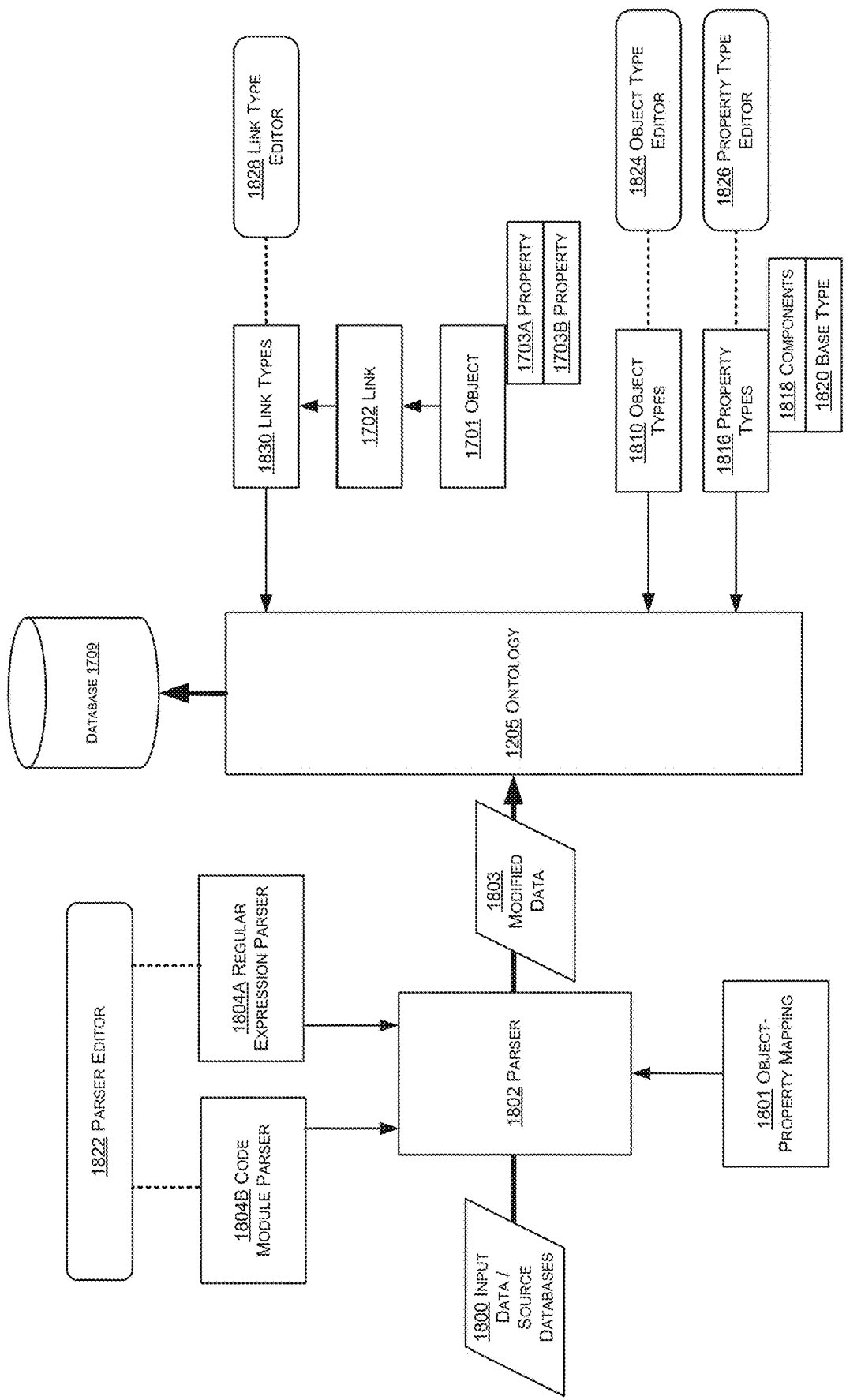
FIG. 17B illustrates one embodiment of a system for creating data in a data store using a dynamic ontology.

FIG. 17B is a block diagram illustrating exemplary components and data that may be used in identifying and storing data according to an ontology. In this example, the ontology may be configured, and data in the data model populated, by a system of parsers and ontology configuration tools. In the embodiment of FIG. 17B, input data 1800 is provided to parser 1802. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 1802 is able to read a variety of source input data types and determine which type of data it is reading.

In accordance with the discussion above, the example ontology 1705 comprises stored information providing the data model of data stored in database 1709, and the ontology is defined by one or more object types 1810, one or more property types 1816, and one or more link types 1830. Based on information determined by the parser 1802 or other mapping of source input information to object type, one or more data objects 1701 may be instantiated in the database 1709 based on respective determined object types 1710, and each of the objects 1701 has one or more properties 1703 that are instantiated based on property types 1816. Two data objects 1701 may be connected by one or more links 1702 that may be instantiated based on link types 1830. The property types 1816 each may comprise one or more data types 1818, such as a string, number, etc. Property types 1816 may be instantiated based on a base property type 1820. For example, a base property type 1820 may be "Locations" and a property type 1816 may be "Home."

In an embodiment, a user of the system uses an object type editor 1824 to create and/or modify the object types 1810 and define attributes of the object types. In an embodiment, a user of the system uses a property type editor 1826 to create and/or modify the property types 1816 and define attributes of the property types. In an embodiment, a user of the system uses link type editor 1828 to create the link types 1830. Alternatively, other programs, processes, or programmatic controls may be used to create link types and property types and define attributes, and using editors is not required.

In an embodiment, creating a property type 1816 using the property type editor 1826 involves defining at least one parser definition using a parser editor 1822. A parser definition comprises metadata that informs parser 1802 how to parse input data 1800 to determine whether values in the input data can be assigned to the property type 1816 that is associated with the parser definition. In an embodiment, each parser definition may comprise a regular expression parser 1804A or a code module parser 1804B. In other embodiments, other kinds of parser definitions may be provided using scripts or other programmatic elements. Once defined, both a regular expression parser 1804A and a code module parser 1804B can provide input to parser 1802 to control parsing of input data 1800.

Using the data types defined in the ontology, input data 1800 may be parsed by the parser 1802 determine which object type 1810 should receive data from a record created from the input data, and which property types 1816 should be assigned to data from individual field values in the input data. Based on the object-property mapping 1801, the parser 1802 selects one of the parser definitions that is associated with a property type in the input data. The parser parses an input data field using the selected parser definition, resulting in creating new or modified data 1803. The new or modified data 1803 is added to the database 1709 according to ontology 1705 by storing values of the new or modified data in a property of the specified property type. As a result, input data 1700 having varying format or syntax can be created in database 1709. The ontology 1705 may be modified at any time using object type editor 1824, property type editor 1826, and link type editor 1828, or under program control without human use of an editor. Parser editor 1822 enables creating multiple parser definitions that can successfully parse input data 1800 having varying format or syntax and determine which property types should be used to transform input data 1800 into new or modified input data 1803.

The properties, objects, and links (e.g. relationships) between the objects can be visualized using a graphical user interface (GUI). For example, FIG. 17C displays a user interface showing a graph representation 1903 of relationships (including relationships and/or links 1904, 1905, 1906, 1907, 1908, 1909, 1910, 1911, 1912, and 1913) between the data objects (including data objects 1921, 1922, 1923, 1924, 1925, 1926, 1927, 1928, and 1929) that are represented as nodes in the example of FIG. 8C. In this embodiment, the data objects include person objects 1921, 1922, 1923, 1924, 1925, and 1926; a flight object 1927; a financial account 1928; and a computer object 1929. In this example, each person node (associated with person data objects), flight node (associated with flight data objects), financial account node (associated with financial account data objects), and computer node (associated with computer data objects) may have relationships and/or links with any of the other nodes through, for example, other objects such as payment objects.

Figure 17C:
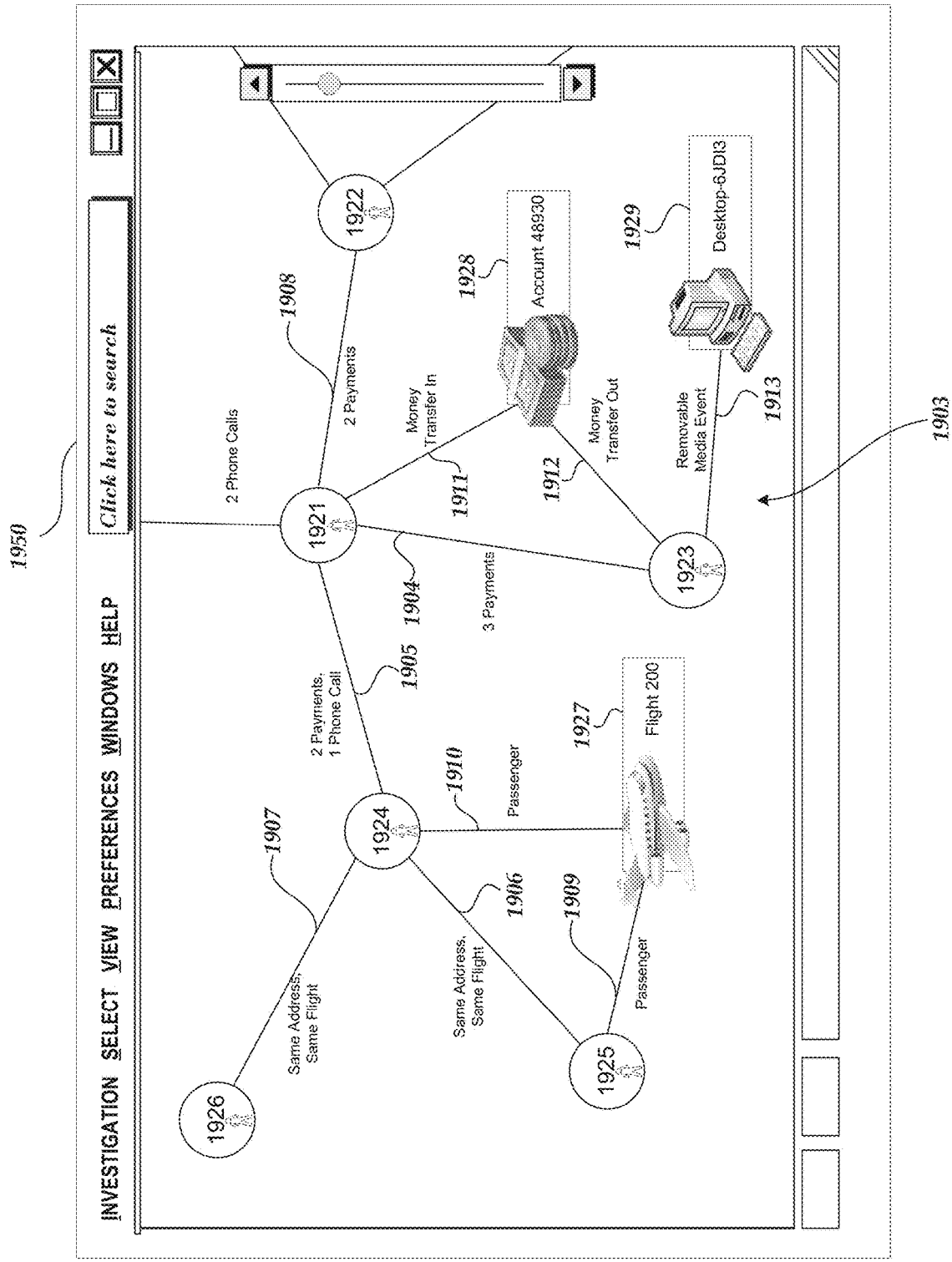
FIG. 17C illustrates an example user interface using relationships described in a data store using a dynamic ontology.

For example, in FIG. 17C, relationship 1904 is based on a payment associated with the individuals indicated in person data objects 1921 and 1923. The link 1904 represents these shared payments (for example, the individual associated with data object 1921 may have paid the individual associated with data object 1923 on three occasions). The relationship is further indicated by the common relationship between person data objects 1921 and 1923 and financial account data object 1928. For example, link 1911 indicates that person data object 1921 transferred money into financial account data object 1928, while person data object 1923 transferred money out of financial account data object 1928. In another example, the relationships between person data objects 1924 and 1925 and flight data object 1927 are indicated by links 1906, 1909, and 1910. In this example, person data objects 1924 and 1925 have a common address and were passengers on the same flight data object 1927. In an embodiment, further details related to the relationships between the various objects may be displayed. For example, links 1911 and 1912 may, in some embodiments, indicate the timing of the respective money transfers. In another example, the time of the flight associated with the flight data object 1927 may be shown.

Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In various embodiments, data objects may further include geographical metadata and/or links. Such geographical metadata may be accessed by the interactive data object map system for displaying objects and features on the map interface (as described above). In some embodiments, geographical metadata may be associated with specific properties of a data object (e.g., an object corresponding to a flight may have an origin location and a destination location).

In addition to visually showing relationships between the data objects, the user interface may allow various other manipulations. For example, the objects within database 1108 may be searched using a search interface 1950 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations. Additionally, as described above, objects within database 1108 may be searched, accessed, and implemented in the map interface of the interactive data object map system via, for example, a geosearch and/or radius search.

Implementation Mechanisms

According to an embodiment, the interactive data object map system and other methods and techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 17D:
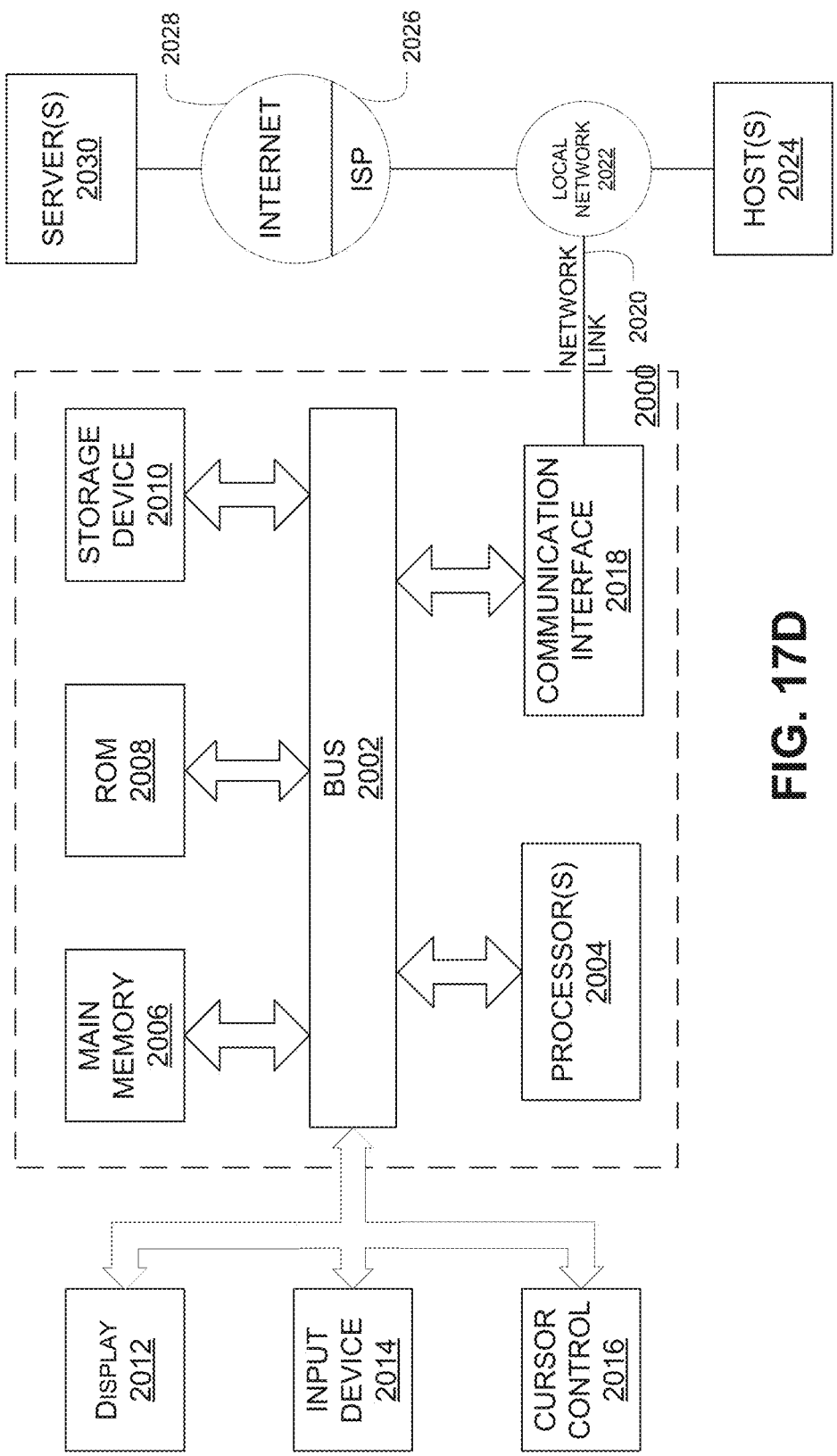
FIG. 17D illustrates a computer system with which certain methods discussed herein may be implemented.

For example, FIG. 17D is a block diagram that illustrates a computer system 800 upon which the various systems and methods discussed herein may be implemented. Computer system 2000 includes a bus 2002 or other communication mechanism for communicating information, and a hardware processor, or multiple processors, 2004 coupled with bus 2002 for processing information. Hardware processor(s) 2004 may be, for example, one or more general purpose microprocessors.

Computer system 2000 also includes a main memory 2006, such as a random access memory (RAM), cache and/or other dynamic storage devices, coupled to bus 2002 for storing information and instructions to be executed by processor 2004. Main memory 2006 also may be used for storing temporary variables or other intermediate information during execution of instructions to be executed by processor 2004. Such instructions, when stored in storage media accessible to processor 2004, render computer system 2000 into a special-purpose machine that is customized to perform the operations specified in the instructions.

Computer system 2000 further includes a read only memory (ROM) 2008 or other static storage device coupled to bus 2002 for storing static information and instructions for processor 2004. A storage device 2010, such as a magnetic disk, optical disk, or USB thumb drive (Flash drive), etc., is provided and coupled to bus 2002 for storing information and instructions.

Computer system 2000 may be coupled via bus 2002 to a display 2012, such as a cathode ray tube (CRT), LCD display, or touch screen display, for displaying information to a computer user and/or receiving input from the user. An input device 2014, including alphanumeric and other keys, is coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 2000 may include a user interface module, and/or various other types of modules to implement a GUI, a map interface, and the various other aspects of the interactive data object map system. The modules may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

Computer system 2000 may implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor(s) 2004 executing one or more sequences of one or more modules and/or instructions contained in main memory 2006. Such instructions may be read into main memory 2006 from another storage medium, such as storage device 2010. Execution of the sequences of instructions contained in main memory 2006 causes processor(s) 2004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 2010. Volatile media includes dynamic memory, such as main memory 2006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media may be involved in carrying one or more sequences of one or more instructions to processor 2004 for execution. For example, the instructions may initially be carried on a magnetic disk or solid state drive of a remote computer. The remote computer can load the instructions and/or modules into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 may optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 may be an integrated services digital network (ISDN) card, cable modem, satellite modem, or a modem to provide a data communication connection to a corresponding type of telephone line. As another example, communication interface 2018 may be a local area network (LAN) card to provide a data communication connection to a compatible LAN (or WAN component to communicated with a WAN). Wireless links may also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 may provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018. Server-side components of the interactive data object map system described above (for example, with reference to FIGS. 7A and 7B) may be implemented in the server 2030. For example, the server 2030 may compose map layers and tiles, and transmit those map tiles to the computer system 2000.

The computer system 2000, on the other hand, may implement the client-side components of the map system as described above (for example, with reference to FIGS. 6A and 6B). For example, the computer system may receive map tiles and/or other code that may be executed by processor 2004 as it is received, and/or stored in storage device 2010, or other non-volatile storage for later execution. The computer system 2000 may further compose the map interface from the map tiles, display the map interface to the user, generate object outlines and other functionality, and/or receive input from the user.

In an embodiment, the map system may be accessible by the user through a web-based viewer, such as a web browser. In this embodiment, the map interface may be generated by the server 2030 and/or the computer system 2000 and transmitted to the web browser of the user. The user may then interact with the map interface through the webbrowser. In an embodiment, the computer system 2000 may comprise a mobile electronic device, such as a cell phone, smartphone, and/or tablet. The map system may be accessible by the user through such a mobile electronic device, among other types of electronic devices.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

Any process descriptions, elements, or blocks in the flow diagrams described herein and/or depicted in the attached Figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
   an electronic data structure configured to store a plurality of features or objects, wherein the features or objects are associated with metadata;
   a computer readable medium storing computer executable instructions; and
   one or more processors in communication with the electronic data structure and the computer readable medium, and configured to execute the computer executable instructions to cause the computer system to:
      generate data configured to be rendered as an interactive user interface including a map configured to display data objects;
      receive, via the interactive user interface, a file including a plurality of data objects, wherein each data object is associated with at least one respective attribute;

determine that a first portion of the plurality of data objects corresponds to an unknown coordinate system;

based on the determination that the first portion corresponds to the unknown coordinate system, compare a first range of values associated with the first portion with a plurality of ranges of values associated with a plurality of coordinate systems, wherein the plurality of coordinate systems includes a first coordinate system;

based on the comparison, determine that the first range of values is included within a second range of values associated with a first coordinate system;

apply the first coordinate system to the first portion; and cause display of the first portion of the plurality of data objects on the map based at least in part on the first coordinate system.

2. The computer system of claim 1, wherein the data objects associated with the first portion are displayed on a map with a shape.

3. The computer system of claim 2, wherein the shape is defined by the received file.

4. The computer system of claim 1, wherein the one or more processors is further configured to execute the computer executable instructions to cause the computer system to:

determine that a second portion of the plurality of data objects is associated with a second coordinate system; and based on the determination that the second portion is associated with a second coordinate system, cause display of the second portion on the map based at least in part on the second coordinate system.

5. The computer system of claim 4, wherein the first portion or the second portion include no data objects.

6. The computer system of claim 4, wherein the first portion and the second portion are associated with a first layer.

7. The computer system of claim 6, wherein the one or more processors is further configured to execute the computer executable instructions to cause the computer system to:

receive, via the interactive user interface, an indication to hide the first layer from view on the interactive user interface.

8. The computer system of claim 7, wherein the one or more processors is further configured to execute the computer executable instructions to cause the computer system to:

receive, via the interactive user interface, an indication to make the first layer appear on the interactive user interface.

9. The computer system of claim 6, wherein the one or more processors is further configured to execute the computer executable instructions to cause the computer system to:

determine that a third portion of the plurality of data objects is associated with a third coordinate system, wherein the third coordinate system is different from the first coordinate system; and based on the determination that the third portion is associated with a third coordinate system, cause display of the third portion on the map based at least in part on the third coordinate system.

10. The computer system of claim 9, wherein the third portion is associated with a second layer.

11. The computer system of claim 4, wherein the data objects associated with the first portion and the second portion that are displayed on a map are selectable.

12. The computer system of claim 11, wherein the one or more processors is further configured to execute the computer executable instructions to cause the computer system to:

receive, via the interactive user interface, a selection of a data object of the data objects displayed on the map; and receive, via the interactive user interface, an indication to move or delete the selected data object.

13. The computer system of claim 11, wherein the one or more processors is further configured to execute the computer executable instructions to cause the computer system to:

receive, via the interactive user interface, a selection of a data object of the data objects displayed on the map; and receive, via the interactive user interface, an indication to edit one or more attributes associated with the selected data object.

14. A computer-implemented method comprising:

communicating with an electronic data structure configured to store a plurality of features or objects, wherein the features or objects are associated with metadata;

generating data configured to be rendered as an interactive user interface including a map configured to display data objects;

receiving, via the interactive user interface, a file including a plurality of data objects, wherein each data object is associated with at least one respective attribute;

determining that a first portion of the plurality of data objects corresponds to an unknown coordinate system;

based on the determination that the first portion corresponds to the unknown coordinate system, compare a first range of values associated with the first portion with a plurality of ranges of values associated with a plurality of coordinate systems, wherein the plurality of coordinate systems includes a first coordinate system;

based on the comparison, determining that the first range of values is included within a second range of values associated with a first coordinate system;

apply the first coordinate system to the first portion; and causing display of the first portion of the plurality of data objects on the map based at least in part on the first coordinate system.

15. The computer-implemented method of claim 14, wherein the data objects associated with the first portion are displayed on a map with a shape.

16. The computer-implemented method of claim 14 further comprising:

determining that a second portion of the plurality of data objects is associated with a second coordinate system; and based on the determination that the second portion is associated with a second coordinate system, causing display of the second portion on the map based at least in part on the second coordinate system.

17. The computer-implemented method of claim 16, wherein the first portion and the second portion are associated with a first layer.

18. The computer-implemented method of claim 17 further comprising:

determining that a third portion of the plurality of data objects is associated with a third coordinate system, wherein the third coordinate system is different from the first coordinate system; and based on the determination that the third portion is associated with a third coordinate system, causing display of the third portion on the map based at least in part on the third coordinate system.

19. The computer system of claim 1, wherein the determining of a first coordinate system to apply to the first portion is also based at least in part on preconfigured default instructions or an analysis of the data objects associated with the first portion.

20. The computer system of claim 1, wherein the one or more processors is further configured to execute the computer executable instructions to cause the computer system to:

cause display of a user interface element, via the interactive user interface, configured to receive:
a selection of the first coordinate system, or
a selection of a second coordinate system; and
in response to receiving a selection of the second coordinate system, cause display of the first portion of the plurality of data objects on the map based at least in part on the second coordinate system.

\* \* \* \* \*